(12) United States Patent
Zaware et al.

(10) Patent No.: US 12,473,263 B2
(45) Date of Patent: Nov. 18, 2025

(54) BICYCLIC INHIBITORS OF CBX CHROMODOMAINS

(71) Applicant: Icahn School of Medicine At Mount Sinai, New York, NY (US)

(72) Inventors: Nilesh Zaware, Jamaica, NY (US); Ming-Ming Zhou, Old Greenwich, CT (US); Chunyan Ren, Malden, MA (US); Claudia Kim, New York, NY (US); Sudeh Izadmehr, New York, NY (US); Matthew Galsky, New York, NY (US)

(73) Assignee: ICAHN SCHOOL OF MEDICINE AT MOUNT SINAI, New York, NY (US)

( * ) Notice: Subject to any disclaimer, the term of this patent is extended or adjusted under 35 U.S.C. 154(b) by 818 days.

(21) Appl. No.: 17/753,980

(22) PCT Filed: Sep. 23, 2020

(86) PCT No.: PCT/US2020/052258
§ 371 (c)(1),
(2) Date: Mar. 21, 2022

(87) PCT Pub. No.: WO2021/061801
PCT Pub. Date: Apr. 1, 2021

(65) Prior Publication Data
US 2022/0402880 A1    Dec. 22, 2022

Related U.S. Application Data

(60) Provisional application No. 62/904,886, filed on Sep. 24, 2019.

(51) Int. Cl.
*C07D 235/30* (2006.01)
*A61P 35/00* (2006.01)
(Continued)

(52) U.S. Cl.
CPC ............ *C07D 235/30* (2013.01); *A61P 35/00* (2018.01); *C07D 209/08* (2013.01); *C07D 403/06* (2013.01)

(58) Field of Classification Search
CPC ..... A61P 35/00; C07D 235/30; C07D 209/08; C07D 403/06
See application file for complete search history.

(56) References Cited

U.S. PATENT DOCUMENTS 7,868,028 B2 *   1/2011  Drasner ............... C07D 409/06
                                                        514/359
8,871,794 B2 *  10/2014  Yanagisawa .......... A61K 45/06
                                                        514/388
(Continued)

FOREIGN PATENT DOCUMENTS

KR   100967889 B1   7/2010
WO   2010067067 A1  6/2010
WO   2010094009 A2  8/2010

OTHER PUBLICATIONS

Ben Hadda, Taibi, Rahima Mouhoub, Rahul Jawarkar, Vijay Masand, and Ismail Warad. "POM analyses of antitrypanosomal activity of 2-iminobenzimidazoles: favorable and unfavorable parameters for drugs optimization." Medicinal Chemistry Research 22 (2013): 2437-2445) (Year: 2013).*

(Continued)

*Primary Examiner* — James H Alstrum-Acevedo
*Assistant Examiner* — Carolyn L. Ladd
(74) *Attorney, Agent, or Firm* — Heslin Rothenberg Farley & Mesiti P.C.

(57) ABSTRACT

A genus of bicyclic inhibitors of CBX chromodomains is disclosed. The compounds are of the following genus:

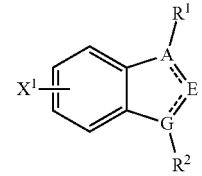

in which A, E, and G represent carbon or nitrogen such that the compounds are indoles or benzimidazoles. A particular subgenus of 1,3-disubstituted-1,3-dihydro-2H-benzo[d]imidazol-2-imines is of the general formula:

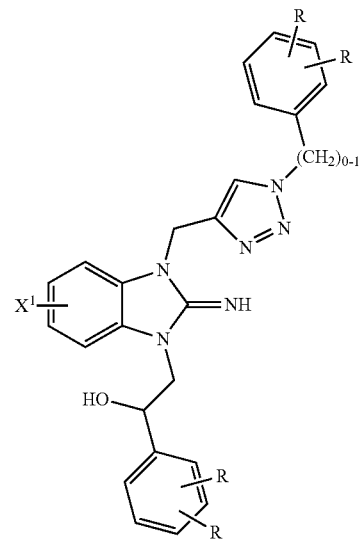

The compounds inhibit CBX proteins.

7 Claims, No Drawings

(51) Int. Cl.
*C07D 209/08* (2006.01)
*C07D 403/06* (2006.01)

(56) References Cited

U.S. PATENT DOCUMENTS

| | | | |
|---|---|---|---|
| 11,905,297 B2 * | 2/2024 | De Brabander | .......... A61P 3/10 |
| 2007/0232673 A1 | 10/2007 | Roth et al. | |
| 2010/0150840 A1 | 6/2010 | Yanagisawa | |
| 2011/0312969 A1 | 12/2011 | East et al. | |

OTHER PUBLICATIONS

Palmieri, Alessandro, and Marino Petrini. "Ketosulfonyl indoles in the regiodefined synthesis of tryptophols and related indole derivatives." Organic & Biomolecular Chemistry 10, No. 17 (2012): 3486-3493) (Year: 2012).*

Bonandi, Elisa, Michael S. Christodoulou, Gaia Fumagalli, Dario Perdicchia, Giulio Rastelli, and Daniele Passarella. "The 1, 2, 3-triazole ring as a bioisostere in medicinal chemistry." Drug Discovery Today 22, No. 10 (2017): 1572-1581) (Year: 2017).*

Bozorov, Khurshed, Jiangyu Zhao, and Haji A. Aisa. "1, 2, 3-Triazole-containing hybrids as leads in medicinal chemistry: A recent overview." Bioorganic & medicinal chemistry 27, No. 16 (2019): 3511-3531) (Year: 2019).*

RN 487011-95-0, "1H-Benzimidazole-1-ethanol, 3-[(2-chlorophenyl)methyl]-[alpha]-(3,4-dichlorophenyl)-2, 3-dihydro-2-imino-", 1 page. Feb. 7, 2003.

Supplementary European Search Report in EP 20869491, 11 pages. Aug. 11, 2023.

International Search Report and Written Opinion in International Application No. PCT/US2020/052258, 10 pages. Feb. 19, 2021.

PubChem 73335028, "1-(3-Chlorophenyl)-2-[2-imino-3-[(4-methylphenyl)methyl]benzimidazol-1-yl]ethanol", 7 pages. Mar. 31, 2014.

Park et al., "Metabolism of Fluorine-Containing Drugs", Annu. Rev. Pharmacol. Toxicol, vol. 41, 30 pages. 2001.

Simhadri et al., "Rational Adaptation of L3MBTL1 Inhibitors to Create Small-Molecule Cbx7 Antagonists", ChemMedChem, vol. 14(15), pp. 1444-1456. 2019.

Ren et al., "Structure-Guided Discovery of Selective Antagonists for the Chromodomain of Polycomb Repressive Protein CBX7", ACS Med. Chem. Lett., vol. 7, 32 pages. 2016.

Ren et al., "Small-Molecule Modulators of Methyl-Lysine Binding for the CBX7 Chromodomain", Chemistry & Biology 22, pp. 161-168 2015.

Stuckey et al., "A Cellular Chemical Probe Targeting the Chromodomains of Polycomb Repressive Complex 1", Nat Chem Biol., vol. 12(3): 180-187, pp. 1-28. Mar. 2016.

* cited by examiner

BICYCLIC INHIBITORS OF CBX CHROMODOMAINS

CROSS-REFERENCE TO RELATED APPLICATION

This application is a U.S. National Phase filing under 35 U.S.C. § 371 of International Application PCT/US2020/052258, filed Sep. 23, 2020, and published as WO2021/061801 A1 on Apr. 1, 2021. PCT/US2020/052258 claims priority of U.S. provisional application 62/904,886, filed Sep. 24, 2019. The entire contents of each of these prior applications are hereby incorporated herein by reference.

GOVERNMENT RIGHTS STATEMENT

This invention was made with U.S. Government support under R01CA87658, R01CA154809, R03CA238559 awarded by National Institutes of Health. The U.S. Government has certain rights in the invention.

FIELD OF THE INVENTION

The present application relates generally to compositions for treating diseases that arise from inappropriate activity of proteins containing a methyl-lysine. More particularly, the compositions comprise a genus of bicyclic systems that are inhibitors of the chromodomain of a CBX protein known to bind to methyl-lysine post-translational modifications (PTMs) of histones.

BACKGROUND OF THE INVENTION

Chromodomain (chromatin organization modifier) is a 40-50 amino acid residue conserved protein module commonly found in proteins that bind to methyl-lysine PTMs, and subsequently dictate gene silencing via chromatin compaction. The chromodomain family of proteins comprises of 29 members of which the five human polycomb (Pc) paralog proteins (CBX2/4/6/7/8) are part of multi-protein Polycomb Repressive Complex 1 (PRC1). PRC1 is known to play a role in gene repression, due to its Pc paralog component binding to a specific PTM—the trimethyllysine residues on histone 3 ($H_3K27me3$).

CBX7 from PRC1 is the best-studied protein of the CBX family, originally identified in a functional cDNA screening designed to prolong life span of normal human prostate epithelial cells by repressing the INK4a/ARF locus. This locus encodes key regulators for two tumor suppressors: p53- and retinoblastoma tumor suppressor (Rb). Knockdown of CBX7 triggers $p^{14}ARF/p53$- and $p^{16}INK4a/Rb$-dependent impairment of cell growth, hence highlighting the role of CBX7 in tumorigenesis. Several reports [Oncogene (2005) 24(36):5543-5551; Proc Natl Acad Sci USA (2007) 104(13):5389-5394; and Mol Cell (2010) 38(5):662-674] have established that elevated levels of CBX7 can be directly linked to prostate cancer progression. Aberrant expression of CBX7 is also associated with ovarian cancer and B-cell lymphoma.

Small molecules capable of modulating CBX7 chromodomain-$H_3K27me3$ interaction can serve a powerful research tool to study CBX7 functions in gene transcriptional regulation in biology and diseases, and for development of novel anticancer therapeutics. Zhou and colleagues [ACS Medicinal Chemistry Letters (2016) 7(6):601-605] reported MS351, a potent small molecule inhibitor for the CBX7ChD. MS351 has been shown to be selective for CBX7ChD (over CBX2/4/6/8), and de-repress $p^{16}INK4a$ in prostate cancer cells by inhibiting CBX7 in its functionally active state.

Based on the crystal structure of the MS351/CBX7 complex and using structure-guided rational design, we have recently synthesized a set of MS351 analogs that will be reported in this application.

SUMMARY OF THE INVENTION

A genus of bicyclic inhibitors of CBX chromodomains has now been found. The compounds described herein exhibit anti-proliferative effects, and are useful in the treatment of a variety of disorders, including as a monotherapy in cancer treatment, or used in combination with other drugs to restore sensitivity to chemotherapy where resistance has developed.

In one aspect, the invention relates to compounds of formula (I):

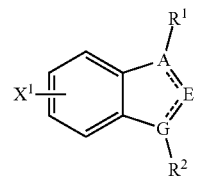

wherein:
- ----- represents a single bond or a double bond independently in each instance;
- A is N or C;
- E is C=$NR^3$ or C—$R^4$;
  wherein:
  - $R^3$ is H or ($C_1$-$C_3$)alkyl; and
  - $R^4$ is H or ($C_1$-$C_3$)alkyl;
- G is N or C;
- with the proviso that at least one of A and G is N;
- $X^1$ is selected from H, halogen, ($C_1$-$C_4$)alkoxy, ($C_1$-$C_4$)alkyl, ($C_1$-$C_4$)perfluoroalkyl, hydroxy, ($C_1$-$C_4$)perfluoroalkoxy, and amino;
- $R^1$ is —$CR^5R^6$-$R^9$;
  wherein:
  - $R^5$ and $R^6$ are independently selected from H and methyl;
  - $R^9$ is selected from optionally substituted phenyl and optionally substituted nitrogen-containing 5-membered ring heteroaryl;
  wherein:
    - said optionally substituted phenyl optionally includes one, two, or three substituents selected from ($C_1$-$C_4$)alkyl, halogen, ($C_1$-$C_4$)haloalkyl, nitro, carboxy, amino, ($C_1$-$C_4$)alkylamino, and ($C_1$-$C_4$)dialkylamino; said optionally substituted nitrogen-containing 5-membered ring heteroaryl optionally includes a substituent selected from —($CR^{10}R^{11}$)$_{n2}$—$R^{14}$, ($C_1$-$C_4$)hydrocarbyl, and ($C_1$-$C_4$)haloalkyl;
    wherein:
      - $R^{10}$ and $R^{11}$ are independently selected from H and ($C_1$-$C_3$)alkyl;
      - n2 is 0, 1, 2, or 3; and
      - $R^{14}$ is optionally substituted phenyl, wherein said optionally substituted phenyl optionally includes one, two, or three substituents selected from (C$_1$-C$_3$)alkyl, halogen, (C$_1$-C$_3$)alkoxy, (C$_1$-C$_3$)haloalkoxy, and (C$_1$-C$_3$)haloalkyl; and R$^2$ is —(CR$^{15}$R$^{16}$)—CH(OH)—R$^{19}$;

wherein:
R$^{15}$ and R$^{16}$ are independently selected from H and (C$_1$-C$_3$)alkyl; and
R$^{19}$ is optionally substituted phenyl, wherein one to three optional substituents of the phenyl ring are selected from halogen, (C$_1$-C$_4$)alkyl, (C$_1$-C$_4$)haloalkyl, nitro, carboxy, amino, (C$_1$-C$_4$)alkylamino, and (C$_1$-C$_4$)dialkylamino.

In a second aspect, the invention relates to a method of treating prostate cancer, ovarian cancer, or B-cell lymphoma in a patient comprising administering to the patient a therapeutically effective amount of a compound of formula (III):

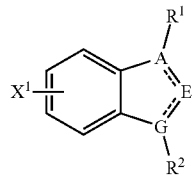

wherein:
===== represents a single bond or a double bond independently in each instance;
A is N or C;
E is C═NR$^3$ or C—R$^4$;
wherein:
R$^3$ is H or (C$_1$-C$_3$)alkyl; and
R$^4$ is H or (C$_1$-C$_3$)alkyl;
G is N or C;
with the proviso that at least one of A and G is N;
X$^1$ is selected from H, halogen, (C$_1$-C$_4$)alkoxy, (C$_1$-C$_4$) alkyl, (C$_1$-C$_4$)perfluoroalkyl, hydroxy, (C$_1$-C$_4$)perfluoroalkoxy, and amino;
R$^1$ is —CR$^5$R$^6$—R$^9$;
wherein:
R$^5$ and R$^6$ are independently selected from H and methyl;
R$^9$ is selected from optionally substituted phenyl and optionally substituted nitrogen-containing 5-membered ring heteroaryl;
wherein:
said optionally substituted phenyl optionally includes one, two, or three substituents selected from (C$_1$-C$_4$)alkyl, halogen, (C$_1$-C$_4$)haloalkyl, nitro, carboxy, amino, (C$_1$-C$_4$)alkylamino, and (C$_1$-C$_4$)dialkylamino; said optionally substituted nitrogen-containing 5-membered ring heteroaryl optionally includes a substituent selected from —(CR$^{10}$R$^{11}$)$_{n2}$—R$^{14}$, (C$_1$-C$_4$) hydrocarbyl, and (C$_1$-C$_4$)haloalkyl;
wherein:
R$^{10}$ and R$^{11}$ are independently selected from H and (C$_1$-C$_3$)alkyl;
n2 is 0, 1, 2, or 3; and
R$^{14}$ is optionally substituted phenyl, wherein said optionally substituted phenyl optionally includes one, two, or three substituents selected from (C$_1$-C$_3$)alkyl, halogen, (C$_1$-C$_3$)alkoxy, (C$_1$-C$_3$)haloalkoxy, and (C$_1$-C$_3$)haloalkyl; and
R$^2$ is —(CR$^{15}$R$^{16}$)—CH(OH)—R$^{19}$;

wherein:
R$^{15}$ and R$^{16}$ are independently selected from H and (C$_1$-C$_3$)alkyl; and
R$^{19}$ is optionally substituted phenyl, wherein one to three optional substituents of the phenyl ring are selected from halogen, (C$_1$-C$_4$)alkyl, (C$_1$-C$_4$)haloalkyl, nitro, carboxy, amino, (C$_1$-C$_4$)alkylamino, and (C$_1$-C$_4$)dialkylamino;
with the proviso that formula (III) does not include:

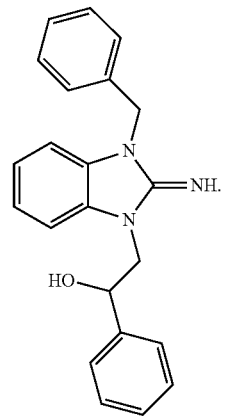 [SMILES: N=c1n(Cc2ccccc2)c2ccccc2n1CC(O)c1ccccc1]

In a third aspect, the invention relates to a pharmaceutical composition comprising a pharmaceutically acceptable carrier and a compound described herein.

In a fourth aspect, the invention relates to method for treating a disease or disorder arising from inappropriate activity of proteins containing a methyl-lysine residue. The method comprises administering to a patient in need thereof a therapeutically effective amount of a compound described herein.

In a fifth aspect, the invention relates to a method for inhibiting chromodomain in a cell. The method comprises contacting the cell with an inhibitory amount of a compound described herein.

In a sixth aspect, the invention relates to a method for inhibiting a CBX protein. The method comprises bringing the CBX protein into contact with a compound described herein.

DETAILED DESCRIPTION OF THE INVENTION

Substituents are generally defined when introduced and retain that definition throughout the specification and in all independent claims.

In a composition and method aspect, the invention relates to compounds of formula (I):

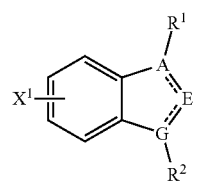

as described above.

In some embodiments, the invention relates in a compositional aspect to compounds of formula (II):

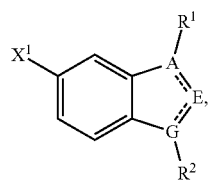

wherein substituents are as described above for formula (I).

In some embodiments, the invention relates in a method aspect to compounds of formula (III):

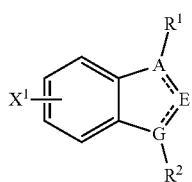

as described above.

In some embodiments, the invention relates in a method aspect to compounds of formula (IV):

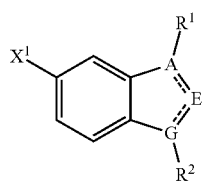

as described above for formula (III).

In the embodiments described below, the compound may be of formula I, II, III, or IV, unless otherwise indicated.

In some embodiments, A is nitrogen (N). In other embodiments, A is carbon (C).

In some embodiments, E is C=$NR^3$. In embodiments where E is C=$NR^3$, $R^3$ is hydrogen (H) or ($C_1$-$C_3$)alkyl. In other embodiments, E is C—$R^4$. In embodiments where E is C—$R^4$, $R^4$ is hydrogen (H) or ($C_1$-$C_3$)alkyl.

In some embodiments, G is nitrogen (N). In other embodiments, G is carbon (C).

In all embodiments of the present invention, at least one of A and G is nitrogen (N).

In all embodiments of the present invention, ===== represents a single bond or a double bond independently in each instance. As non-limiting examples, the bond between A and E may be a single bond and the bond between E and G may also be a single bond; alternatively, one of the bonds between either A and E or between E and G may be a double bond. It will be readily understood by a person having skill in the art that the bond between A and E and the bond between E and G cannot both simultaneously be double bonds when within a 5-membered ring as depicted.

In some embodiments, $X^1$ is hydrogen (H). In other embodiments, $X^1$ is halogen. In still other embodiments, $X^1$ is fluoro or chloro. In yet other embodiments, $X^1$ is ($C_1$-$C_4$) alkoxy, in particular methoxy. In some embodiments, $X^1$ is ($C_1$-$C_4$)alkyl. In other embodiments, $X^1$ is ($C_1$-$C_4$)perfluoroalkyl. In yet other embodiments, $X^1$ is hydroxy. In some embodiments, $X^1$ is ($C_1$-$C_4$)perfluoroalkoxy. In other embodiments, $X^1$ is amino.

In various embodiments, $R^1$ is —$CR^5R^6$-$R^9$. In these embodiments, $R^5$ and $R^6$ are independently selected from hydrogen (H) and methyl. In some embodiments, both $R^5$ and $R^6$ are hydrogen (H). In some of these embodiments, $R^9$ is optionally substituted phenyl, wherein said optionally substituted phenyl optionally includes one, two, or three substituents selected from ($C_1$-$C_4$)alkyl, halogen, ($C_1$-$C_4$) haloalkyl, nitro, carboxy, amino, ($C_1$-$C_4$)alkylamino, and ($C_1$-$C_4$)dialkylamino. In more particular embodiments when $R^9$ is optionally substituted phenyl, $R^9$ is

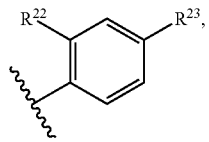

wherein $R^{22}$ is selected from H, methyl, halogen, and trifluoromethyl. In some of these embodiments, $R^{23}$ is H or halogen. In some embodiments, $R^{22}$ is methyl and $R^{23}$ is H.

In other embodiments, $R^9$ is optionally substituted nitrogen-containing 5-membered ring heteroaryl. In these embodiments, said optionally substituted nitrogen-containing 5-membered ring heteroaryl optionally includes a substituent selected from —$(CR^{10}R^{11})_{n2}$—$R^{14}$, ($C_1$-$C_4$)hydrocarbyl, and ($C_1$-$C_4$)haloalkyl.

In embodiments where $R^9$ is a substituted nitrogen-containing 5-membered ring heteroaryl and said nitrogen-containing 5-membered ring heteroaryl includes a substituent—$(CR^{10}R^{11})_{n2}$—$R^{14}$, $R^{10}$ and $R^{11}$ are independently selected from hydrogen (H) and ($C_1$-$C_3$)alkyl, n2 is 0, 1, 2, or 3, and $R^{14}$ is optionally substituted phenyl. The optionally substituted phenyl optionally includes one, two, or three substituents selected from ($C_1$-$C_3$)alkyl, halogen, ($C_1$-$C_3$)alkoxy, ($C_1$-$C_3$)haloalkoxy, and ($C_1$-$C_3$)haloalkyl. In some embodiments, both $R^{10}$ and $R^{11}$ are hydrogen (H).

In more particular embodiments when $R^9$ is optionally substituted nitrogen-containing 5-membered ring heteroaryl, $R^9$ is

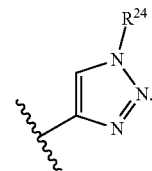

In some of these embodiments, $R^{24}$ is selected from:

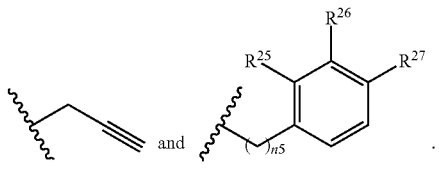

In some embodiments when $R^{24}$ is

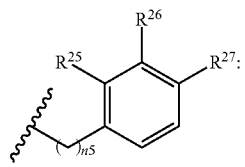

$R^{25}$ is selected from H, methyl, halogen, and methoxy; $R^{26}$ is selected from H, methyl, halogen, and methoxy; $R^{27}$ is selected from H, methyl, halogen, and methoxy; and n5 is 0, 1, or 2. In some embodiments, n5 is 1. In some embodiments, one of $R^{25}$, $R^{26}$, and $R^{27}$ is selected from methyl, fluoro, chloro, and methoxy, and the other two of $R^{25}$, $R^{26}$, and $R^{27}$ are hydrogen (H). In other embodiments, all of $R^{25}$, $R^{26}$, and $R^{27}$ are hydrogen (H).

In various embodiments, $R^2$ is —$(CR^{15}R^{16})$—CH(OH)—$R^{19}$. In these embodiments, $R^{15}$ and $R^{16}$ are independently selected from H and $(C_1-C_3)$alkyl and $R^{19}$ is optionally substituted phenyl, wherein one to three optional substituents of the phenyl ring are selected from halogen, $(C_1-C_4)$alkyl, $(C_1-C_4)$haloalkyl, nitro, carboxy, amino, $(C_1-C_4)$alkylamino, and $(C_1-C_4)$dialkylamino.

In particular, $R^{19}$ is

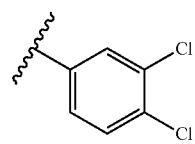 [SMILES: *c1ccc(Cl)c(Cl)c1]

when not explicitly disclaimed herein. In some embodiments, both $R^{15}$ and $R^{16}$ are hydrogen (H).

For formulas (I) and (II), the following compounds are not included:

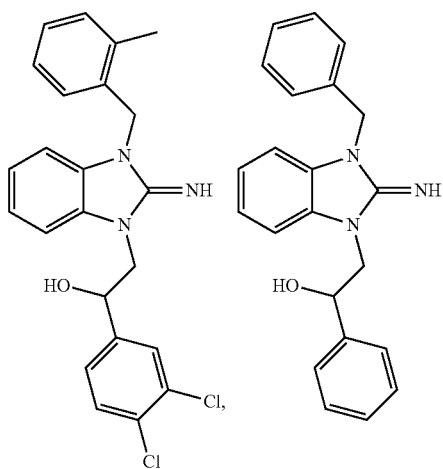

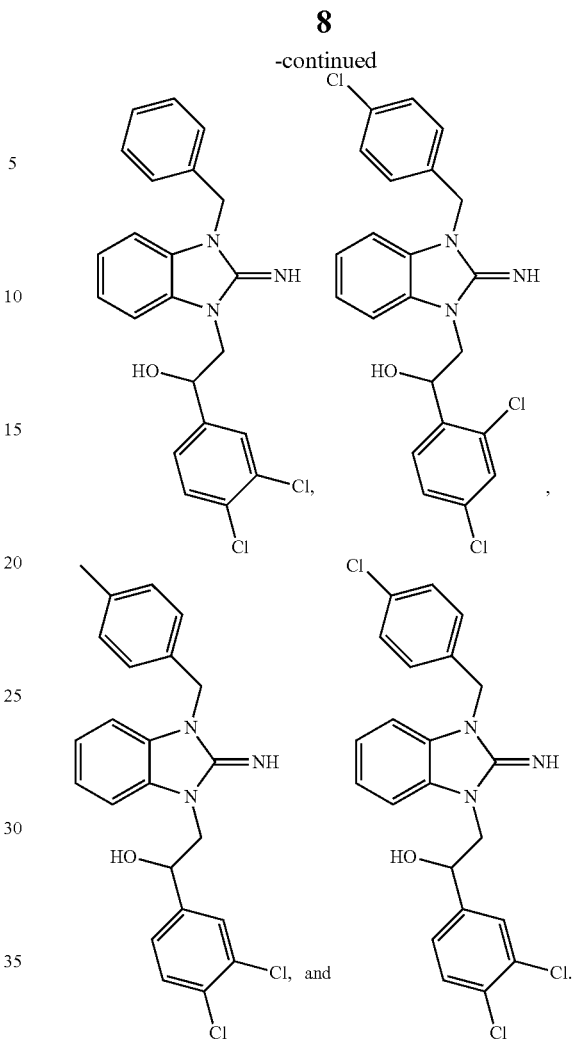

For formulas (III) and (IV), the following compound is not included:

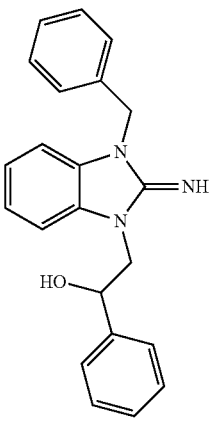 [SMILES: N=c1n(Cc2ccccc2)c2ccccc2n1CC(O)c1ccccc1]

In summary, the invention relates to:

[1]. A compound of formula I, II, III, or IV.

[2] A compound according to [1] above wherein ===== represents a single bond or a double bond in each instance, with the provisos that at least one of A and G is N and at least one of the bonds designated as ===== in formulas I, II, III, or IV must be a single bond.

[3] A compound according to [1] or [2] above wherein A is N.

[4] A compound according to [1] or [2] above wherein A is C.

[5] A compound according to [1] through [4] above wherein G is N.

[6] A compound according to [1] through [3] above wherein G is C.

[7] A compound according to [1] through [3] and [5] above wherein E is C=NR³.

[8] A compound according to [7] above wherein R³ is H.

[9] A compound according to [7] above wherein R³ is (C₁-C₃)alkyl.

[10] A compound according to [1] through [6] above wherein E is C—R⁴.

[11] A compound according to [10] above wherein R⁴ is H.

[12] A compound according to [10] above wherein R⁴ is (C₁-C₃)alkyl.

[13] A compound according to [1] through [12] above wherein X¹ is H.

[14] A compound according to [1] through [12] above wherein X¹ is halogen.

[15] A compound according to [1] through [12] above wherein X¹ is (C₁-C₄)alkoxy.

[16] A compound according to [1] through [12] above wherein X¹ is (C₁-C₄)alkyl.

[17] A compound according to [1] through [12] above wherein X¹ is (C₁-C₄)perfluoroalkyl.

[18] A compound according to [1] through [12] above wherein X¹ is hydroxy.

[19] A compound according to [1] through [12] above wherein X¹ is (C₁-C₄)perfluoroalkoxy.

[20] A compound according to [1] through [12] above wherein X¹ is amino.

[21] A compound according to [1] through [20] above wherein R¹ is —CR⁵R⁶-R⁹.

[22] A compound according to [21] above wherein R⁵ is H.

[23] A compound according to [21] above wherein R⁵ and R⁶ are independently chosen from H or methyl.

[24] A compound according to [1] through [23] above wherein R⁹ is optionally substituted phenyl, and wherein said optionally substituted phenyl optionally includes one, two, or three substituents selected from (C₁-C₄)alkyl, halogen, (C₁-C₄)haloalkyl, nitro, carboxy, amino, (C₁-C₄)alkylamino, and (C₁-C₄)dialkylamino.

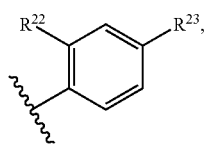

[25] A compound according to [24] above wherein R⁹ is R²² is selected from H, methyl, halogen, and trifluoromethyl, and R²³ is H or halogen.

[26] A compound according to [1] through [23] above wherein R⁹ is optionally substituted nitrogen-containing 5-membered ring heteroaryl, and wherein said optionally substituted nitrogen-containing 5-membered ring heteroaryl optionally includes a substituent selected from —(CR¹⁰R¹¹)_{n2}—R¹⁴, (C₁-C₄)hydrocarbyl, and (C₁-C₄)haloalkyl.

[27] A compound according to [26] above wherein R¹⁰ and R¹¹ are independently selected from H and (C₁-C₃)alkyl.

[28] A compound according to [27] above wherein n2 is 0, 1, 2, or 3.

[29] A compound according to [28] above wherein R¹⁴ is optionally substituted phenyl, and wherein said optionally substituted phenyl optionally includes one, two, or three substituents selected from (C₁-C₃)alkyl, halogen, (C₁-C₃)alkoxy, (C₁-C₃)haloalkoxy, and (C₁-C₃)haloalkyl.

[30] A compound according to [29] above wherein R⁹ is

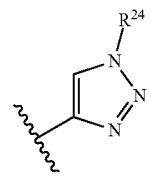

and R²⁴ is

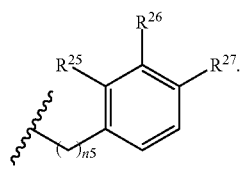

[31] A compound according to [30] above wherein R²⁵, R²⁶, and R²⁷ are independently selected from H, methyl, halogen, and methoxy.

[32] A compound according to [31] above wherein n5 is 0, 1, or 2.

[33] A compound according to [1] through [32] above wherein R² is —(CR¹⁵R¹⁶)—CH(OH)—R¹⁹.

[34] A compound according to [33] above wherein R¹⁵ and R¹⁶ are independently selected from H and (C₁-C₃) alkyl.

[35] A compound according to [34] above wherein R¹⁹ is optionally substituted phenyl, and wherein one to three optional substituents of the phenyl ring are selected from halogen, (C₁-C₄)alkyl, (C₁-C₄)haloalkyl, nitro, carboxy, amino, (C₁-C₄)alkylamino, and (C₁-C₄)dialkylamino.

[36] A compound according to [35] above wherein R¹⁹ is

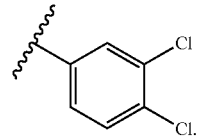 [SMILES: *c1ccc(Cl)c(Cl)c1]

The compounds described herein may contain one or more asymmetric centers and may thus give rise to enantiomers, diastereomers, and other stereoisomeric forms which may be defined in terms of absolute stereochemistry as (R)- or (S)-. The present invention is meant to include all such possible diastereomers as well as their racemic and optically pure forms. Optically active (R)- and (S)-isomers may be prepared using homo-chiral synthons or homo-chiral reagents, or optically resolved using conventional techniques. When the compounds described herein contain centers of geometric asymmetry such as

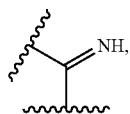 [SMILES: *C(*)=N]

it is intended to include both (E)- and (Z)-geometric isomers. Likewise, all tautomeric forms are intended to be included.

The graphic representations of racemic, ambiscalemic and scalemic or enantiomerically pure compounds used herein are a modified version of the denotations taken from Maehr J. Chem. Ed. 62, 114-120 (1985): simple lines provide no information about stereochemistry and convey only connectivity; solid and broken wedges are used to denote the absolute configuration of a chiral element; solid and broken bold lines are geometric descriptors indicating the relative configuration shown but not necessarily denoting racemic character; and wedge outlines and dotted or broken lines denote enantiomerically pure compounds of indeterminate absolute configuration. For example, the graphic representation:

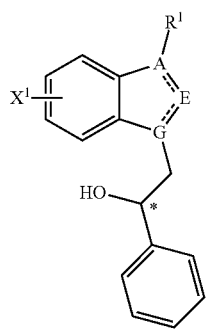

indicates no information about the stereochemistry of the chiral center (marked with an asterisk). The graphic representation:

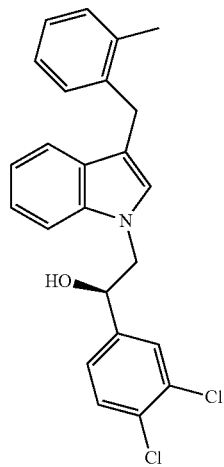 [SMILES: Cc1ccccc1Cc1cn(C[C@H](O)c2ccc(Cl)c(Cl)c2)c2ccccc12]

indicates pure (R)-1-(3,4-dichlorophenyl)-2-(3-(2-methylbenzyl)-1H-indol-1-yl)ethan-1-ol. For the purpose of the present disclosure, a "pure" or "substantially pure" enantiomer is intended to mean that the enantiomer is at least 95% of the configuration shown and 5% or less of the other enantiomer. In the text describing the stereochemistry of the examples, the convention of Chemical Abstracts is used.

It may be found upon examination that certain species and genera are not patentable to the inventors in this application. In this case, the exclusion of species and genera in applicants' claims are to be considered artifacts of patent prosecution and not reflective of the inventors' concept or description of their invention, which encompasses all members of the genus/species that are not in the public's possession.

As used herein, and as would be understood by the person of skill in the art, the recitation of "a compound"—unless expressly further limited—is intended to include salts of that compound. In a particular embodiment, the term "compound of formula" refers to the compound or a pharmaceutically acceptable salt thereof.

The term "pharmaceutically acceptable salt" refers to salts prepared from pharmaceutically acceptable non-toxic acids or bases including inorganic acids and bases and organic acids and bases. When the compounds of the present invention are basic, salts may be prepared from pharmaceutically acceptable non-toxic acids including inorganic and organic acids. Suitable pharmaceutically acceptable acid addition salts for the compounds of the present invention include acetic, adipic, alginic, ascorbic, aspartic, benzenesulfonic (besylate), benzoic, boric, butyric, camphoric, camphorsulfonic, carbonic, citric, ethanedisulfonic, ethanesulfonic, ethylenediaminetetraacetic, formic, fumaric, glucoheptonic, gluconic, glutamic, hydrobromic, hydrochloric, hydroiodic, hydroxynaphthoic, isethionic, lactic, lactobionic, laurylsulfonic, maleic, malic, mandelic, methanesulfonic, mucic, naphthylenesulfonic, nitric, oleic, pamoic, pantothenic, phosphoric, pivalic, polygalacturonic, salicylic, stearic, succinic, sulfuric, tannic, tartaric acid, teoclatic, p-toluenesulfonic, and the like. When the compounds contain an acidic side chain, suitable pharmaceutically acceptable base addition salts for the compounds of the present invention include, but are not limited to, metallic salts made from aluminum, calcium, lithium, magnesium, potassium, sodium and zinc or organic salts made from lysine, arginine, N,N'-dibenzylethylenediamine, chloroprocaine, choline, diethanolamine, ethylenediamine, meglumine (N-methylglucamine) and procaine. Further pharmaceutically acceptable salts include, when appropriate, nontoxic ammonium cations and carboxylate, sulfonate and phosphonate anions attached to alkyl having from 1 to 20 carbon atoms.

Also provided herein is a pharmaceutical composition comprising a compound disclosed above, or a pharmaceutically acceptable salt form thereof, and a pharmaceutically acceptable carrier or diluent.

While it may be possible for the compounds of the formulae disclosed herein to be administered as the raw chemical, it is preferable to present them as a pharmaceutical composition. According to a further aspect, the present invention provides a pharmaceutical composition comprising a compound of formula I, formula II, formula III, or formula IV, or a pharmaceutically acceptable salt thereof, together with one or more pharmaceutically carriers thereof and optionally one or more other therapeutic ingredients. The carrier(s) must be "acceptable" in the sense of being compatible with the other ingredients of the formulation and not deleterious to the recipient thereof.

The formulations include those suitable for oral, parenteral (including subcutaneous, intradermal, intramuscular, intravenous and intraarticular), rectal and topical (including dermal, buccal, sublingual and intraocular) administration. The most suitable route may depend upon the condition and disorder of the recipient. The formulations may conveniently be presented in unit dosage form and may be prepared by any of the methods well known in the art of pharmacy. All methods include the step of bringing into association a compound of the disclosed formulas or a pharmaceutically acceptable salt thereof ("active ingredient") with the carrier which constitutes one or more accessory ingredients. In general, the formulations are prepared by uniformly and intimately bringing into association the active ingredient with liquid carriers or finely divided solid carriers or both and then, if necessary, shaping the product into the desired formulation.

Formulations of the present invention suitable for oral administration may be presented as discrete units such as capsules, cachets or tablets each containing a predetermined amount of the active ingredient; as a powder or granules; as a solution or a suspension in an aqueous liquid or a non-aqueous liquid; or as an oil-in-water liquid emulsion or a water-in-oil liquid emulsion. The active ingredient may also be presented as a bolus, electuary or paste.

A tablet may be made by compression or molding, optionally with one or more accessory ingredients. Compressed tablets may be prepared by compressing in a suitable machine the active ingredient in a free-flowing form such as a powder or granules, optionally mixed with a binder, lubricant, inert diluent, lubricating, surface active or dispersing agent. Molded tablets may be made by molding in a suitable machine a mixture of the powdered compound moistened with an inert liquid diluent. The tablets may optionally be coated or scored and may be formulated so as to provide sustained, delayed or controlled release of the active ingredient therein.

Formulations for parenteral administration include aqueous and non-aqueous sterile injection solutions which may contain anti-oxidants, buffers, bacteriostats and solutes which render the formulation isotonic with the blood of the intended recipient. Formulations for parenteral administration also include aqueous and non-aqueous sterile suspensions, which may include suspending agents and thickening agents. The formulations may be presented in unit-dose of multi-dose containers, for example sealed ampoules and vials, and may be stored in a freeze-dried (lyophilized) condition requiring only the addition of a sterile liquid carrier, for example saline, phosphate-buffered saline (PBS) or the like, immediately prior to use. Extemporaneous injection solutions and suspensions may be prepared from sterile powders, granules and tablets of the kind previously described.

It will be recognized that the compounds of this invention can exist in radiolabeled form, i.e., the compounds may contain one or more atoms containing an atomic mass or mass number different from the atomic mass or mass number usually found in nature. Radioisotopes of hydrogen, carbon, phosphorous, fluorine, and chlorine include $^2$H, $^3$H, $^{13}$C, $^{14}$C, $^{15}$N, $^{35}$S, $^{18}$F, and $^{36}$Cl, respectively. Compounds that contain those radioisotopes and/or other radioisotopes of other atoms are within the scope of this invention. Tritiated, i.e. $^3$H, and carbon-14, i.e., $^{14}$C, radioisotopes are particularly preferred for their ease in preparation and detectability. Compounds that contain isotopes $^{11}$C, $^{13}$N, $^{15}$O and $^{18}$F are well suited for positron emission tomography. Radiolabeled compounds of the disclosed formulas of this invention and prodrugs thereof can generally be prepared by methods well known to those skilled in the art. Conveniently, such radiolabeled compounds can be prepared by carrying out the procedures disclosed in the Examples and Schemes by substituting a readily available radiolabeled reagent for a non-radiolabeled reagent.

The compounds described herein can also be administered in combination with existing methods of treating cancers, for example by chemotherapy, irradiation, or surgery. Thus, there is further provided a method of treating cancer comprising administering an effective amount of a compound described herein to a patient, wherein a therapeutically effective amount of one or more additional cancer chemotherapeutic agents are administered to the patient.

Unless defined otherwise, all technical and scientific terms used herein have the same meaning as is commonly understood by one of ordinary skill in the art to which this disclosure belongs. A comprehensive list of abbreviations utilized by organic chemists (i.e. persons of ordinary skill in the art) appears in the first issue of each volume of the Journal of Organic Chemistry. The list, which is typically presented in a table entitled "Standard List of Abbreviations" is incorporated herein by reference. In the event that there is a plurality of definitions for terms cited herein, those in this section prevail unless otherwise stated.

As used herein, the terms "comprising" and "including" or grammatical variants thereof are to be taken as specifying the stated features, integers, steps or components but do not preclude the addition of one or more additional features, integers, steps, components or groups thereof. This term encompasses the terms "consisting of" and "consisting essentially of".

The phrase "consisting essentially of" or grammatical variants thereof when used herein are to be taken as specifying the stated features, integers, steps or components but do not preclude the addition of one or more additional features, integers, steps, components or groups thereof, but only if the additional features, integers, steps, components or groups thereof do not materially alter the basic and novel characteristics of the claimed composition or method.

A "patient," as used herein, includes both humans and other animals, particularly mammals. Thus the methods are applicable to both human therapy and veterinary applications. In some embodiments, the patient is a mammal, for example, a primate. In some embodiments, the patient is a human.

Treatment can involve administering a compound described herein to a patient diagnosed with a disease, and may involve administering the compound to a patient who does not have active symptoms. Conversely, treatment may involve administering the compositions to a patient at risk of developing a particular disease, or to a patient reporting one or more of the physiological symptoms of a disease, even though a diagnosis of this disease may not have been made.

The terms "administer", "administering" or "administration" in reference to a dosage form of the invention refers to the act of introducing the dosage form into the system of subject in need of treatment. When a dosage form of the invention is given in combination with one or more other active agents (in their respective dosage forms), "administration" and its variants are each understood to include concurrent and/or sequential introduction of the dosage form and the other active agents. Administration of any of the described dosage forms includes parallel administration, co-administration or sequential administration. In some situations, the therapies are administered at approximately the same time, e.g., within about a few seconds to a few hours of one another.

A "therapeutically effective" amount of the compounds described herein is typically one which is sufficient to achieve the desired effect and may vary according to the nature and severity of the disease condition, and the potency of the compound. It will be appreciated that different concentrations may be employed for prophylaxis than for treatment of an active disease. A therapeutic benefit is achieved with the amelioration of one or more of the physiological symptoms associated with the underlying disorder such that an improvement is observed in the patient, notwithstanding that the patient may still be afflicted with the underlying disorder.

Hydrocarbon includes alkyl, cycloalkyl, polycycloalkyl, alkenyl, alkynyl, aryl and combinations thereof. Examples include benzyl, phenethyl, cyclohexylmethyl, adamantyl, camphoryl and naphthylethyl. Hydrocarbyl refers to any substituent comprised of hydrogen and carbon as the only elemental constituents. Aliphatic hydrocarbons are hydrocarbons that are not aromatic; they may be saturated or unsaturated, cyclic, linear or branched. Examples of aliphatic hydrocarbons include isopropyl, 2-butenyl, 2-butynyl, cyclopentyl, norbornyl, etc. Aromatic hydrocarbons include benzene (phenyl), naphthalene (naphthyl), anthracene, etc.

Unless otherwise specified, alkyl (or alkylene) is intended to include linear or branched saturated hydrocarbon structures and combinations thereof. Alkyl refers to alkyl groups from 1 to 20 carbon atoms, preferably 1 to 10 carbon atoms, more preferably 1 to 6 carbon atoms. Examples of alkyl groups include methyl, ethyl, propyl, isopropyl, n-butyl, s-butyl, t-butyl and the like.

Unless otherwise specified, alkyl (or alkylene) is intended to include linear or branched saturated hydrocarbon structures and combinations thereof. Examples of alkyl groups include methyl, ethyl, propyl, isopropyl, n-butyl, s-butyl, t-butyl and the like.

Cycloalkyl is a subset of hydrocarbon and includes cyclic hydrocarbon groups of from 3 to 8 carbon atoms. Examples of cycloalkyl groups include cy-propyl, cy-butyl, cy-pentyl, norbornyl and the like.

Unless otherwise specified, the term "carbocycle" is intended to include ring systems in which the ring atoms are all carbon but of any oxidation state. Thus ($C_3$-$C_{10}$) carbocycle refers to both non-aromatic and aromatic systems, including such systems as cyclopropane, benzene and cyclohexene; ($C_8$-$C_{12}$) carbopolycycle refers to such systems as norbornane, decalin, indane and naphthalene. Carbocycle, if not otherwise limited, refers to monocycles, bicycles and polycycles.

Heterocycle means an aliphatic or aromatic carbocycle residue in which from one to four carbons is replaced by a heteroatom selected from the group consisting of N, O, and S. The nitrogen and sulfur heteroatoms may optionally be oxidized, and the nitrogen heteroatom may optionally be quaternized. Unless otherwise specified, a heterocycle may be non-aromatic (heteroaliphatic) or aromatic (heteroaryl). Examples of heterocycles include pyrrolidine, pyrazole, pyrrole, indole, quinoline, isoquinoline, tetrahydroisoquinoline, benzofuran, benzodioxan, benzodioxole (commonly referred to as methylenedioxyphenyl, when occurring as a substituent), tetrazole, morpholine, thiazole, pyridine, pyridazine, pyrimidine, thiophene, furan, oxazole, oxazoline, isoxazole, dioxane, tetrahydrofuran and the like. Examples of heterocyclyl residues include piperazinyl, piperidinyl, pyrazolidinyl, imidazolyl, imidazolinyl, imidazolidinyl, pyrazinyl, oxazolidinyl, isoxazolidinyl, thiazolidinyl, isothiazolyl, quinuclidinyl, isothiazolidinyl, benzimidazolyl, thiadiazolyl, benzopyranyl, benzothiazolyl, tetrahydrofuryl, tetrahydropyranyl, thienyl (also historically called thiophenyl), benzothienyl, thiamorpholinyl, oxadiazolyl, triazolyl and tetrahydroquinolinyl.

Alkoxy or alkoxyl refers to groups of from 1 to 20 carbon atoms, preferably 1 to 10 carbon atoms, more preferably 1 to 6 carbon atoms of a straight or branched configuration attached to the parent structure through an oxygen. Examples include methoxy, ethoxy, propoxy, isopropoxy and the like. Lower-alkoxy refers to groups containing one to four carbons. For the purpose of this application, alkoxy and lower alkoxy include methylenedioxy and ethylenedioxy.

The term "halogen" means fluorine, chlorine, bromine or iodine atoms. In one embodiment, halogen may be a fluorine or chlorine atom.

Unless otherwise specified, acyl refers to formyl and to groups of one or more carbon atoms of a straight, branched, cyclic configuration, saturated, unsaturated and aromatic and combinations thereof, attached to the parent structure through a carbonyl functionality. Examples include acetyl, benzoyl, propionyl, isobutyryl and the like. Lower-acyl refers to groups containing one to four carbons. The double bonded oxygen, when referred to as a substituent itself is called "oxo".

As used herein, the term "optionally substituted" may be used interchangeably with "unsubstituted or substituted". The term "substituted" refers to the replacement of one or more hydrogen atoms in a specified group with a specified radical. For example, substituted alkyl, aryl, cycloalkyl, heterocyclyl etc. refer to alkyl, aryl, cycloalkyl, or heterocyclyl wherein one or more H atoms in each residue are replaced with halogen, haloalkyl, alkyl, acyl, alkoxyalkyl, hydroxy lower alkyl, carbonyl, phenyl, heteroaryl, benzenesulfonyl, hydroxy, lower alkoxy, haloalkoxy, oxaalkyl, carboxy, alkoxycarbonyl [—C(=O)O-alkyl], alkoxycarbonylamino [ HNC(=O)O-alkyl], aminocarbonyl (also known as carboxamido) [—C(=O)NH$_2$], alkylaminocarbonyl [—C(=O)NH-alkyl], cyano, acetoxy, nitro, amino, alkylamino, dialkylamino, (alkyl)(aryl)aminoalkyl, alkylaminoalkyl (including cycloalkylaminoalkyl), dialkylaminoalkyl, dialkylaminoalkoxy, heterocyclylalkoxy, mercapto, alkylthio, sulfoxide, sulfone, sulfonylamino, alkylsulfinyl, alkylsulfonyl, acylaminoalkyl, acylaminoalkoxy, acylamino, amidino, aryl, benzyl, heterocyclyl, heterocyclylalkyl, phenoxy, benzyloxy, heteroaryloxy, hydroxyimino, alkoxyimino, oxaalkyl, aminosulfonyl, trityl, amidino, guanidino, ureido, benzyloxyphenyl, and benzyloxy. "Oxo" is also included among the substituents referred to in "optionally substituted"; it will be appreciated by persons of skill in the art that, because oxo is a divalent radical, there are circumstances in which it will not be appropriate as a substituent (e.g. on phenyl). In one embodiment, 1, 2, or 3 hydrogen atoms are replaced with a specified radical. In the case of alkyl and cycloalkyl, more than three hydrogen atoms can be replaced by fluorine; indeed, all available hydrogen atoms could be replaced by fluorine. In preferred embodiments, substituents are halogen, haloalkyl, alkyl, acyl, hydroxyalkyl, hydroxy, alkoxy, haloalkoxy, aminocarbonyl oxaalkyl, carboxy, cyano, acetoxy, nitro, amino, alkylamino, dialkylamino, alkylthio, alkylsulfinyl, alkylsulfonyl, alkylsulfonylamino arylsulfonyl, arylsulfonylamino, and benzyloxy.

Substituents R" are generally defined when introduced and retain that definition throughout the specification and in all independent claims.

Chemistry $^1$H Nuclear Magnetic Resonance (NMR) spectra were in all cases consistent with the proposed structures. $^{13}$CNMR spectra were in relevant cases consistent with the proposed structures. NMR were acquired on a Bruker® DRX-600 spectrometer at 600 MHz for ¹H and 125 MHz for ¹³C. Characteristic chemical shifts (δ) are expressed in parts per million downfield from tetramethylsilane (TMS) using conventional abbreviations for designation of major peaks: s, singlet; d, doublet; t, triplet; q, quartet; m, multiplet; br, broad. The following abbreviations have been used for common solvents: CDCl₃, deuterochloroform; D6-DMSO, deuterodimethyl-sulfoxide; MeOD, deuteromethanol.

Mass Spectra were in all cases consistent with the proposed structures. Liquid chromatography mass spectra, LCMS, with retention time, t, in minutes, min, and with mass to charge ratio, m/z, were recorded using peak elution time and electrospray ionization, ESI. LCMS analysis was performed on an Agilent® 1200 HPLC equipped with a Zorbax® 300SB-C$_{18}$ column held at 45° C., and a G1969A API-TOF in positive mode. Purity of all Examples was estimated at >95% by the DAD trace using the following LC method: solvent system (A)/(B) with 0.1% buffer=H₂O/acetonitrile with formic acid, flow rate=0.4 mL/min, and timed percentage of solvent B=0-1 min (1%), gradient 1-4 min (1-99%), 4-8 min (99%). Theoretical mass to charge ratios were calculated, Calcd, using ChemDraw® software. In relevant cases identifiable, radical cation of mass plus hydrogen, [M+H]⁺; mass plus sodium, [M+Na]⁺; two masses plus hydrogen, [2M+H]⁺; and two masses plus sodium, [2M+Na]⁺ data were recorded. In relevant Examples containing bromine atoms, the two stable isotopes ⁷⁹Br and ⁸¹Br, for [M+H]⁺ and [M+Na]⁺ were recorded.

Certain compounds of the Examples and Preparations were continuously irradiated at 2.45 gigahertz, GHz in a sealed microwave vial contained in a single mode Biotage®-Initiator cavity.

Certain compounds of the Examples and Preparations were purified using automated chromatography. Isocratic, or stepwise gradient mobile phases were used on normal-phase KP-Sil™ silica-gel columns attached to a Biotage®-Isolera Four instrument, monitoring UV Trace at 254 nm and 365 nm. Solvent systems utilized one, two, or three solvents (acetone, hexanes, EtOAc, or MeOH) running from nonpolar to polar steps. Eluting Solvent System (ESS) is the solvent step which eluted the product and is indicated below in the following format ESS=H:E (X:X), or the percentage of MeOH (%) in EtOAc. Additional monitoring by analytical thin layer chromatography (TLC) was performed employing EMD Chemicals Inc. TLC Silica gel 60 F$_{254}$ on aluminium, visualized either by exposure to UV light or, staining agents such as: iodine impregnated silica gel; 10% phosphomolybdic acid in EtOH and so on.

Scheme for Synthesis of Example 1

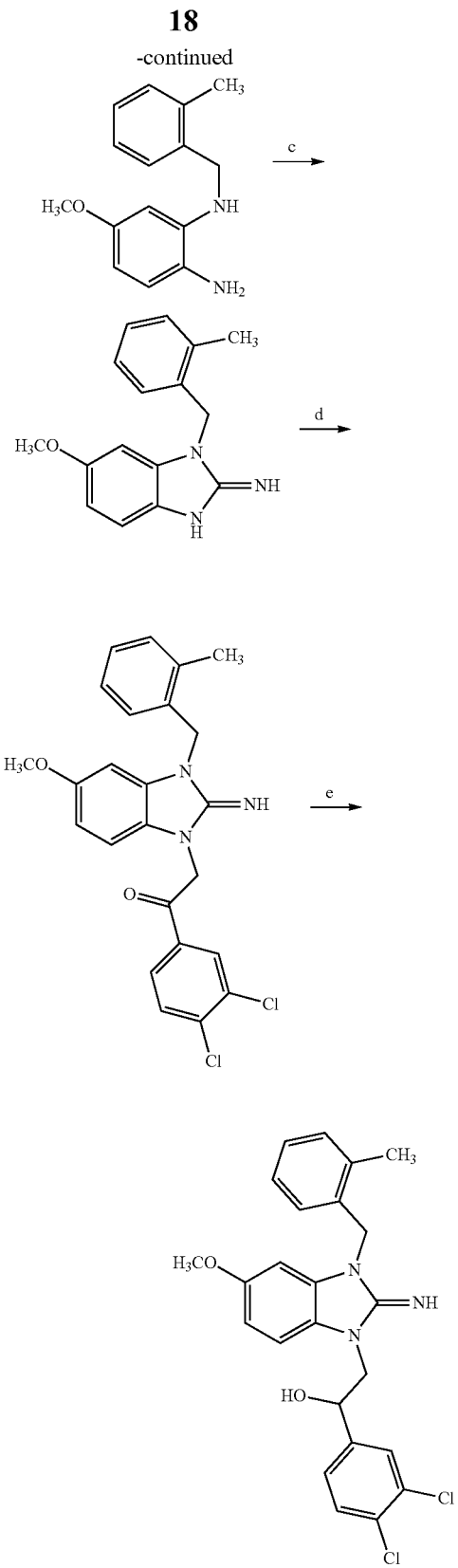

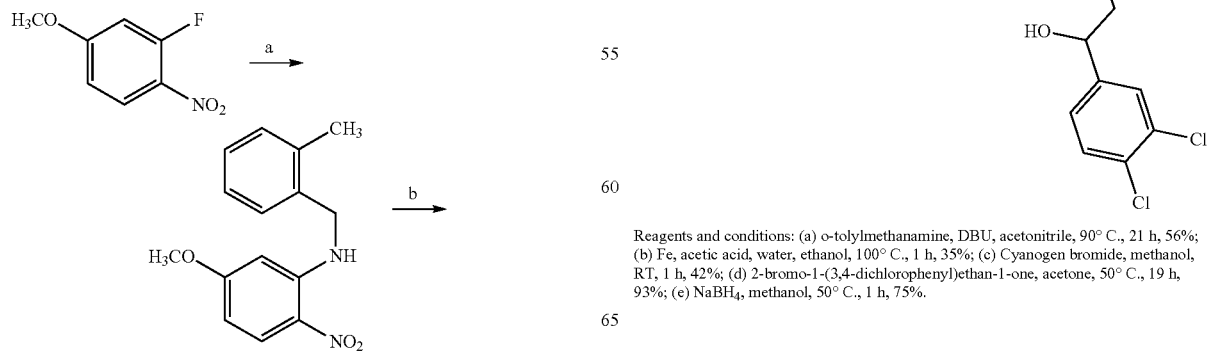

Reagents and conditions: (a) o-tolylmethanamine, DBU, acetonitrile, 90° C., 21 h, 56%; (b) Fe, acetic acid, water, ethanol, 100° C., 1 h, 35%; (c) Cyanogen bromide, methanol, RT, 1 h, 42%; (d) 2-bromo-1-(3,4-dichlorophenyl)ethan-1-one, acetone, 50° C., 19 h, 93%; (e) NaBH₄, methanol, 50° C., 1 h, 75%.

Experimental for Example 1

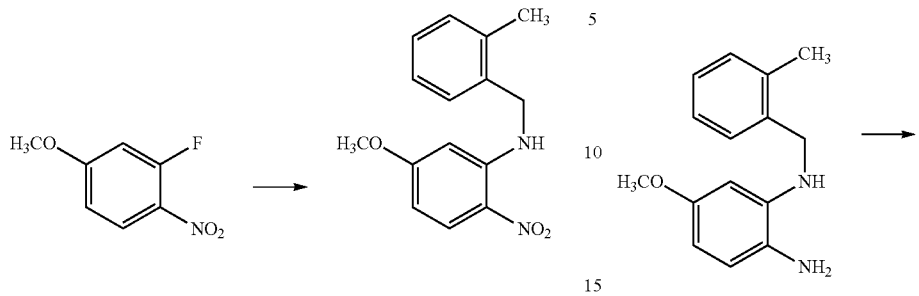

5-methoxy-N-(2-methylbenzyl)-2-nitroaniline 2-fluoro-4-methoxy-1-nitrobenzene (5.00 g, 29.2 mmol), o-tolylmethanamine (3.50 mL, 28.3 mmol), and 1,8-diazabicyclo[5.4.0]undec-7-ene (5.24 mL, 35.0 mmol) in acetonitrile (160.0 mL) were stirred in a sealed vessel at 90° C. for 21 h. The reaction mixture was concentrated under reduced pressure to give a residue, added silica and dichloromethane, concentrated to make dry silica plug. Purification by flash chromatography (SiO$_2$, 0%-17% ethyl acetate in hexanes) afforded 5-methoxy-N-(2-methylbenzyl)-2-nitroaniline (4.30 g, 56%) as a yellow solid. $^1$H NMR (600 MHz, CDCl$_3$) δ 8.50 (1H, br s), 8.17 (1H, d, J=9.6 Hz), 7.29-7.28 (1H, m), 7.26-7.19 (3H, m), 6.26 (1H, dd, J=9.6, 2.4 Hz), 6.14 (d, J=1.8 Hz), 4.46 (2H, d, J=4.8 Hz), 3.80 (3H, s), 2.39 (3H, s); $^{13}$C NMR (150 MHz, CDCl$_3$) δ 166.1, 147.7, 136.2, 134.8, 130.9, 129.5, 128.1, 128.0, 126.9, 126.5, 104.8, 96.0, 55.8, 45.7, 19.2; HRMS m/z 273.1229 ([M+H$^+$], C$_{15}$H$_{17}$N$_2$O$_3$ requires 273.1234).

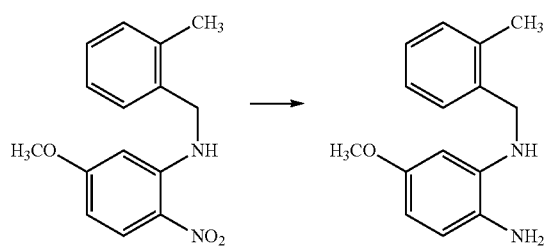 [SMILES: COc1ccc([N+](=O)[O-])c(NCc2ccccc2C)c1 ; COc1ccc(N)c(NCc2ccccc2C)c1]

5-methoxy-N$^1$-(2-methylbenzyl)benzene-1,2-diamine 5-methoxy-N-(2-methylbenzyl)-2-nitroaniline (0.200 g, 0.734 mmol), iron powder (0.614 g, 11.0 mmol), acetic acid (0.628 mL, 11.0 mmol) in ethanol (2.11 mL) and water (6.0 mL) were refluxed at 100° C. for 1 h. 2.5 N NaOH (17.0 mL) was added to the reaction mixture, and the suspension was filtered through a celite pad washing with boiling ethyl acetate. The organic layer was washed with brine, and concentrated to afford a residue. Purification by flash chromatography (SiO$_2$, 0%-17% ethyl acetate in hexanes) afforded 5-methoxy-N$^1$-(2-methylbenzyl)benzene-1,2-diamine (0.062 g, 35%) $^1$H NMR (600 MHz, CDCl$_3$) δ 7.34 (1H, d, J=7.2 Hz), 7.22-7.20 (3H, m), 6.70 (1H, d, J=7.8 Hz), 6.31 (1H, d, J=1.8 Hz), 6.22 (1H, d, J=6.0 Hz), 4.26 (2H, s), 3.76 (3H, s), 3.46 (2H, br s), 2.40 (3H, s); $^{13}$C NMR (150 MHz, CDCl) δ 155.6, 140.5, 137.0, 136.7, 130.6, 128.6, 127.6, 126.4, 126.3, 118.2, 101.2, 99.3, 55.7, 46.6, 19.1; LCMS m/z 243.1520 ([M+H$^+$], C$_{15}$H$_{19}$N$_2$O requires 243.1492).

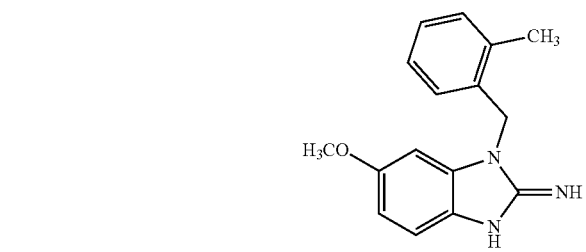

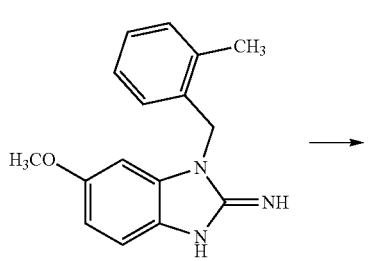

6-methoxy-1-(2-methylbenzyl)-1,3-dihydro-2H-benzo[d]imidazol-2-imine 5-methoxy-N$^1$-(2-methylbenzyl)benzene-1,2-diamine 3 (0.344 g, 1.42 mmol) in methanol (2.20 mL) at 0° C. was treated with cyanogen bromide (0.300 g, 2.83 mmol). The reaction mixture was maintained at RT for 1 h. The reaction mixture was partitioned between ethyl acetate, sat. aq. NaHCO$_3$, and water. Organic layer was washed with sat. aq. NaCl solution and concentrated to obtain a residue. Purification by flash chromatography (SiO$_2$, 25%-100% ethyl acetate in hexanes, 17:0.5:1 dichloromethane:methanol: 35% ammonium hydroxide) afforded 6-methoxy-1-(2-methylbenzyl)-1,3-dihydro-2H-benzo[d]imidazol-2-imine (0.159 g, 42%). $^1$H NMR (600 MHz, CDCl$_3$) δ 7.27 (1H, d, J=8.4 Hz), 7.199-7.192 (2H, m), 7.09-7.07 (1H, m), 6.75 (1H, d, J=7.8 Hz), 6.72 (1H, dd, J=8.4, 1.8 Hz), 6.49 (1H, d, J=1.8 Hz), 5.20 (2H, br s), 4.99 (2H s), 3.74 (3H, s), 2.31 (3H, s); $^{13}$C NMR (150 MHz, CDCl$_3$) δ 154.9, 153.9, 135.78, 135.71, 135.0, 133.2, 130.9, 128.1, 126.8, 125.8, 116.5, 108.8, 94.2, 56.1, 44.5, 19.3; LCMS m/z 268.6951 ([M+H$^+$], C$_{16}$H$_{18}$N$_3$O requires 268.1444).

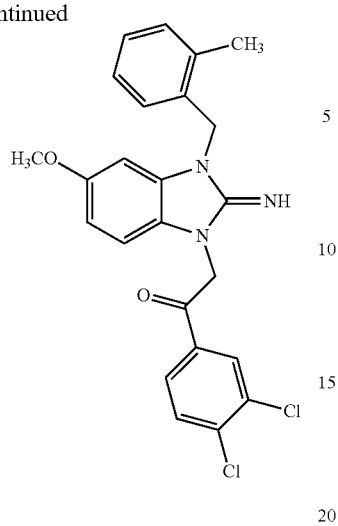

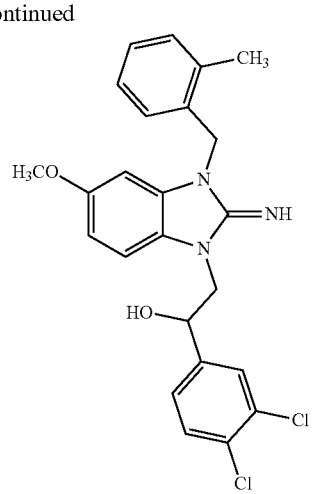

1-(3,4-dichlorophenyl)-2-(2-imino-5-methoxy-3-(2-methylbenzyl)-2,3-dihydro-1H-benzo[d]imidazol-1-yl)ethan-1-one 6-methoxy-1-(2-methylbenzyl)-1,3-dihydro-2H-benzo[d]imidazol-2-imine (0.105 g, 0.392 mmol) and 2-bromo-1-(3,4-dichlorophenyl)ethanone (0.105 g, 0.392 mmol) were dissolved in acetone (15.5 mL). Sodium iodide (0.061 g, 0.411 mmol) was added, and the mixture was stirred at 50° C. for 19 h. Product was then recovered as a solid via filtration and washing with acetone to afford 1-(3,4-dichlorophenyl)-2-(2-imino-5-methoxy-3-(2-methylbenzyl)-2,3-dihydro-1H-benzo[d]imidazol-1-yl)ethan-1-one (0.164 g, 93%) as a white solid. $^1$H NMR (600 MHz, DMSO-d$^6$) δ 8.88 (2H, br s), 8.34 (1H, s), 8.04 (1H, d, J=7.2 Hz), 7.95 (1H, d, J=7.8 Hz), 7.61 (1H, d, J=9.0 Hz), 7.30 (1H, d, J=7.2 Hz), 7.23 (1H, t, J=6.6 Hz), 7.13 (1H, t, J=6.6 Hz), 7.08 (1H, br s), 6.91 (1H, d, J=7.2 Hz), 6.56 (1H, d, J=7.2 Hz), 6.05 (2H, s), 5.48 (2H, s), 3.71 (3H, s), 2.41 (3H, s); —C NMR (150 MHz, DMSO-d$^6$) δ 190.6, 157.5, 151.4, 137.6, 136.5, 134.9, 132.8, 132.5, 131.9, 131.27, 131.21, 131.1, 129.1, 128.1, 126.7, 124.7, 124.1, 112.0, 111.2, 97.3, 56.6, 51.0, 44.9, 19.3; LCMS m/z 454.1120 ([M+H$^+$], C$_{24}$H$_{22}$Cl$_2$N$_3$O$_2$ requires 454.1084).

1-(3,4-dichlorophenyl)-2-(2-imino-5-methoxy-3-(2-methylbenzyl)-2,3-dihydro-1H-benzo[d]imidazol-1-yl)ethan-1-ol 1-(3,4-dichlorophenyl)-2-(2-imino-5-methoxy-3-(2-methylbenzyl)-2,3-dihydro-1H-benzo[d]imidazol-1-yl)ethan-1-one (0.373 g, 0.821 mmol) in methanol (88.0 mL) was cooled to 0° C. Sodium borohydride (0.062 g, 1.64) was added in portions. The reaction was then warmed to RT and stirred for 1 h. Water was added, mixture checked for neutral/slightly basic pH. Methanol was removed under reduced pressure, mixture was extracted with ethyl acetate, and the organic phase was evaporated to obtain crude residue. Added dichloromethane and SiO$_2$ and concentrated to make a silica plug. Purification by flash chromatography (25% ethyl acetate in hexanes, 17:0.5:1 dichloromethane:methanol: 35% ammonium hydroxide) afforded 1-(3,4-dichlorophenyl)-2-(2-imino-5-methoxy-3-(2-methylbenzyl)-2,3-dihydro-1H-benzo[d]imidazol-1-yl)ethan-1-ol (0.279 g, 75%) as a white solid. $^1$H NMR (600 MHz, CD$_3$OD) δ 7.59 (1H, s), 7.41 (1H, d, J=8.4 Hz), 7.34 (1H, d, J=8.4 Hz), 7.18 (1H, d, J=7.2 Hz), 7.14 (1H, t, J=7.2 Hz), 7.06 (1H, t, J=7.2 Hz), 6.81 (1H, d, J=8.4 Hz), 6.72 (1H, d, J=7.8 Hz), 6.50 (1H, dd, J=8.4, 1.8 Hz), 6.28 (1H, d, J=1.8 Hz), 5.09 (1H, t, J=6.0 Hz), 4.98 (2H, d, J=1.8 Hz), 4.09-4.01 (2H, m), 3.63 (3H, s), 2.35 (3H, s); $^{13}$C NMR (150 MHz, CDCl$_3$) δ 156.0, 155.5, 143.3, 135.8, 133.5, 132.1, 132.0, 131.0, 130.3, 130.2, 128.7, 128.3, 127.2, 126.0, 125.9, 125.4, 107.6, 105.8, 94.8, 70.5, 55.0, 49.1, 43.0, 18.0; HRMS m/z 456.1238 ([M+H$^+$], C$_{24}$H$_{24}$Cl$_2$N$_3$O$_2$ requires 456.1240).

Scheme for Synthesis of Example 2

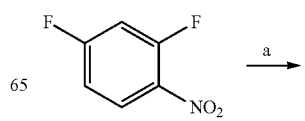

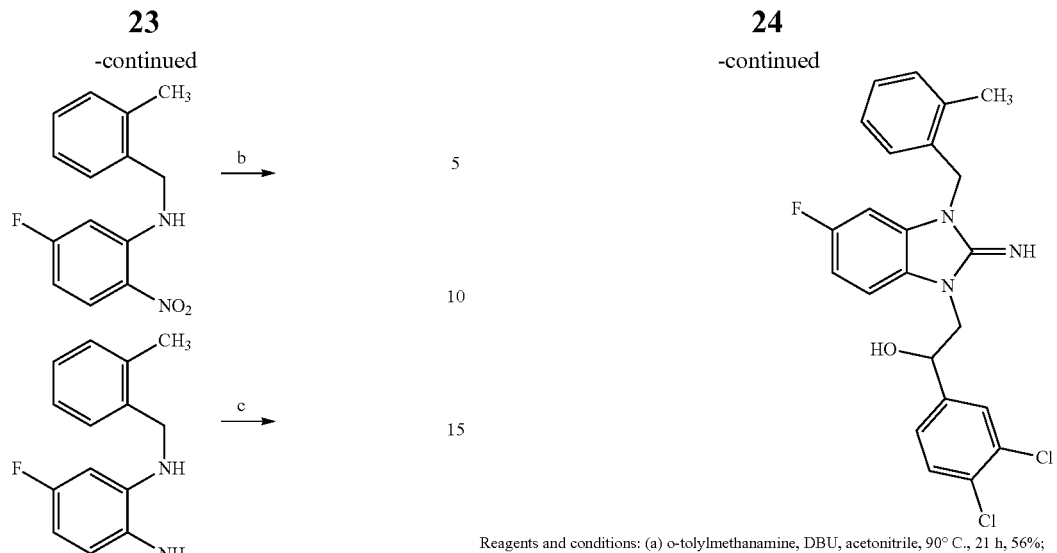

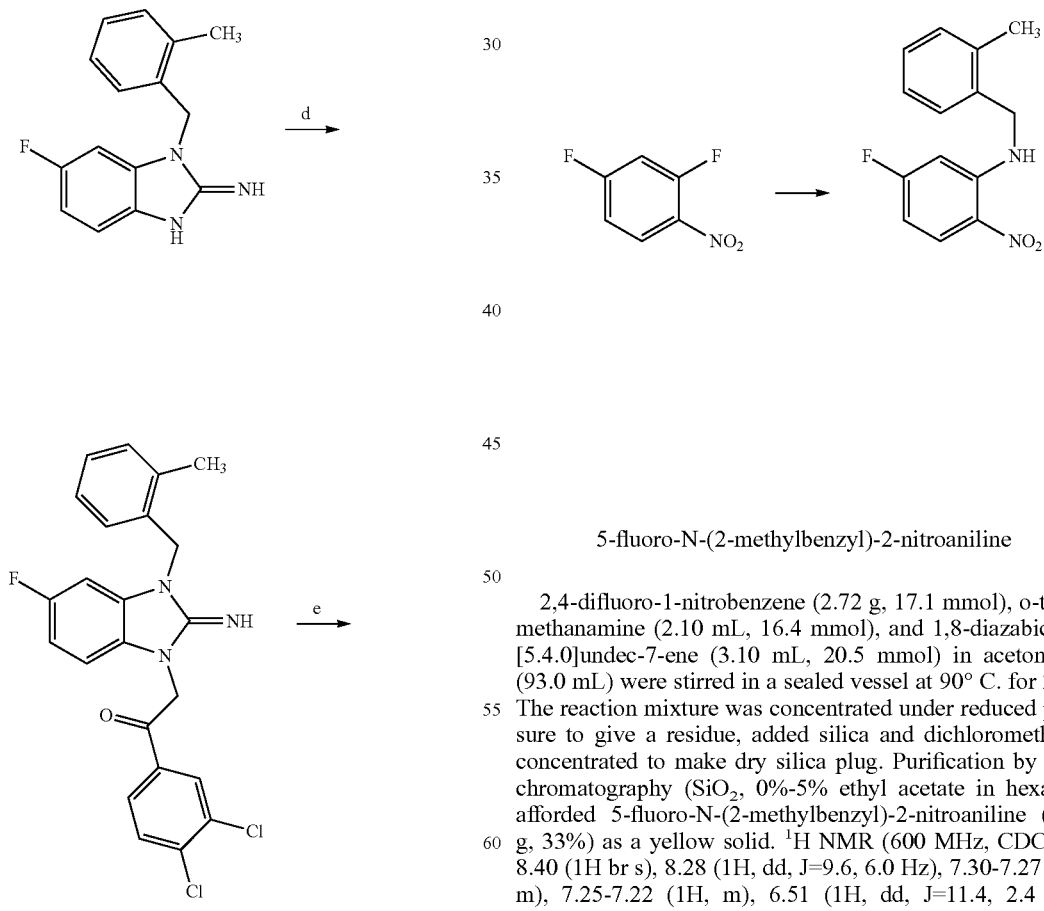

Reagents and conditions: (a) o-tolylmethanamine, DBU, acetonitrile, 90° C., 21 h, 56%; (b) Fe, acetic acid, water, ethanol, 100° C., 1 h, 35%; (c) Cyanogen bromide, methanol, RT, 1 h, 42%; (d) 2-bromo-1-(3,4-dichlorophenyl)ethan-1-one, acetone, 50° C., 19 h, 93%; (e) NaBH$_4$, methanol, 50° C., 1 h, 75%.

Experimental for Example 2

5-fluoro-N-(2-methylbenzyl)-2-nitroaniline 2,4-difluoro-1-nitrobenzene (2.72 g, 17.1 mmol), o-tolylmethanamine (2.10 mL, 16.4 mmol), and 1,8-diazabicyclo[5.4.0]undec-7-ene (3.10 mL, 20.5 mmol) in acetonitrile (93.0 mL) were stirred in a sealed vessel at 90° C. for 21 h. The reaction mixture was concentrated under reduced pressure to give a residue, added silica and dichloromethane, concentrated to make dry silica plug. Purification by flash chromatography (SiO$_2$, 0%-5% ethyl acetate in hexanes) afforded 5-fluoro-N-(2-methylbenzyl)-2-nitroaniline (1.47 g, 33%) as a yellow solid. $^1$H NMR (600 MHz, CDCl$_3$) δ 8.40 (1H br s), 8.28 (1H, dd, J=9.6, 6.0 Hz), 7.30-7.27 (3H, m), 7.25-7.22 (1H, m), 6.51 (1H, dd, J=11.4, 2.4 Hz), 6.44-6.41 (1H, m), 4.47 (2H, d, J=4.8 Hz), 2.41 (3H, s); $^{13}$C NMR (150 MHz, CDCl$_3$) δ 168.6, 166.9, 147.5, 147.4, 136.3, 134.3, 131.0, 130.28, 130.20, 129.3, 128.3, 127.8, 126.6, 104.5, 104.4, 99.9, 99.8, 45.7, 19.2; HRMS m/z 261.1021 ([M+H]$^+$, C$_{14}$H$_{14}$FN$_2$O$_2$ requires 261.10341).

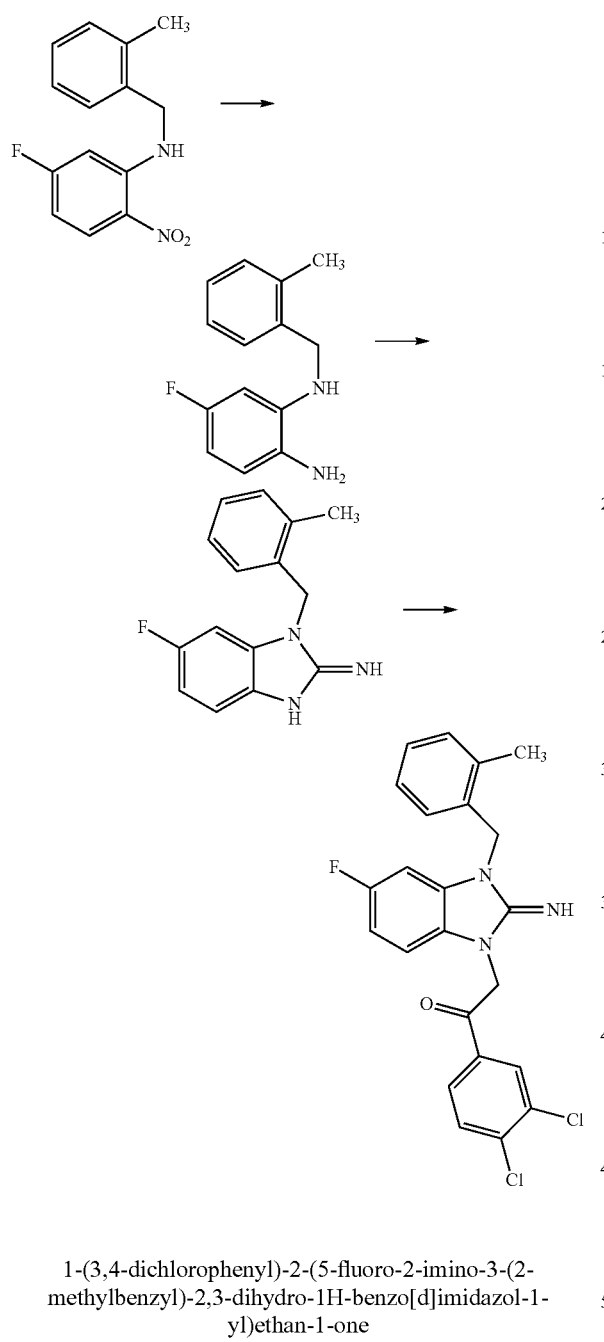

1-(3,4-dichlorophenyl)-2-(5-fluoro-2-imino-3-(2-methylbenzyl)-2,3-dihydro-1H-benzo[d]imidazol-1-yl)ethan-1-one 5-fluoro-N-(2-methylbenzyl)-2-nitroaniline (1.47 g, 5.67 mmol), iron powder (4.75 g, 85.1 mmol), acetic acid (4.86 mL, 85.1 mmol) in ethanol (16.3 mL) and water (46.3 mL) were refluxed at 100° C. for 1 h. 2.5 N NaOH (131.0 mL) was added to the reaction mixture, and the suspension was filtered through a celite pad washing with boiling ethyl acetate. The organic layer was washed with brine, and concentrated to afford crude 5-fluoro-N$^1$-(2-methylbenzyl) benzene-1,2-diamine (2.06 g) which was taken to next step without further purification.

5-fluoro-N-(2-methylbenzyl)benzene-1,2-diamine (2.06 g, 8.94 mmol) in methanol (14.0 mL) at 0° C. was treated with cyanogen bromide (1.89 g, 17.9 mmol). The reaction mixture was maintained at RT for 1 h. The reaction mixture was partitioned between ethyl acetate, sat. aq. NaHCO$_3$, and water. Organic layer was washed with sat. aq. NaCl solution and concentrated to obtain a residue. Purification by flash chromatography (SiO$_2$, 25%-100% ethyl acetate in hexanes, 17:0.5:1 dichloromethane:methanol: 35% ammonium hydroxide) afforded slightly impure 6-fluoro-1-(2-methylbenzyl)-1,3-dihydro-2H-benzo[d]imidazol-2-imine (0.541 g) which was taken to the next step without further purification.

6-fluoro-1-(2-methylbenzyl)-1,3-dihydro-2H-benzo[d]imidazol-2-imine (0.541 g, 2.11 mmol) and 2-bromo-1-(3,4-dichlorophenyl)ethanone (0.565 g, 2.11 mmol) were dissolved in acetone (83.0 mL). Sodium iodide (0.333 g, 2.22 mmol) was added, and the mixture was stirred at 50° C. for 19 h. Product was then recovered as a solid via filtration and washing with acetone to afford 1-(3,4-dichlorophenyl)-2-(5-fluoro-2-imino-3-(2-methylbenzyl)-2,3-dihydro-1H-benzo[d]imidazol-1-yl)ethan-1-one (0.321 g, 13% over three steps) as a white solid. $^1$H NMR (600 MHz, DMSO-d$^6$) δ 9.19 (1H, s), 8.37 (1H, d, J=1.8 Hz), 8.07 (1H, dd, J=8.4, 1.8 Hz), 7.97 (1H, d, J=8.4 Hz), 7.79 (1H, dd, J=8.4, 1.8 Hz), 7.50 (1H, dd, J=8.4, 1.8 Hz), 7.32-7.31 (1H, m), 7.26-7.20 (2H, m), 7.15 (1H, t, J=7.2 Hz), 6.58 (1H, d, J=7.2 Hz), 6.17 (2H, s), 5.55 (2H, s), 2.43 (3H, s); $^{13}$C NMR (150 MHz, DMSO-d$^6$) δ 190.5, 160.6, 159.0, 152.2, 137.6, 136.5, 134.9, 132.55, 132.50, 131.2, 121.1, 131.0, 129.2, 128.2, 127.4, 126.8, 123.9, 112.7, 111.7, 111.5, 99.7, 99.5, 51.3, 45.3, 19.4; HRMS m/z 442.0907 ([M+H$^+$], C$_{18}$H$_{18}$NO requires 442.0884).

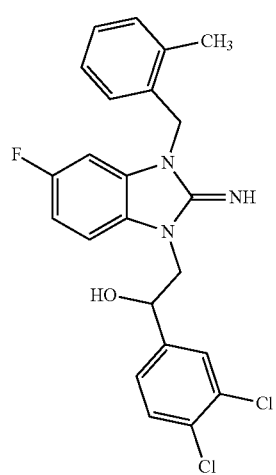

1-(3,4-dichlorophenyl)-2-(5-fluoro-2-imino-3-(2-methylbenzyl)-2,3-dihydro-1H-benzo[d]imidazol-1-yl)ethan-1-ol 1-(3,4-dichlorophenyl)-2-(5-fluoro-2-imino-3-(2-methylbenzyl)-2,3-dihydro-1H-benzo[d]imidazol-1-yl)ethan-1-one (0.150 g, 0.339 mmol) in methanol (36.0 mL) was cooled to 0° C. Sodium borohydride (0.025 g, 0.678 mmol) was added in portions. The reaction was then warmed to RT and stirred for 1 h. Water was added, mixture checked for neutral/slightly basic pH. Methanol was removed under reduced pressure, mixture was extracted with ethyl acetate, and the organic phase was evaporated to obtain crude residue. Added dichloromethane and $SiO_2$ and concentrated to make a silica plug. Purification by flash chromatography (25% ethyl acetate in hexanes, 17:0.5:1 dichloromethane:methanol: 35% ammonium hydroxide) afforded 1-(3,4-dichlorophenyl)-2-(5-fluoro-2-imino-3-(2-methylbenzyl)-2,3-dihydro-1H-benzo[d]imidazol-1-yl)ethan-1-ol (0.074 g, 49%) as a white solid. $^1$H NMR (600 MHz, $CD_3OD$) δ 7.64 (1H, br s), 7.46 (1H, d, J=8.4 Hz), 7.39 (1H, d, J=7.8 Hz), 7.23-7.22 (1H, m), 7.19 (1H, t, J=6.6 Hz), 7.11 (1H, t, J=6.6 Hz), 6.94-6.92 (1H, m), 6.75 (1H, d, J=6.6 Hz), 6.68 (1H, t, J=7.8 Hz), 6.50 (1H, d, J=7.2 Hz), 5.14 (1H, br s), 5.05 (2H, s), 4.13-4.10 (2H, m), 2.39 (3H, s); $^{13}$C NMR (150 MHz, $CD_3OD$) δ 159.5, 157.9, 155.9, 143.1, 135.8, 133.2, 132.0, 131.1, 130.3, 130.2, 128.3, 128.2, 127.3, 126.0, 125.2, 107.8, 106.7, 95.6, 95.5, 70.4, 49.1, 43.2, 17.9; HRMS m/z 444.1038 ([M+H$^+$], $C_{23}H_{21}Cl_2FN_3O$ requires 444.1040).

Scheme for Synthesis of Example 3

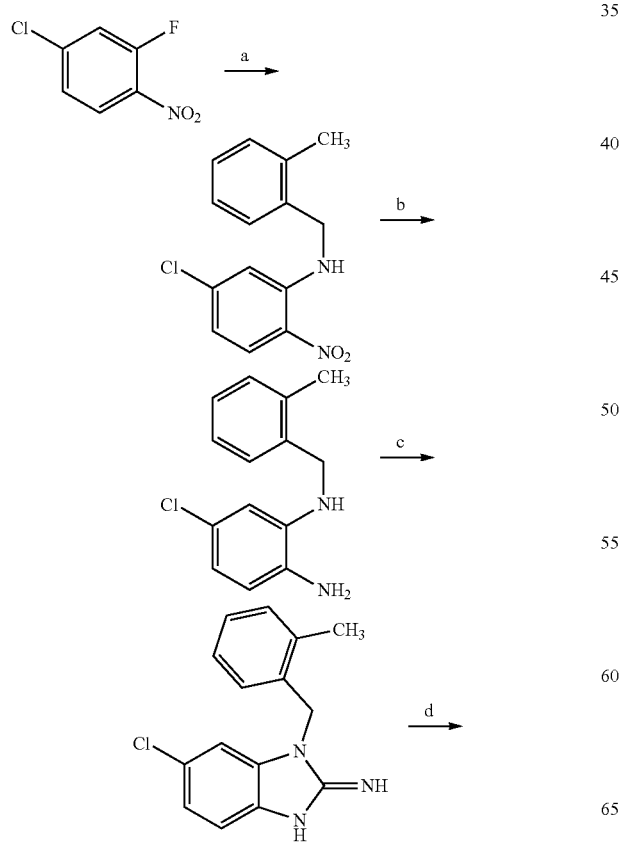

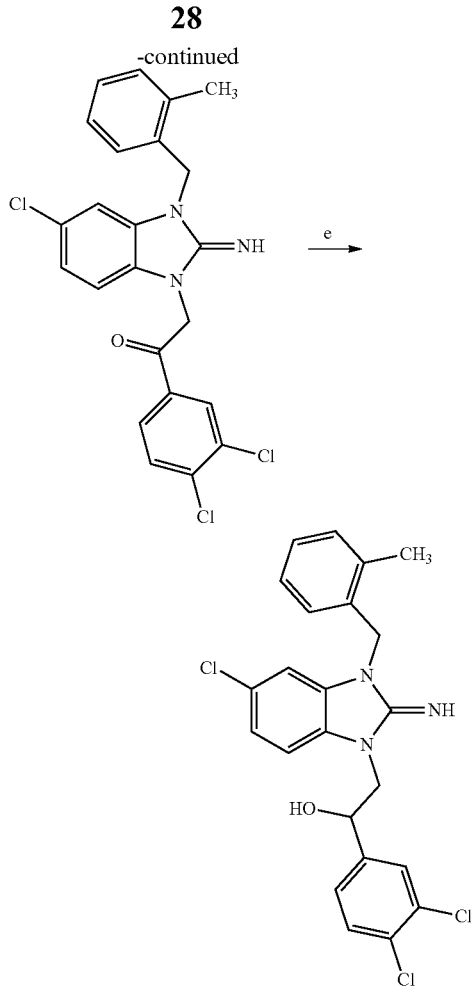

Reagents and conditions: (a) o-tolylmethanamine, DBU, acetonitrile, 90° C., 21 h, 56%; (b) Fe, acetic acid, water, ethanol, 100° C., 1 h, 35%; (c) Cyanogen bromide, methanol, RT, 1 h, 42%; (d) 2-bromo-1-(3,4-dichlorophenyl)ethan-1-one, acetone, 50° C., 19 h, 93%; (e) NaBH$_4$, methanol, 50° C., 1 h, 75%.

Experimental for Example 3

5-chloro-N-(2-methylbenzyl)-2-nitroaniline 4-chloro-2-fluoro-1-nitrobenzene (3.00 g, 17.1 mmol), o-tolylmethanamine (2.10 mL, 16.4 mmol), and 1,8-diazabicyclo[5.4.0]undec-7-ene (3.10 mL, 20.5 mmol) in acetonitrile (93.0 mL) were stirred in a sealed vessel at 90° C. for 21 h. The reaction mixture was concentrated under reduced pressure to give a residue, added silica and dichloromethane, concentrated to make dry silica plug. Purification by flash chromatography ($SiO_2$, 0%-5% ethyl acetate in hexanes) afforded 5-chloro-N-(2-methylbenzyl)-2-nitroaniline (1.61 g, 34%) as a yellow solid. $^1$H NMR (600 MHz, CDCl$_3$) δ 8.26 (1H, br s), 8.19-8.17 (1H, m), 7.30-7.26 (3H, m), 7.25-7.22 (1H, s), 6.87 (1H, d, J=1.8 Hz), 6.67 (1H, dd, J=9.0, 1.8 Hz), 4.47 (2H, d, J=5.4 Hz), 2.41 (3H, s); $^{13}$C NMR (150 MHz, CDCl$_3$) δ 145.8, 143.1, 136.3, 134.3, 131.0, 128.5, 128.0, 126.7, 116.4, 113.6, 45.7, 19.2; LCMS m/z 277.3479 ([M+H$^+$], C$_{14}$H$_{14}$C$_1$N$_2$O$_2$ requires 277.0738).

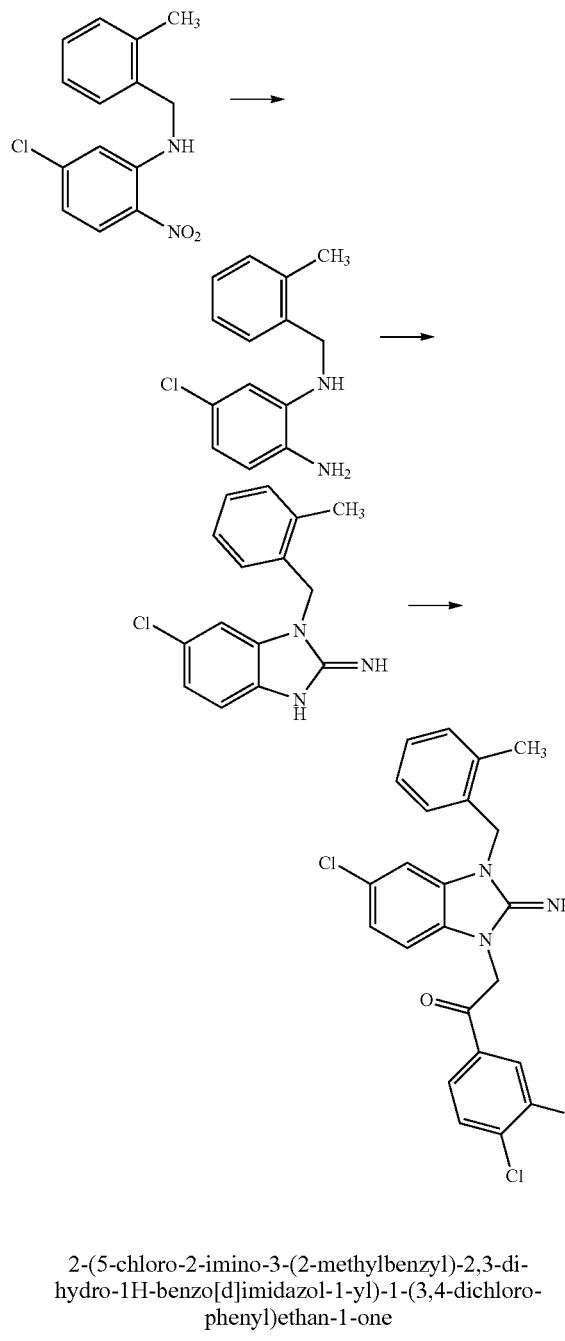

2-(5-chloro-2-imino-3-(2-methylbenzyl)-2,3-dihydro-1H-benzo[d]imidazol-1-yl)-1-(3,4-dichlorophenyl)ethan-1-one 5-chloro-N-(2-methylbenzyl)-2-nitroaniline (1.00 g, 3.61 mmol), iron powder (3.02 g, 54.2 mmol), acetic acid (3.09 mL, 54.2 mmol) in ethanol (10.4 mL) and water (30.0 mL) were refluxed at 100° C. for 1 h. 2.5 N NaOH (84.0 mL) was added to the reaction mixture, and the suspension was filtered through a celite pad washing with boiling ethyl acetate. The organic layer was washed with brine, and concentrated to afford crude 5-chloro-N$^1$-(2-methylbenzyl)benzene-1,2-diamine (0.850 g) which was taken to next step without further purification.

5-chloro-N$^1$-(2-methylbenzyl)benzene-1,2-diamine (0.850 g, 3.44 mmol) in methanol (5.50 mL) at 0° C. was treated with cyanogen bromide (0.729 g, 6.89 mmol). The reaction mixture was maintained at RT for 1 h. The reaction mixture was partitioned between ethyl acetate, sat. aq. NaHCO$_3$, and water. Organic layer was washed with sat. aq. NaCl solution and concentrated to obtain a residue. Purification by flash chromatography (SiO$_2$, 25%-100% ethyl acetate in hexanes, 17:0.5:1 dichloromethane:methanol: 35% ammonium hydroxide) afforded slightly impure 6-methoxy-1-(2-methylbenzyl)-1,3-dihydro-2H-benzo[d] imidazol-2-imine (0.144 g) which was taken to the next step without further purification.

6-chloro-1-(2-methylbenzyl)-1H-benzo[d]imidazol-2-amine (0.144 g, 0.529 mmol) and 2-bromo-1-(3,4-dichlorophenyl)ethanone (0.142 g, 0.529 mmol) were dissolved in acetone (21.0 mL). Sodium iodide (0.083 g, 0.555 mmol) was added, and the mixture was stirred at 50° C. for 19 h. Product was then recovered as a solid via filtration and washing with acetone to afford 2-(5-chloro-2-imino-3-(2-methylbenzyl)-2,3-dihydro-1H-benzo[d]imidazol-1-yl)-1-(3,4-dichlorophenyl)ethan-1-one (0.154 g, 9% over three steps) as a white solid. $^1$H NMR (600 MHz, DMSO-d$^6$) δ 9.12 (1H, s), 8.37 (1H, 1.8 Hz), 8.06 (1H, dd, J=8.4, 1.8 Hz), 7.98 (1H, d, J=9.0 Hz), 7.43 (1H, dd, J=8.4, 1.8 Hz), 7.34 (1H, d, J=7.8 Hz), 7.27 (1H, t, J=7.2 Hz), 7.17 (1H, t, J=7.2 Hz), 6.55 (1H, d, J=7.8 Hz), 6.08 (2H, s), 5.50 (2H, s), 2.43 (3H, s); $^{13}$C NMR (150 MHz, DMSO-d$^6$) δ 190.3, 151.9, 137.7, 136.5, 134.8, 132.5, 131.3, 129.9, 129.0, 128.2, 126.8, 124.6, 123.7, 113.2, 112.8, 112.4, 112.2, 111.8, 111.6, 111.2, 51.1, 45.1, 19.3; HRMS m/z 458.0578 ([M+H$^+$], C$_{23}$H$_{19}$C$_{13}$N3O requires 458.0588).

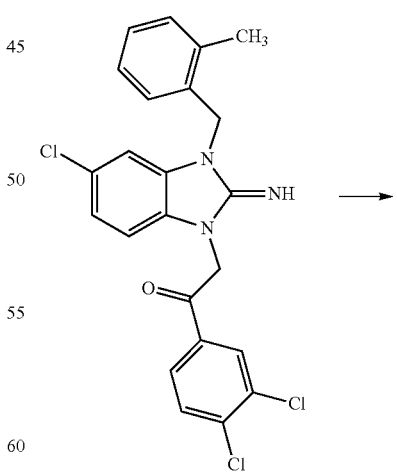

31
-continued

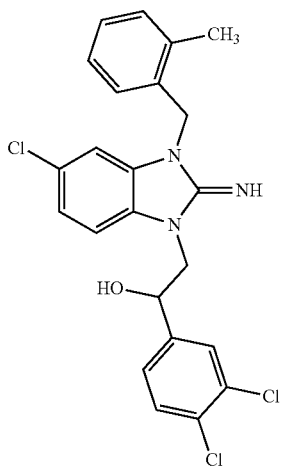

2-(5-chloro-2-imino-3-(2-methylbenzyl)-2,3-di-hydro-1H-benzo[d]imidazol-1-yl)-1-(3,4-dichlorophenyl)ethan-1-ol 2-(5-chloro-2-imino-3-(2-methylbenzyl)-2,3-dihydro-1H-benzo[d]imidazol-1-yl)-1-(3,4-dichlorophenyl)ethan-1-one (0.137 g, 0.298 mmol) in methanol (32.0 mL) was cooled to 0° C. Sodium borohydride (0.023 g, 0.597 mmol) was added in portions. The reaction was then warmed to RT and stirred for 1 h. Water was added, mixture checked for neutral/slightly basic pH. Methanol was removed under reduced pressure, mixture was extracted with ethyl acetate, and the organic phase was evaporated to obtain crude residue. Added dichloromethane and $SiO_2$ and concentrated to make a silica plug. Purification by flash chromatography (25% ethyl acetate in hexanes, 17:0.5:1 dichloromethane:methanol: 35% ammonium hydroxide) afforded 2-(5-chloro-2-imino-3-(2-methylbenzyl)-2,3-dihydro-1H-benzo[d]imidazol-1-yl)-1-(3,4-dichlorophenyl)ethan-1-ol (0.137 g, 69%) as a white solid. $^1$H NMR (600 MHz, $CD_3OD$) δ 7.64 (1H, d, J=1.8 Hz), 7.46-7.45 (1H, m), 7.38 (1H, dd, J=8.4, 1.8 Hz), 7.22 (1H, d, J=7.2 Hz), 7.18 (1H, t, J=7.2 Hz), 7.10 (1H, t, J=7.2 Hz), 6.929-6.925 (2H, m), 6.72 (1H, d, J=7.2 Hz), 6.66 (1H, d, J=1.2 Hz), 5.13 (1H, t, J=6.6 Hz), 5.01 (2H, s), 4.09 (2H, dd, J=7.2, 6.0 Hz), 2.38 (3H, s); $^{13}$C NMR (150 MHz, $CD_3OD$) δ 155.5, 143.1, 135.8, 133.2, 132.4, 132.0, 131.1, 130.9, 130.4, 130.2, 128.3, 127.3, 126.1, 126.0, 125.1, 120.4, 108.2, 107.4, 107.3, 70.3, 49.0, 43.1, 18.0; HRMS m/z 460.0738 ([M+H$^+$], $C_{23}H_{21}Cl_3N_3O$ requires 460.0745).

Scheme for Synthesis of Example 4

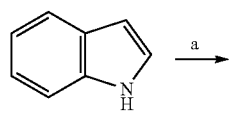

32
-continued

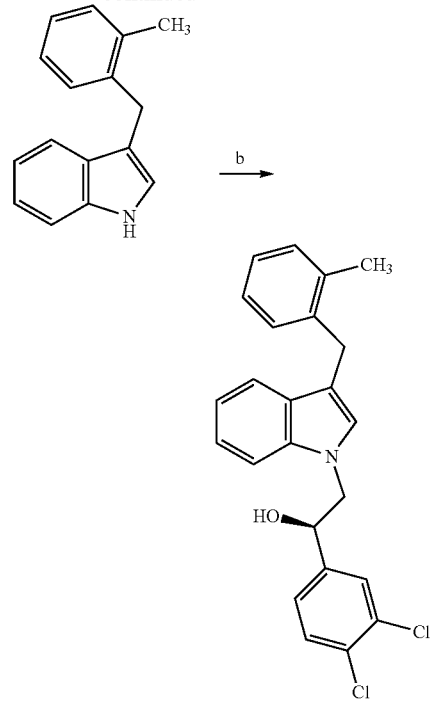

Reagents and conditions: (a) o-tolylmethanol, KOH, 150° C., 20 h, 73%; (b) (R)-2-(3,4-dichlorophenyl)oxirane, $Cs_2CO_3$, DMPU, 80° C., 22 h, 23%

Experimental for Example 4

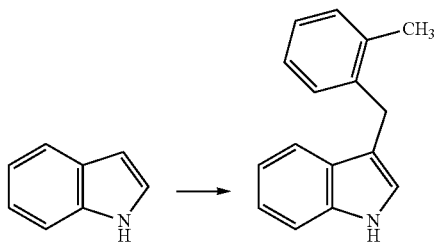 [SMILES: c1ccc2[nH]ccc2c1 ; Cc1ccccc1Cc1c[nH]c2ccccc12]

3-(2-methylbenzyl)-1H-indole

To a stirred mixture of 1H-indole (2.00 g, 17.1 mmol) and potassium hydroxide (1.24 g, 22.2 mmol), was added o-tolylmethanol (6.18 mL, 51.2 mmol). The mixture was stirred at 150° C. for 20 hours. The resulting mixture was quenched with deionized water and extracted with diethyl ether (5.0 mL). The organic phase was concentrated under reduced pressure with silica to make a dry silica gel plug. Purification by flash chromatography ($SiO_2$, 0%-10% ethyl acetate in hexanes) afforded 3-(2-methylbenzyl)-1H-indole (2.75 g, 73%). $^1$H NMR (600 MHz, DMSO-d$^6$) δ 10.83 (1H, s), 7.43 (1H, d, J=7.8 Hz), 7.35 (1H, d, J=7.8 Hz), 7.15 (2H, br s), 7.09-7.05 (3H, m), 6.96-6.93 (2H, m); $^{13}$C NMR (150 MHz, DMSO-d$^6$) δ 139.4, 136.8, 136.7, 130.4, 129.7, 127.8, 126.5, 122.7, 122.3, 119.6, 119.3, 115.3, 111.4, 29.5, 19.8; LCMS m/z 222.1268 ([M+H$^+$], $C_{16}H_{16}N$ requires 222.1277).

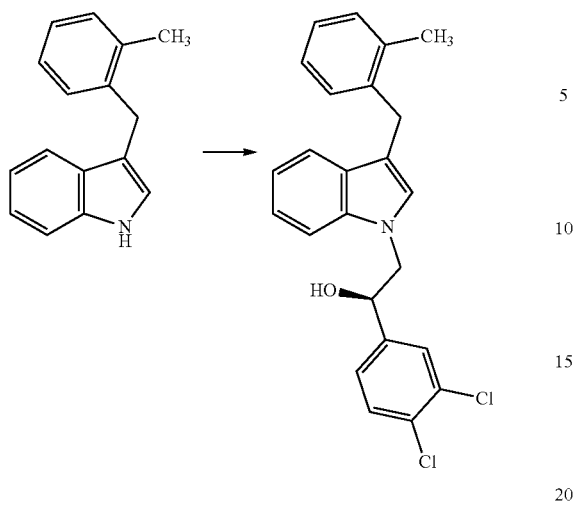

(R)-1-(3,4-dichlorophenyl)-2-(3-(2-methylbenzyl)-1H-indol-1-yl)ethan-1-ol

A suspension of 3-(2-methylbenzyl)-1H-indole (0.150 g, 0.678 mmol), cesium carbonate (0.150 g, 0.678 mmol) and (R)-2-(3,4-dichlorophenyl)oxirane (0.166 g, 0.881 mmol) in DMPU (1.70 mL) was heated with stirring at 80° C. for 22 h. The mixture was allowed to cool to ambient temperature, diluted with diethyl ether, and filtered. The filtrate was washed with water (6×) and brine, silica was added, and mixture concentrated in vacuo to obtain a plug. Purification by flash chromatography (SiO$_2$, 0%-17% ethyl acetate in hexanes) afforded (R)-1-(3,4-dichlorophenyl)-2-(3-(2-methylbenzyl)-1H-indol-1-yl)ethan-1-ol (0.063 g, 23%) as an orange semi-solid. $^1$H NMR (600 MHz, CDCl$_3$) δ 7.62 (1H, d, J=7.8 Hz), 7.44-7.43 (2H, m), 7.37 (1H, d, J=8.4 Hz), 7.29 (1H, t, J=7.8 Hz), 7.24-7.16 (5H, m), 7.11 (1H, dd, J=8.4, 1.8 Hz), 6.52 (1H, s), 4.94 (1H, br s), 4.22-4.14 (2H, m), 4.07 (2H, s), 2.34 (3H, s), 2.19 (1H, br s); $^{13}$C NMR (150 MHz, CDCl$_3$) δ 141.4, 139.0, 136.8, 136.5, 133.0, 132.3, 130.7, 130.4, 129.6, 128.4, 128.1, 126.7, 126.4, 126.1, 125.3, 122.2, 119.6, 119.5, 114.8, 109.4, 72.5, 53.9, 29.3, 19.6; HRMS m/z 410.1043 ([M+H$^+$], C$_{24}$H$_{22}$Cl$_2$NO requires 410.1073).

Scheme for Synthesis of

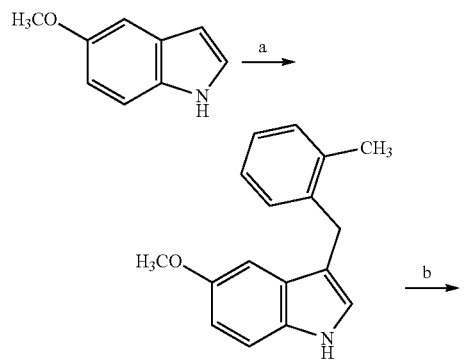

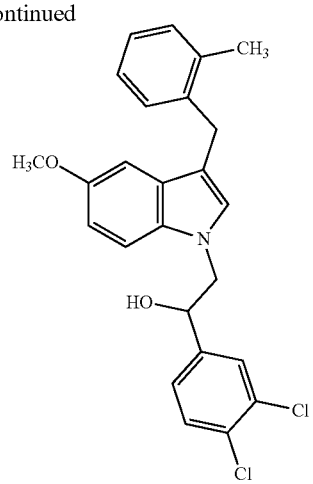

Reagents and conditions: (a) o-tolylmethanol, KOH, 150° C., 20 h, 45%; (b) 2-(3,4-dichlorophenyl)oxirane, Cs$_2$CO$_3$, DMPU, 80° C., 22 h, 28%

Experimental for Example 5

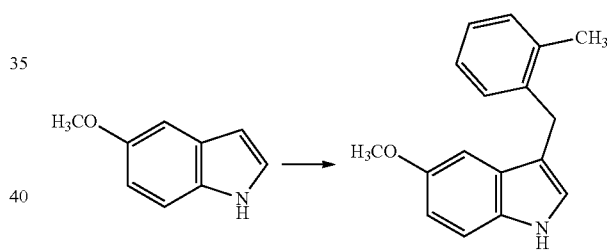

5-methoxy-3-(2-methylbenzyl)-1H-indole

To a stirred mixture of 5-methoxy-1H-indole (4.00 g, 27.2 mmol) and potassium hydroxide (1.98 g, 35.4 mmol), was added o-tolylmethanol (9.96 g, 81.5 mmol). The mixture was stirred at 150° C. for 20 hours. The resulting mixture was quenched with deionized water and extracted with diethyl ether. The organic phase was concentrated under reduced pressure with silica to make a dry silica gel plug. Purification by flash chromatography (SiO$_2$, 0%-10% ethyl acetate in hexanes) afforded 5-methoxy-3-(2-methylbenzyl)-1H-indole (3.08 g, 45%). $^1$H NMR (600 MHz, CDCl$_3$) δ 7.85 (1H, br s), 7.31-7.26 (5H, m), 7.13 (1H, s), 7.04 (1H, d, J=8.4 Hz), 6.75 (1H, s), 4.16 (2H, s), 3.95 (3H, s), 2.46 (3H, s); $^{13}$C NMR (150 MHz, CDCl$_3$) δ 154.1, 139.3, 136.8, 131.9, 130.4, 129.7, 128.2, 126.5, 126.2, 123.6, 114.9, 112.4, 112.1, 101.2, 56.2, 29.6, 19.8; LCMS m/z 252.1389 ([M+H$^+$], C$_{17}$H$_{18}$NO requires 252.1383).

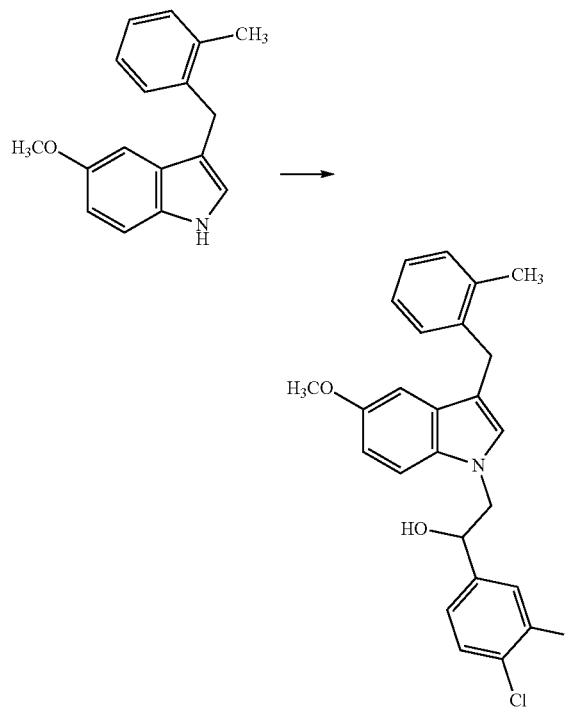
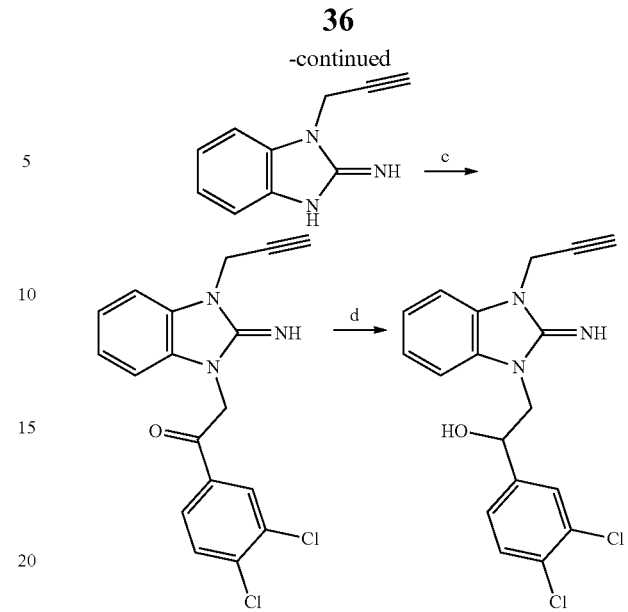

Reagents and conditions: (a) 3-bromoprop-1-yne, potassium carbonate, acetone, RT, 16 h; (b) cyanogen bromide, methanol, RT, 1 h, 38% over two steps; (c) 2-bromo-1-(3,4-dichlorophenyl)ethan-1-one, sodium iodide, acetone, 50° C., 19 H, 66%; (d) NaBH₄, methanol, RT, 1 h, 42%.

Experimental for Example 6

1-(3,4-dichlorophenyl)-2-(5-methoxy-3-(2-methyl-benzyl)-1H-indol-1-yl)ethan-1-ol A suspension of 5-methoxy-3-(2-methylbenzyl)-1H-indole (0.315 g, 1.25 mmol), cesium carbonate (0.814 g, 2.50 mmol) and 2-(3,4-dichlorophenyl)oxirane (0.307 g, 1.63 mmol) in DMPU (3.00 mL) was heated with stirring at 80° C. for 22 h. The mixture was allowed to cool to ambient temperature, diluted with diethyl ether, and filtered. The filtrate was washed with water (6×) and brine, silica was added, and mixture concentrated in vacuo to obtain a plug. Purification by flash chromatography (SiO₂, 0%-17% ethyl acetate in hexanes) afforded 1-(3,4-dichlorophenyl)-2-(5-methoxy-3-(2-methylbenzyl)-1H-indol-1-yl)ethan-1-ol (0.155 g, 28%) as an light pink foam. $^1$H NMR (600 MHz, CDCl₃) δ 7.42-7.40 (2H, m), 7.25-7.18 (5H, m), 7.08 (1H, d, J=6.6 Hz), 7.01 (1H, d, J=1.2 Hz), 6.92 (1H, dd, J=9.0, 2.4 Hz), 6.48 (1H, s), 4.90 (1H, br s), 4.17-4.10 (2H, m), 4.01 (2H, s), 3.87 (3H, s), 2.33 (3H, s), 2.27 (1H, br s); $^{13}$C NMR (150 MHz, CDCl₃) δ 154.1, 141.3, 138.9, 136.6, 133.0, 132.2, 132.1, 130.8, 130.7, 130.3, 129.6, 128.7, 128.1, 127.3, 126.4, 126.1, 125.3, 114.3, 112.3, 110.2, 101.4, 72.6, 56.1, 54.1, 29.3; HRMS m/z 440.1166 ([M+H⁺], C₂₅H₂₄Cl₂NO₂ requires 440.1179).

Scheme for Synthesis of Example 6

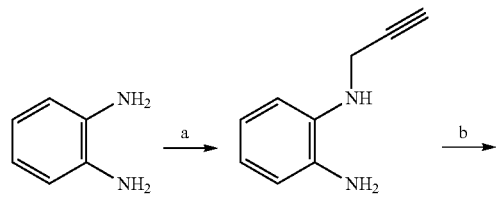

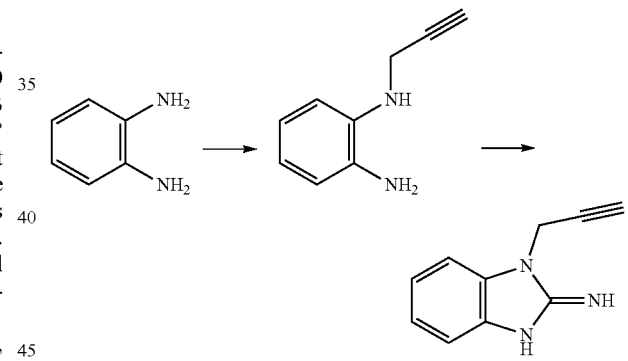

1-(prop-2-yn-1-yl)-1,3-dihydro-2H-benzo[d]imidazol-2-imine 5-methoxy-2-nitroaniline (1.00 g, 5.94 mmol), potassium carbonate (0.902 g, 6.53 mmol), and 3-bromoprop-1-yne (0.529 mL, 5.94 mmol) in DMF (12.0 mL) were stirred at RT for 16 h. The reaction mixture was concentrated under reduced pressure. After completion of reaction, the solvent was evaporated in vacuo and the resulting mixture was diluted with water and extracted with ethyl acetate. The combined organic layers were washed with brine. The solvent was evaporated in vacuo and the remaining residue was purified by flash chromatography (SiO₂, 0%-15% ethyl acetate in hexanes) to afford slightly crude N¹-(prop-2-yn-1-yl)benzene-1,2-diamine (0.400 g) that was taken to the next step without further purification. LCMS m/z 147.3908 ([M+H⁺], C₉H₁₁N₂ requires 147.0917).

N¹-(prop-2-yn-1-yl)benzene-1,2-diamine (0.400 g, 2.73 mmol) in methanol (4.22 mL) at 0° C. was treated with cyanogen bromide (0.579 g, 5.57 mmol). The reaction mixture was maintained at RT for 1 h. The reaction mixture was partitioned between ethyl acetate, sat. aq. NaHCO₃, and water. Organic layer was washed with sat. aq. NaCl solution and concentrated to obtain a residue. Purification by flash chromatography (SiO₂, 25%-100% ethyl acetate in hexanes, 17:0.5:1 dichloromethane:methanol: 35% ammonium hydroxide) afforded 1-(prop-2-yn-1-yl)-1,3-dihydro-2H-benzo[d]imidazol-2-imine (0.389 g, 38% over two steps). ¹H NMR (600 MHz, MeOD) δ 7.26-7.22 (2H, m), 7.08 (1H, t, J=7.2 Hz), 7.03 (1H, t, J=7.2 Hz), 4.94 (2H, br s), 2.78 (1H, s); LCMS m/z 172.6462 ([M+H⁺], C₁₀H₁₀N₃ requires 172.0869).

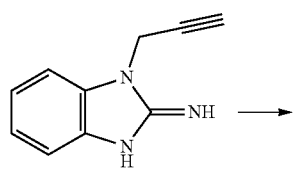

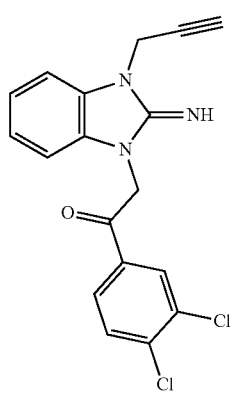

1-(3,4-dichlorophenyl)-2-(2-imino-3-(prop-2-yn-1-yl)-2,3-dihydro-1H-benzo[d]imidazol-1-yl)ethan-1-one 1-(prop-2-yn-1-yl)-1,3-dihydro-2H-benzo[d]imidazol-2-imine (0.206 g, 1.20 mmol) and 2-bromo-1-(3,4-dichlorophenyl)ethanone (0.321 g, 1.20 mmol) were dissolved in acetone (48.0 mL). Sodium iodide (0.189 g, 1.26 mmol) was added, and the mixture was stirred at 50° C. for 19 h. Product was then recovered as a solid via filtration and washing with acetone to afford 1-(3,4-dichlorophenyl)-2-(2-imino-3-(prop-2-yn-1-yl)-2,3-dihydro-1H-benzo[d]imidazol-1-yl) ethan-1-one (0.284 g, 66%) as a white solid. ¹H NMR (600 MHz, DMSO-d⁶+D₂O) δ 9.13 (1H, s), 8.34 (1H, s), 8.03 (1H, d, J=8.4 Hz), 7.95 (1H, d, J=8.4 Hz), 7.69-7.66 (2H, m), 7.42 (1H, t, J=7.2 Hz), 7.36 (1H, t, J=7.2 Hz), 5.98 (2H, s), 5.21 (2H, s), 3.61 (1H, s); LCMS m/z 358.2592 ([M+H⁺], C₁₈H₁₄Cl₂N₃O requires 358.0508).

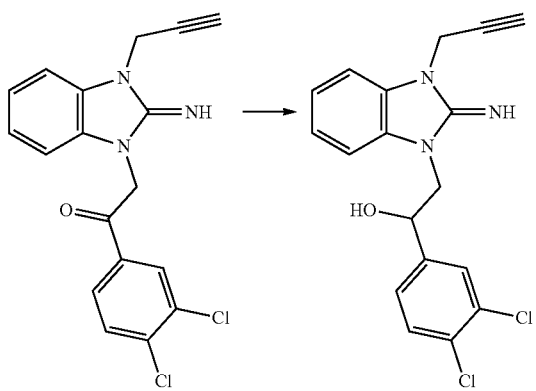 [SMILES: C#CCn1c(=N)n(CC(=O)c2ccc(Cl)c(Cl)c2)c2ccccc21 ; C#CCn1c(=N)n(CC(O)c2ccc(Cl)c(Cl)c2)c2ccccc21]

1-(3,4-dichlorophenyl)-2-(2-imino-3-(prop-2-yn-1-yl)-2,3-dihydro-1H-benzo[d]imidazol-1-yl)ethan-1-ol 1-(3,4-dichlorophenyl)-2-(2-imino-3-(prop-2-yn-1-yl)-2,3-dihydro-1H-benzo[d]imidazol-1-yl)ethan-1-one (1.95 g, 5.44 mmol) in methanol (300 mL) was cooled to 0° C. Sodium borohydride (0.411 g, 10.9 mmol) was added in portions. The reaction was then warmed to RT and stirred for 1 h. Water was added, mixture checked for neutral/slightly basic pH. Methanol was removed under reduced pressure, mixture was extracted with ethyl acetate, and the organic phase was evaporated to obtain crude residue. Added dichloromethane and SiO₂ and concentrated to make a silica plug. Purification by flash chromatography (25% ethyl acetate in hexanes, 17:0.5:1 dichloromethane:methanol: 35% ammonium hydroxide) afforded 1-(3,4-dichlorophenyl)-2-(2-imino-3-(prop-2-yn-1-yl)-2,3-dihydro-1H-benzo[d]imidazol-1-yl)ethan-1-ol (0.821 g, 42%) as a white solid. ¹H NMR (600 MHz, MeOD) δ 7.62 (1H, d, J=1.2 Hz), 7.44 (1H, d, J=8.4 Hz), 7.35 (1H, dd, J=7.8, 1.2 Hz), 7.11-7.10 (1H, m), 7.05-6.98 (2H, m), 6.96-6.94 (1H, m), 5.11-5.09 (1H, m), 4.75 (2H, s), 4.12-4.04 (2H, m); LCMS m/z 360.3399 ([M+H⁺], C₁₈H₁₆Cl₂N₃O requires 360.0665).

General Synthetic Scheme for Examples 7-28

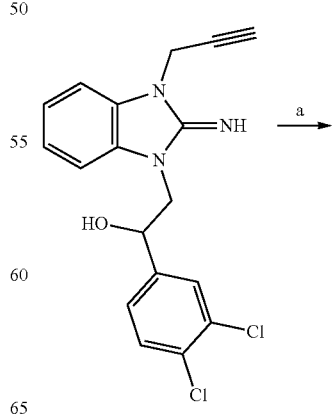

39

-continued

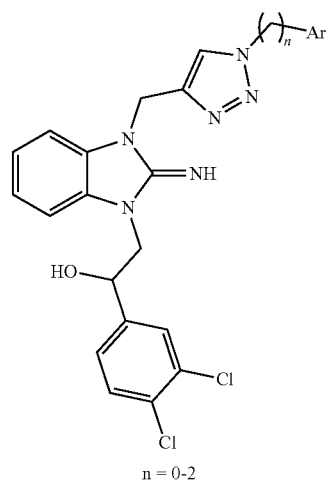

n = 0-2

(a) Aryl azide, CuSO₄·5H₂O,
sodium ascorbate, H₂O:DCM/Acetonitrile/t-BuOH (1:3), RT Procedure A: Typical procedure for synthesis of 1-(3,4-dichlorophenyl)-2-(2-imino-3-((1-(substituted)-1H-1,2,3-triazol-4-yl)methyl)-2,3-dihydro-1H-benzo[d]imidazol-1-yl)ethan-1-ol 1-(3,4-dichlorophenyl)-2-(2-imino-3-(prop-2-yn-1-yl)-2,3-dihydro-1H-benzo[d]imidazol-1-yl)ethan-1-ol Example 6, aryl azide, copper (II) sulfate pentahydrate, sodium ascorbate in water:dichloromethane (1:3) mixture was stirred at RT. Solvent was removed under reduced pressure, mixture was extracted with dichloromethane, and the organic phase was evaporated to obtain crude residue. Added dichloromethane and SiO₂ and concentrated to make a silica plug. Purification by flash chromatography (50% ethyl acetate in hexanes, 17:0.5:1 dichloromethane:methanol: 35% ammonium hydroxide) afforded 1-(3,4-dichlorophenyl)-2-(2-imino-3-((1-(substituted)-1H-1,2,3-triazol-4-yl)methyl)-2,3-dihydro-1H-benzo[d]imidazol-1-yl)ethan-1-ol Experimental for Example 7

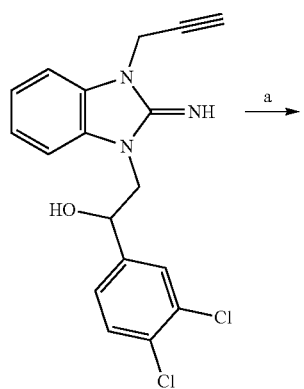 →ᵃ

40

-continued

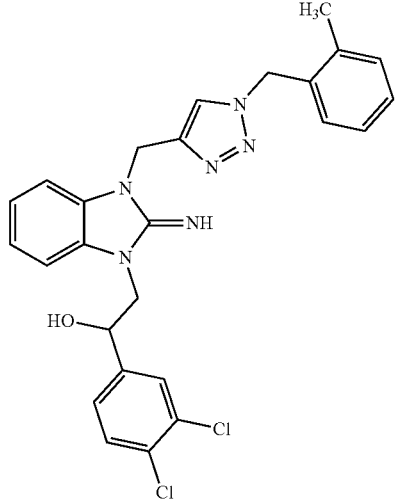

(a) 1-(azidomethyl)-2-methylbenzene, CuSO₄·5H₂O,
sodium ascorbate, H₂O:DCM (1:3), RT, 11 h, 53%.

1-(3,4-dichlorophenyl)-2-(2-imino-3-((1-(2-methylbenzyl)-1H-1,2,3-triazol-4-yl)methyl)-2,3-dihydro-1H-benzo[d]imidazol-1-yl)ethan-1-ol Using the typical Procedure A 1-(3,4-dichlorophenyl)-2-(2-imino-3-(prop-2-yn-1-yl)-2,3-dihydro-1H-benzo[d]imidazol-1-yl)ethan-1-ol Example 6 (0.072 g, 0.199 mmol), 1-(azidomethyl)-2-methylbenzene (0.059 g, 0.398 mmol), copper (II) sulfate pentahydrate (0.002 g, 0.008 mmol), sodium ascorbate (0.020 mL, 0.022 mmol, 1M solution in water) in 2 mL water:dichloromethane (1:3) mixture was stirred at RT for 11 h. Solvent was removed under reduced pressure, mixture was extracted with dichloromethane, and the organic phase was evaporated to obtain crude residue. Added dichloromethane and SiO₂ and concentrated to make a silica plug. Purification by flash chromatography (50% ethyl acetate in hexanes, 17:0.5:1 dichloromethane:methanol: 35% ammonium hydroxide) afforded 1-(3,4-dichlorophenyl)-2-(2-imino-3-((1-(2-methylbenzyl)-1H-1,2,3-triazol-4-yl)methyl)-2,3-dihydro-1H-benzo[d]imidazol-1-yl)ethan-1-ol (0.054 g, 53%) as a white solid. $^1$H NMR (600 MHz, MeOD) δ 7.80 (1H, s), 7.60 (1H, d, J=1.2 Hz), 7.37 (1H, d, J=7.8 Hz), 7.32-7.30 (1H, m), 7.27-7.13 (4H, m), 7.07-7.06 (1H, m), 6.99-6.95 (2H, m), 6.93-6.92 (1H, m), 5.59 (2H, s), 5.16 (2H, s), 5.09-5.07 (1H, m), 4.10-4.02 (2H, m), 2.29 (3H, s); LCMS m/z 507.2279 ([M+H]$^+$, C$_{26}$H$_{25}$Cl$_2$N$_6$O requires 507.1461).

Experimental for Example 8

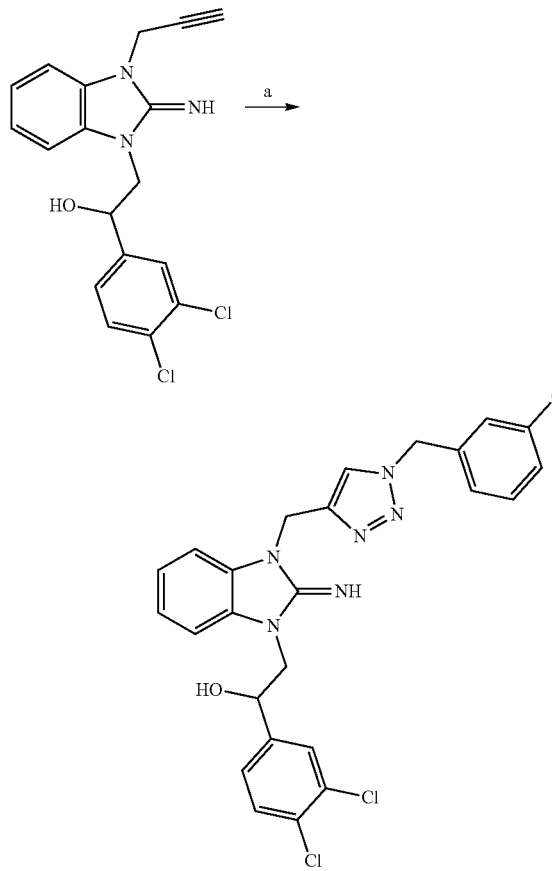

(a) 1-(azidomethyl)-2-methylbenzene, CuSO$_4$·5H$_2$O, sodium ascorbate, H$_2$O:DCM (1:3), RT, 11 h, 84%.

1-(3,4-dichlorophenyl)-2-(2-imino-3-((1-(3-methyl-benzyl)-1H-1,2,3-triazol-4-yl)methyl)-2,3-dihydro-1H-benzo[d]imidazol-1-yl)ethan-1-ol Using the typical Procedure A 1-(3,4-dichlorophenyl)-2-(2-imino-3-(prop-2-yn-1-yl)-2,3-dihydro-1H-benzo[d]imidazol-1-yl)ethan-1-ol Example 6 (0.072 g, 0.199 mmol), 1-(azidomethyl)-3-methylbenzene (0.059 g, 0.398 mmol), copper (II) sulfate pentahydrate (0.002 g, 0.008 mmol), sodium ascorbate (0.020 mL, 0.022 mmol, 1M solution in water) in 2 mL water:acetonitrile (1:3) mixture was stirred at RT for 11 h. Solvent was removed under reduced pressure, mixture was extracted with dichloromethane, and the organic phase was evaporated to obtain crude residue. Added dichloromethane and SiO$_2$ and concentrated to make a silica plug. Purification by flash chromatography (50% ethyl acetate in hexanes, 17:0.5:1 dichloromethane: methanol: 35% ammonium hydroxide) afforded 1-(3,4-dichlorophenyl)-2-(2-imino-3-((1-(3-methylbenzyl)-1H-1,2,3-triazol-4-yl)methyl)-2,3-dihydro-1H-benzo[d]imidazol-1-yl)ethan-1-ol (0.085 g, 84%) as a white solid. $^1$H NMR (600 MHz, MeOD) δ 7.88 (1H, s0, 7.59 (1H, s), 7.35 (1H, d, J=7.8 Hz), 7.30 (1H, d, J=7.8 Hz), 7.23 (1H, t, J=7.2 Hz), 7.15-7.04 (4H, m), 6.97-6.94 (2H, m), 6.91-6.90 (1H, m), 5.52 (2H, s), 5.16 (2H, s), 5.09-5.07 (1H, m), 4.09-4.01 (2H, m); LCMS m/z 507.2666 ([M+H$^+$], C$_{26}$H$_{25}$Cl$_2$N$_6$O requires 507.1461).

Experimental for Example 9

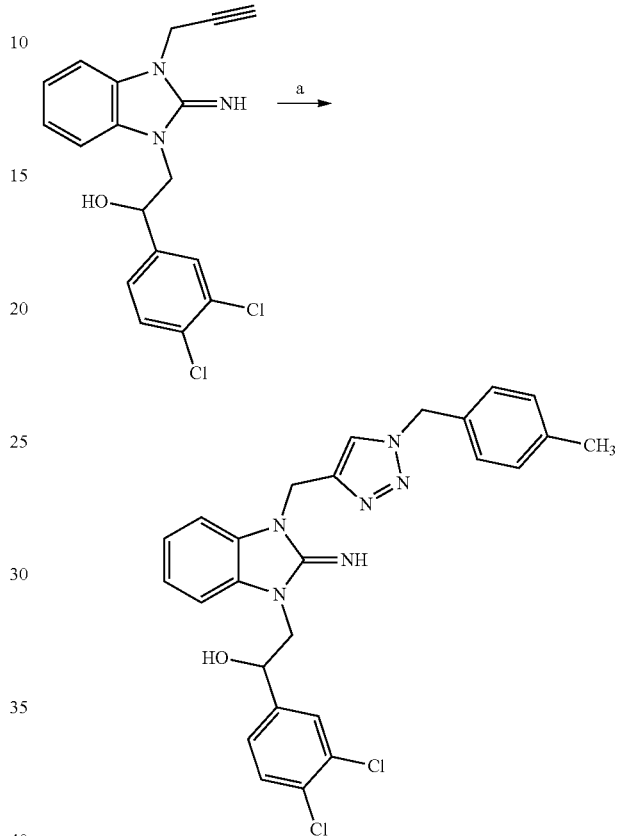

(a) 1-(azidomethyl)-4-methylbenzene, CuSO$_4$·5H$_2$O, sodium ascorbate, H$_2$O:t-BuOH (1:3), RT, 11 h, 70%.

1-(3,4-dichlorophenyl)-2-(2-imino-3-((1-(4-methyl-benzyl)-1H-1,2,3-triazol-4-yl)methyl)-2,3-dihydro-1H-benzo[d]imidazol-1-yl)ethan-1-ol Using the typical Procedure A 1-(3,4-dichlorophenyl)-2-(2-imino-3-(prop-2-yn-1-yl)-2,3-dihydro-1H-benzo[d]imidazol-1-yl)ethan-1-ol Example 6 (0.072 g, 0.199 mmol), 1-(azidomethyl)-4-methylbenzene (0.059 g, 0.398 mmol), copper (II) sulfate pentahydrate (0.002 g, 0.008 mmol), sodium ascorbate (0.020 mL, 0.022 mmol, 1M solution in water) in 2 mL water:tert-butanol (1:3) mixture was stirred at RT for 11 h. Solvent was removed under reduced pressure, mixture was extracted with dichloromethane, and the organic phase was evaporated to obtain crude residue. Added dichloromethane and SiO$_2$ and concentrated to make a silica plug. Purification by flash chromatography (50% ethyl acetate in hexanes, 17:0.5:1 dichloromethane: methanol: 35% ammonium hydroxide) afforded 1-(3,4-dichlorophenyl)-2-(2-imino-3-((1-(4-methylbenzyl)-1H-1,2,3-triazol-4-yl)methyl)-2,3-dihydro-1H-benzo[d]imidazol-1-yl)ethan-1-ol (0.071 g, 70%) as a white solid. $^1$H NMR (600 MHz, MeOD) δ 7.87 (1H, s), 7.60 (1H, s), 7.36 (1H, d, J=8.4 Hz), 7.30 (1H, d, J=8.4 Hz), 7.20-7.16 (4H, m), 7.06-7.04

(1H, m), 6.98-6.94 (2H, m), 6.91-6.90 (1H, m), 5.51 (2H, s), 5.16 (2H, s), 5.09-5.08 (1H, m), 4.09-4.01 (2H, m), 2.32 (3H, s); LCMS m/z 507.2116 ([M+H$^+$], C$_{26}$H$_{25}$Cl$_2$N$_6$O requires 507.1461).

Experimental for Example 10

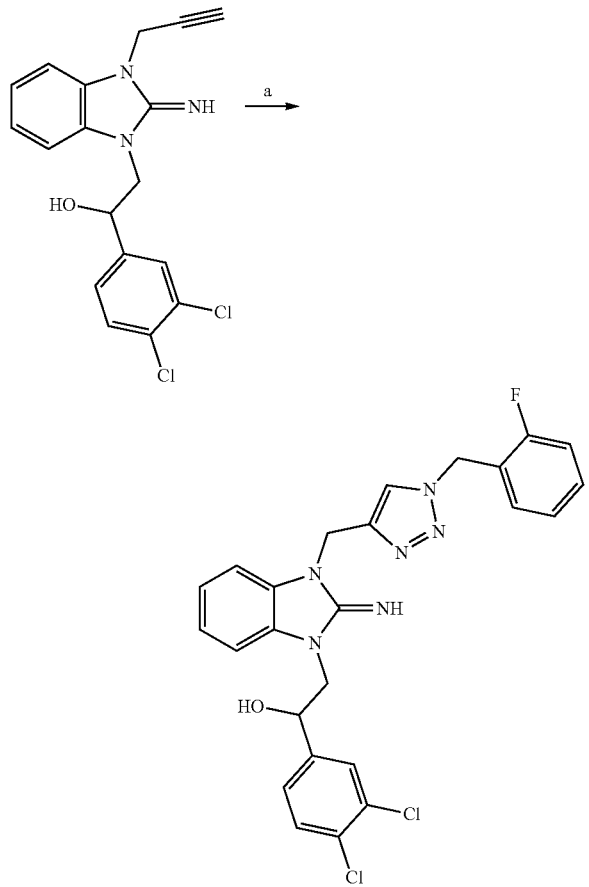

(a) 1-(azidomethyl)-2-fluorobenzene, CuSO$_4$·5H$_2$O, sodium ascorbate, H$_2$O:acetonitrile (1:3), RT, 11 h, 30%.

1-(3,4-dichlorophenyl)-2-(3-((1-(2-fluorobenzyl)-1H-1,2,3-triazol-4-yl)methyl)-2-imino-2,3-dihydro-1H-benzo[d]imidazol-1-yl)ethan-1-ol Using the typical Procedure A 1-(3,4-dichlorophenyl)-2-(2-imino-3-(prop-2-yn-1-yl)-2,3-dihydro-1H-benzo[d]imidazol-1-yl)ethan-1-ol Example 6 (0.072 g, 0.199 mmol), 1-(azidomethyl)-2-fluorobenzene (0.060 g, 0.398 mmol), copper (II) sulfate pentahydrate (0.002 g, 0.008 mmol), sodium ascorbate (0.020 mL, 0.022 mmol, 1M solution in water) in 2 mL water:acetonitrile (1:3) mixture was stirred at RT for 11 h. Solvent was removed under reduced pressure, mixture was extracted with dichloromethane, and the organic phase was evaporated to obtain crude residue. Added dichloromethane and SiO$_2$ and concentrated to make a silica plug. Purification by flash chromatography (50% ethyl acetate in hexanes, 17:0.5:1 dichloromethane: methanol: 35% ammonium hydroxide) afforded 1-(3,4-dichlorophenyl)-2-(3-((1-(2-fluorobenzyl)-1H-1,2,3-triazol-4-yl)methyl)-2-imino-2,3-dihydro-1H-benzo[d]imidazol-1-yl)ethan-1-ol (0.031 g, 30%) as a white solid. $^1$H NMR (600 MHz, MeOD) δ 7.93 (1H, s), 7.58 (1H, d, J=1.8 Hz), 7.39-7.35 (2H, m), 7.31-7.27 (2H, m), 7.16-7.11 (2H, m), 7.04-7.03 (1H, m), 6.95-6.91 (2H, m), 6.89-6.87 (1H, m), 5.61 (2H, s), 5.13 (2H, s), 5.07 (1H, dd, J=7.2, 4.8 Hz), 4.06-3.98 (2H, m); LCMS m/z 511.2391 ([M+H$^+$], C$_{25}$H$_{22}$Cl$_2$FN$_6$O requires 511.1211).

Experimental for Example 11

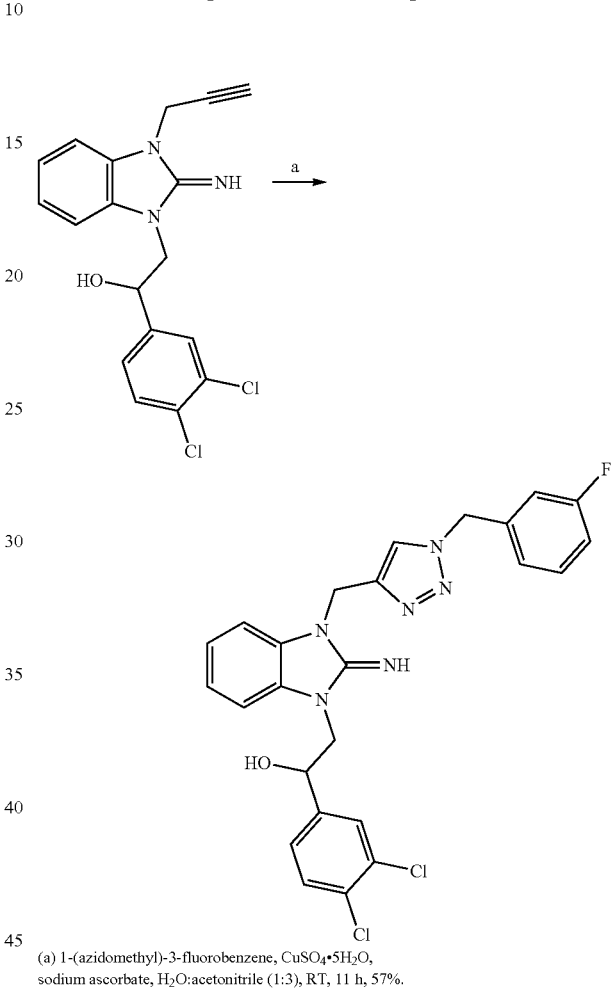

(a) 1-(azidomethyl)-3-fluorobenzene, CuSO$_4$·5H$_2$O, sodium ascorbate, H$_2$O:acetonitrile (1:3), RT, 11 h, 57%.

1-(3,4-dichlorophenyl)-2-(3-((1-(3-fluorobenzyl)-1H-1,2,3-triazol-4-yl)methyl)-2-imino-2,3-dihydro-1H-benzo[d]imidazol-1-yl)ethan-1-ol Using the typical Procedure A 1-(3,4-dichlorophenyl)-2-(2-imino-3-(prop-2-yn-1-yl)-2,3-dihydro-1H-benzo[d]imidazol-1-yl)ethan-1-ol Example 6 (0.072 g, 0.199 mmol), 1-(azidomethyl)-3-fluorobenzene (0.060 g, 0.398 mmol), copper (II) sulfate pentahydrate (0.002 g, 0.008 mmol), sodium ascorbate (0.020 mL, 0.022 mmol, 1M solution in water) in 2 mL water:acetonitrile (1:3) mixture was stirred at RT for 11 h. Solvent was removed under reduced pressure, mixture was extracted with dichloromethane, and the organic phase was evaporated to obtain crude residue. Added dichloromethane and SiO$_2$ and concentrated to make a silica plug. Purification by flash chromatography (50% ethyl acetate in hexanes, 17:0.5:1 dichloromethane: methanol: 35% ammonium hydroxide) afforded 1-(3,4-dichlorophenyl)-2-(3-((1-(3-fluorobenzyl)-1H-1,2,3-triazol-4-yl)methyl)-2-imino-2,3-dihydro-1H-benzo[d]imidazol-1-yl)ethan-1-ol (0.058 g, 57%) as an off-white solid. $^1$H NMR (600 MHz, MeOD) δ 7.95 (1H, s), 7.58 (1H, d, J=1.8 Hz), 7.37-7.35 (2H, m), 7.31 (1H, dd, J=8.4, 1.2 Hz), 7.10-7.02 (4H, m), 6.97-6.93 (2H, m), 6.90-6.88 (1H, m), 5.57 (2H, s), 5.16 (2H, s), 5.09-5.07 (1H, m), 4.08-3.99 (2H, m); LCMS m/z 511.2284 ([M+H$^+$], $C_{25}H_{22}Cl_2FN_6O$ requires 511.1211).

Experimental for Example 12

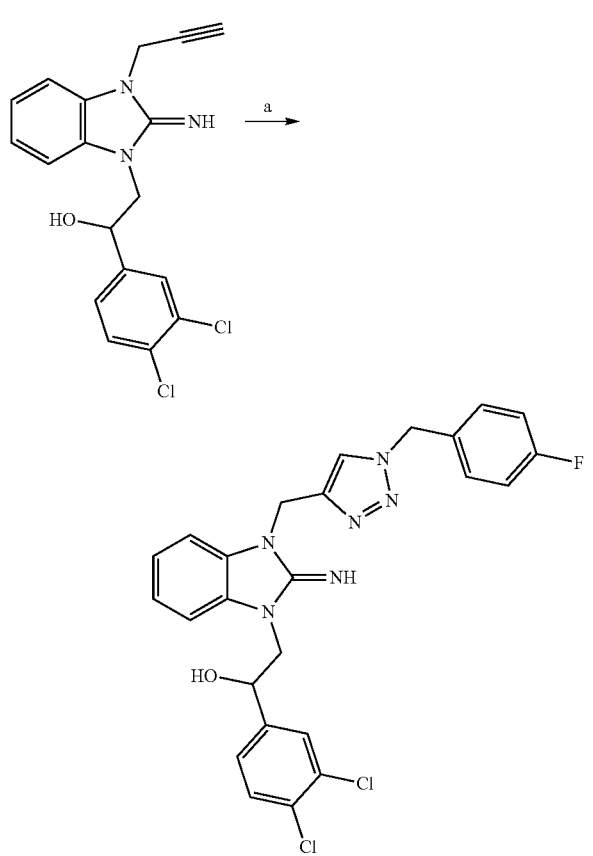

(a) 1-(azidomethyl)-4-fluorolbenzene, CuSO$_4$•5H$_2$O, sodium ascorbate, H$_2$O:t-BuOH (1:3), RT, 11 h, 20%.

1-(3,4-dichlorophenyl)-2-(3-((1-(4-fluorobenzyl)-1H-1,2,3-triazol-4-yl)methyl)-2-imino-2,3-dihydro-1H-benzo[d]imidazol-1-yl)ethan-1-ol Using the typical Procedure A 1-(3,4-dichlorophenyl)-2-(2-imino-3-(prop-2-yn-1-yl)-2,3-dihydro-1H-benzo[d]imidazol-1-yl)ethan-1-ol Example 6 (0.072 g, 0.199 mmol), 1-(azidomethyl)-4-fluorobenzene (0.060 g, 0.398 mmol), copper (II) sulfate pentahydrate (0.002 g, 0.008 mmol), sodium ascorbate (0.020 mL, 0.022 mmol, 1M solution in water) in 2 mL water:tert-butanol (1:3) mixture was stirred at RT for 11 h. Solvent was removed under reduced pressure, mixture was extracted with dichloromethane, and the organic phase was evaporated to obtain crude residue. Added dichloromethane and SiO$_2$ and concentrated to make a silica plug. Purification by flash chromatography (50% ethyl acetate in hexanes, 17:0.5:1 dichloromethane: methanol: 35% ammonium hydroxide) afforded 1-(3,4-dichlorophenyl)-2-(3-((1-(4-fluorobenzyl)-1H-1,2,3-triazol-4-yl)methyl)-2-imino-2,3-dihydro-1H-benzo[d]imidazol-1-yl)ethan-1-ol (0.020 g, 20%) as a white solid. $^1$H NMR (600 MHz, MeOD) δ 7.91 (1H, s), 7.59 (1H, s), 7.37-7.30 (4H, m), 7.09-7.03 (3H, m), 6.95-6.89 (3H, m), 5.53 (2H, s), 5.14 (2H, s), 5.09-5.07 (1H, m), 4.07-3.99 (2H, m); LCMS m/z 511.2631 ([M+H$^+$], $C_{25}H_{22}Cl_2FN_6O$ requires 511.1211).

Experimental for Example 13

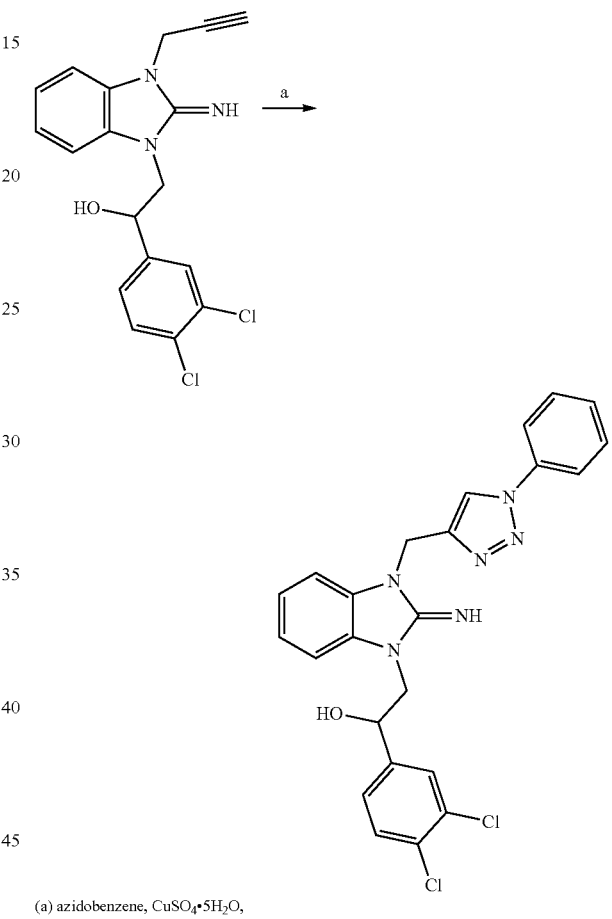

(a) azidobenzene, CuSO$_4$•5H$_2$O, sodium ascorbate, H$_2$O:acetonitrile (1:3), RT, 11 h, 61%.

1-(3,4-dichlorophenyl)-2-(2-imino-3-((1-phenyl-1H-1,2,3-triazol-4-yl)methyl)-2,3-dihydro-1H-benzo[d]imidazol-1-yl)ethan-1-ol Using the typical Procedure A 1-(3,4-dichlorophenyl)-2-(2-imino-3-(prop-2-yn-1-yl)-2,3-dihydro-1H-benzo[d]imidazol-1-yl)ethan-1-ol Example 6 (0.047 g, 0.398 mmol), copper (II) sulfate pentahydrate (0.002 g, 0.008 mmol), sodium ascorbate (0.020 mL, 0.022 mmol, 1M solution in water) in 2 mL water:acetonitrile (1:3) mixture was stirred at RT for 11 h. Solvent was removed under reduced pressure, mixture was extracted with dichloromethane, and the organic phase was evaporated to obtain crude residue. Added dichloromethane and SiO$_2$ and concentrated to make a silica plug. Purification by flash chromatography (50% ethyl acetate in hexanes, 17:0.5:1 dichloromethane:methanol: 35% ammonium hydroxide) afforded 1-(3,4-dichlorophenyl)-2-(2-imino-3-((1-phenyl-1H-1,2,3-triazol-4-yl)methyl)-2,3-dihydro-1H-benzo[d]imidazol-1-yl)ethan-1-ol (0.058 g, 61%) as a light brown film. $^1$H NMR (600 MHz, MeOD) δ 8.47 (1H, s), 7.80 (2H, d, J=7.8 Hz), 7.60-7.55 (3H, m), 7.49 (1H, t, J=7.8 Hz), 7.41-7.35 (2H, m), 7.21 (1H, d, J=7.2 Hz), 7.05-6.98 (3H, m), 5.30 (2H, s), 5.13-5.11 (1H, m), 4.15-4.07 (2H, m); LCMS m/z 479.1639 ([M+H$^+$], $C_{24}H_{21}Cl_2N_6O$ requires 479.1148).

Experimental for Example 14

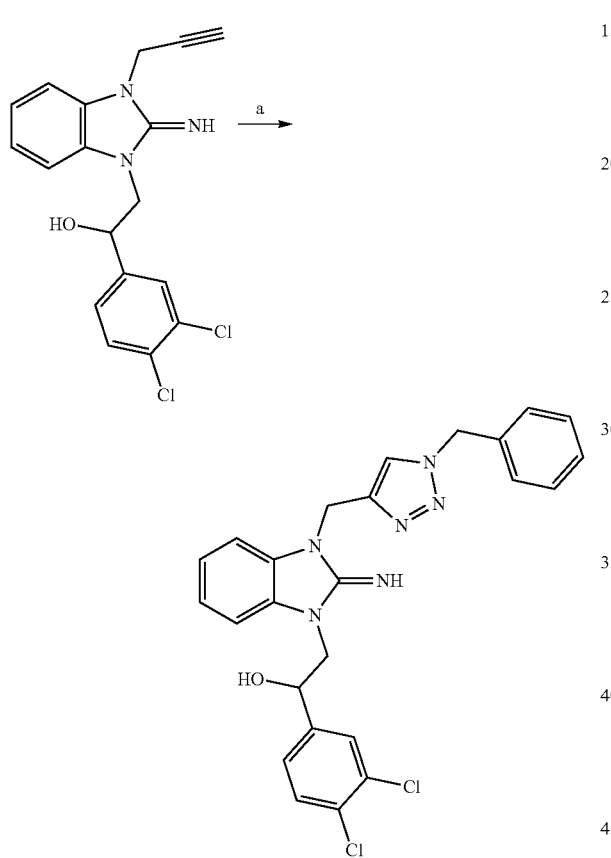

(a) (azidomethyl)benzene, CuSO$_4$·5H$_2$O, sodium ascorbate, H$_2$O:acetonitrile (1:3), RT, 11 h, 39%.

1-(3,4-dichlorophenyl)-2-(2-imino-3-((1-(2-methylbenzyl)-1H-1,2,3-triazol-4-yl)methyl)-2,3-dihydro-1H-benzo[d]imidazol-1-yl)ethan-1-ol Using the typical Procedure A 1-(3,4-dichlorophenyl)-2-(2-imino-3-(prop-2-yn-1-yl)-2,3-dihydro-1H-benzo[d]imidazol-1-yl)ethan-1-ol Example 6 (0.072 g, 0.199 mmol), (azidomethyl)benzene (0.053 g, 0.398 mmol), copper (II) sulfate pentahydrate (0.002 g, 0.008 mmol), sodium ascorbate (0.020 mL, 0.022 mmol, 1M solution in water) in 2 mL water:acetonitrile (1:3) mixture was stirred at RT for 11 h. Solvent was removed under reduced pressure, mixture was extracted with dichloromethane, and the organic phase was evaporated to obtain crude residue. Added dichloromethane and SiO$_2$ and concentrated to make a silica plug. Purification by flash chromatography (50% ethyl acetate in hexanes, 17:0.5:1 dichloromethane: methanol: 35% ammonium hydroxide) afforded 1-(3,4-dichlorophenyl)-2-(2-imino-3-((1-(2-methylbenzyl)-1H-1,2,3-triazol-4-yl)methyl)-2,3-dihydro-1H-benzo[d]imidazol-1-yl)ethan-1-ol (0.038 g, 39%) as a white solid. $^1$H NMR (600 MHz, MeOD) δ 7.89 (1H, s), 7.59 (1H, s), 7.36-7.26 (7H, m), 7.03-7.02 (1H, m), 6.94-6.92 (2H, m), 6.899-6.892 (1H, m), 5.53 (2H, s), 5.12 (2H, s), 5.08-5.06 (1H, m), 4.05-3.98 (2H, m); LCMS m/z 493.7606 ([M+H$^+$], $C_{25}H_{23}Cl_2N_6O$ requires 493.1305).

Experimental for Example 15

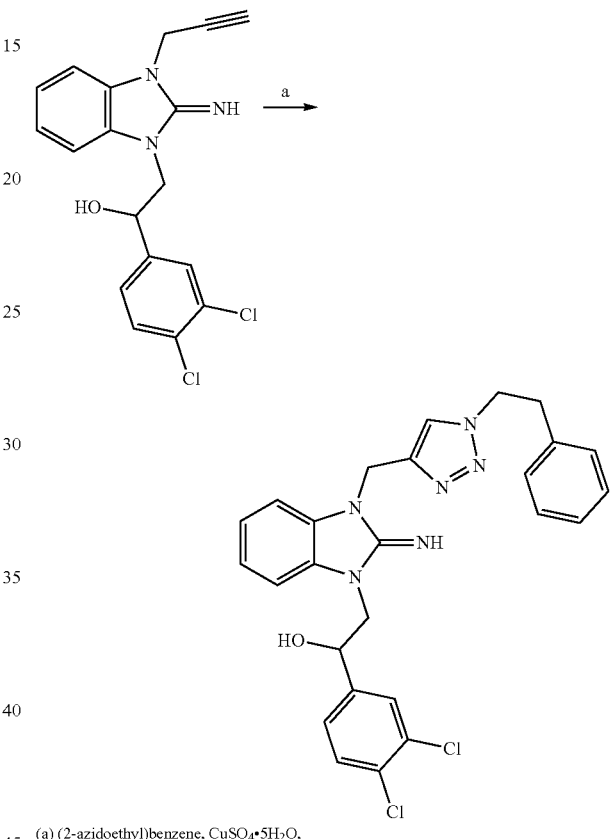

(a) (2-azidoethyl)benzene, CuSO$_4$·5H$_2$O, sodium ascorbate, H$_2$O:acetonitrile (1:3), RT, 11 h, 72%.

1-(3,4-dichlorophenyl)-2-(2-imino-3-((1-phenethyl-1H-1,2,3-triazol-4-yl)methyl)-2,3-dihydro-1H-benzo[d]imidazol-1-yl)ethan-1-ol Using the typical Procedure A 1-(3,4-dichlorophenyl)-2-(2-imino-3-(prop-2-yn-1-yl)-2,3-dihydro-1H-benzo[d]imidazol-1-yl)ethan-1-ol Example 6 (0.072 g, 0.199 mmol), (2-azidoethyl)benzene (0.78 mL, 0.398 mmol, 0.5 M in 2-methoxy-2-methyl propane), copper (II) sulfate pentahydrate (0.002 g, 0.008 mmol), sodium ascorbate (0.020 mL, 0.022 mmol, 1M solution in water) in 2 mL water:acetonitrile (1:3) mixture was stirred at RT for 11 h. Solvent was removed under reduced pressure, mixture was extracted with dichloromethane, and the organic phase was evaporated to obtain crude residue. Added dichloromethane and SiO$_2$ and concentrated to make a silica plug. Purification by flash chromatography (50% ethyl acetate in hexanes, 17:0.5:1 dichloromethane:methanol: 35% ammonium hydroxide) afforded 1-(3,4-dichlorophenyl)-2-(2-imino-3-

((1-phenethyl-1H-1,2,3-triazol-4-yl)methyl)-2,3-dihydro-1H-benzo[d]imidazol-1-yl)ethan-1-ol (0.073 g, 72%) as a light pink solid. $^1$H NMR (600 MHz, MeOD) δ 7.61-7.60 (2H, m), 7.42 (1H, d, J=8.4 Hz), 7.36-7.34 (1H, m), 7.14-7.13 (3H, m), 7.02-6.96 (6H, m), 5.13 (2H, s), 5.11-5.09 (1H, m), 4.62 (2H, t, J=7.2 Hz), 4.12-4.04 (2H, m), 3.16 (2H, t, J=7.2 Hz); LCMS m/z 507.4361 ([M+H$^+$], $C_{26}H_{25}Cl_2N_6O$ requires 507.1461).

Experimental for Example 17

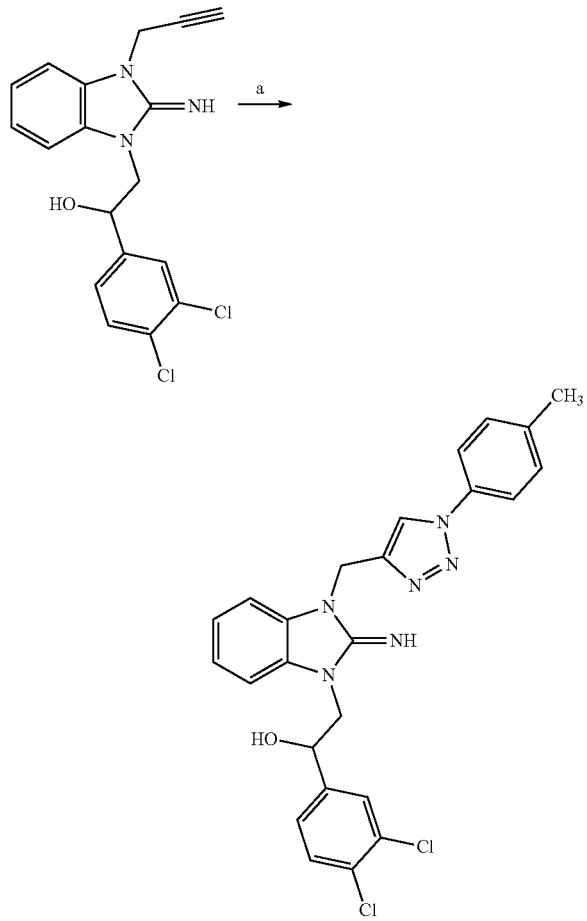

(a) 1-azido-4-methylbenzene, CuSO$_4$·5H$_2$O, sodium ascorbate, H$_2$O:Acetonitrile (1:3), RT, 11 h, 55%.

1-(3,4-dichlorophenyl)-2-(2-imino-3-((1-(p-tolyl)-1H-1,2,3-triazol-4-yl)methyl)-2,3-dihydro-1H-benzo[d]imidazol-1-yl)ethan-1-ol Using the typical Procedure A 1-(3,4-dichlorophenyl)-2-(2-imino-3-(prop-2-yn-1-yl)-2,3-dihydro-1H-benzo[d]imidazol-1-yl)ethan-1-ol Example 6 (0.120 g, 0.333 mmol), 1-azido-4-methylbenzene (0.089 g, 0.666 mmol), copper (II) sulfate pentahydrate (0.002 g, 0.008 mmol), sodium ascorbate (0.020 mL, 0.022 mmol, 1M solution in water) in 2 mL water:acetonitrile (1:3) mixture was stirred at RT for 11 h. Solvent was removed under reduced pressure, mixture was extracted with dichloromethane, and the organic phase was evaporated to obtain crude residue. Added dichloromethane and SiO$_2$ and concentrated to make a silica plug. Purification by flash chromatography (50% ethyl acetate in hexanes, 17:0.5:1 dichloromethane:methanol: 35% ammonium hydroxide) afforded 1-(3,4-dichlorophenyl)-2-(2-imino-3-((1-(p-tolyl)-1H-1,2,3-triazol-4-yl)methyl)-2,3-dihydro-1H-benzo[d]imidazol-1-yl)ethan-1-ol (0.090 g, 55%) as a white solid. $^1$H NMR (600 MHz, MeOD) δ 8.40 (1H, s), 7.67 (2H, d, J=8.4 Hz), 7.60 (1H, d, J=1.2 Hz), 7.41-7.34 (4H, m), 7.15 (1H, d, J=7.2 Hz), 7.01-6.94 (3H, m), 5.25 (2H, s), 5.12-5.10 (1H, m), 4.11-4.03 (2H, m), 2.42 (3H, s); HRMS m/z 493.1354 ([M+H$^+$], $C_{25}H_{23}Cl_2N_6O$ requires 493.1305).

Experimental for Example 18

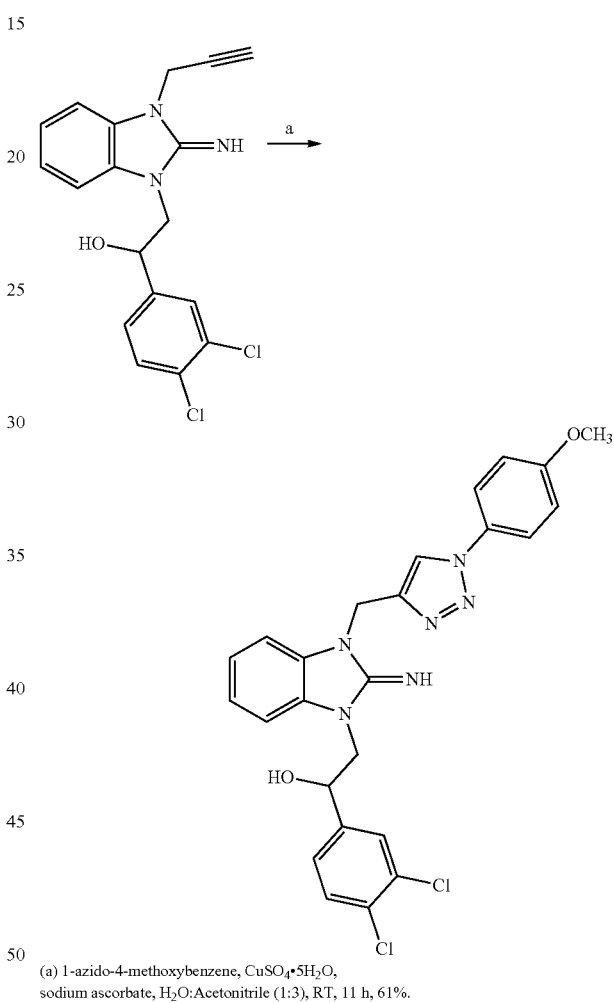

(a) 1-azido-4-methoxybenzene, CuSO$_4$·5H$_2$O, sodium ascorbate, H$_2$O:Acetonitrile (1:3), RT, 11 h, 61%.

1-(3,4-dichlorophenyl)-2-(2-imino-3-((1-(4-methoxyphenyl)-1H-1,2,3-triazol-4-yl)methyl)-2,3-dihydro-1H-benzo[d]imidazol-1-yl)ethan-1-ol Using the typical Procedure A 1-(3,4-dichlorophenyl)-2-(2-imino-3-(prop-2-yn-1-yl)-2,3-dihydro-1H-benzo[d]imidazol-1-yl)ethan-1-ol Example 6 (0.120 g, 0.333 mmol), 1-azido-4-methoxybenzene (0.099 g, 0.666 mmol), copper (II) sulfate pentahydrate (0.002 g, 0.008 mmol), sodium ascorbate (0.020 mL, 0.022 mmol, 1M solution in water) in 2 mL water:acetonitrile (1:3) mixture was stirred at RT for 11 h. Solvent was removed under reduced pressure, mixture was extracted with dichloromethane, and the organic phase was evaporated to obtain crude residue. Added dichloromethane and SiO$_2$ and concentrated to make a silica plug. Purification by flash chromatography (50% ethyl acetate in hexanes, 17:0.5:1 dichloromethane: methanol: 35% ammonium hydroxide) afforded 1-(3,4-dichlorophenyl)-2-(2-imino-3-((1-(4-methoxyphenyl)-1H-1,2,3-triazol-4-yl)methyl)-2,3-dihydro-1H-benzo[d]imidazol-1-yl)ethan-1-ol (0.089 g, 61%) as a white solid. $^1$H NMR (600 MHz, MeOD) δ 8.35 (1H, s), 7.71 (2H, d, J=9.0 Hz), 7.61 (1H, br s), 7.42-7.35 (2H, m), 7.17 (1H, d, J=7.2 Hz), 7.10 (2H, d, J=9.0 Hz), 7.03-6.96 (3H, m), 5.27 (2H, s), 5.12-5.10 (1H, m), 4.13-4.06 (2H, m), 3.87 (3H, s); HRMS m/z 509.1247 ([M+H$^+$], C$_{25}$H$_{23}$Cl$_2$N$_6$O$_2$ requires 509.1254).

Experimental for Example 19 water:acetonitrile (1:3) mixture was stirred at RT for 11 h. Solvent was removed under reduced pressure, mixture was extracted with dichloromethane, and the organic phase was evaporated to obtain crude residue. Added dichloromethane and SiO$_2$ and concentrated to make a silica plug. Purification by flash chromatography (50% ethyl acetate in hexanes, 17:0.5:1 dichloromethane:methanol: 35% ammonium hydroxide) afforded 1-(3,4-dichlorophenyl)-2-(3-((1-(4-fluorophenyl)-1H-1,2,3-triazol-4-yl)methyl)-2-imino-2,3-dihydro-1H-benzo[d]imidazol-1-yl)ethan-1-ol (0.047 g, 28%) as a white solid. $^1$H NMR (600 MHz, MeOD) δ 8.44 (1H, s), 7.86-7.84 (2H, m), 7.60 (1H, br s), 7.42-7.32 (4H, m), 7.18 (1H, d, J=7.8 Hz), 7.04-6.97 (3H, m), 5.29 (2H, s), 5.12-5.10 (1H, m), 4.14-4.06 (2H, m); LCMS m/z 497.1180 ([M+H$^+$], C$_{24}$H$_{20}$Cl$_2$FN$_6$O requires 497.1054).

Experimental for Example 20

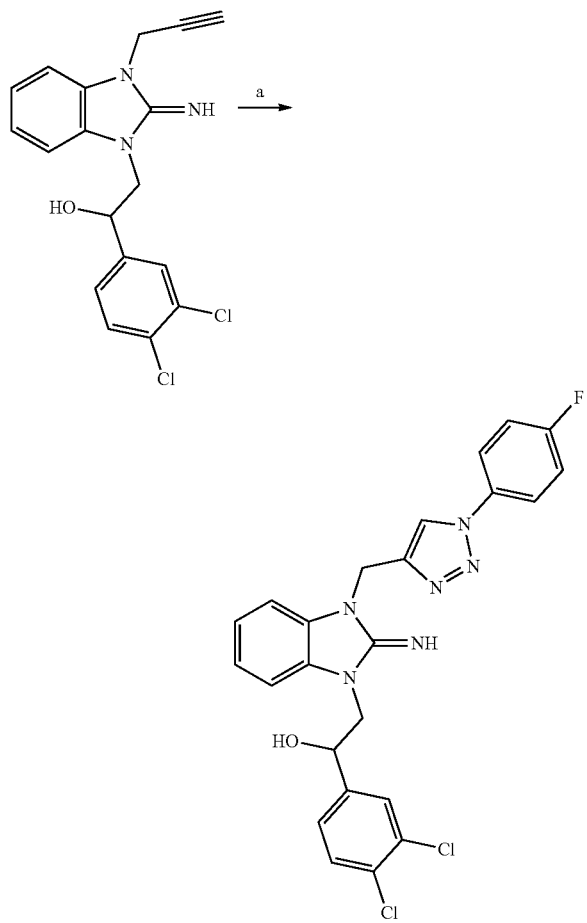

(a) 1-azido-4 fluorobenzene, CuSO$_4$·5H$_2$O, sodium ascorbate, H$_2$O:Acetonitrile (1:3), RT, 11 h, 28%.

1-(3,4-dichlorophenyl)-2-(3-((1-(4-fluorophenyl)-1H-1,2,3-triazol-4-yl)methyl)-2-imino-2,3-dihydro-1H-benzo[d]imidazol-1-yl)ethan-1-ol Using the typical Procedure A 1-(3,4-dichlorophenyl)-2-(2-imino-3-(prop-2-yn-1-yl)-2,3-dihydro-1H-benzo[d]imidazol-1-yl)ethan-1-ol Example 6 (0.120 g, 0.333 mmol), 1-azido-4-fluorobenzene (0.091 g, 0.666 mmol), copper (II) sulfate pentahydrate (0.002 g, 0.008 mmol), sodium ascorbate (0.020 mL, 0.022 mmol, 1M solution in water) in 2 mL

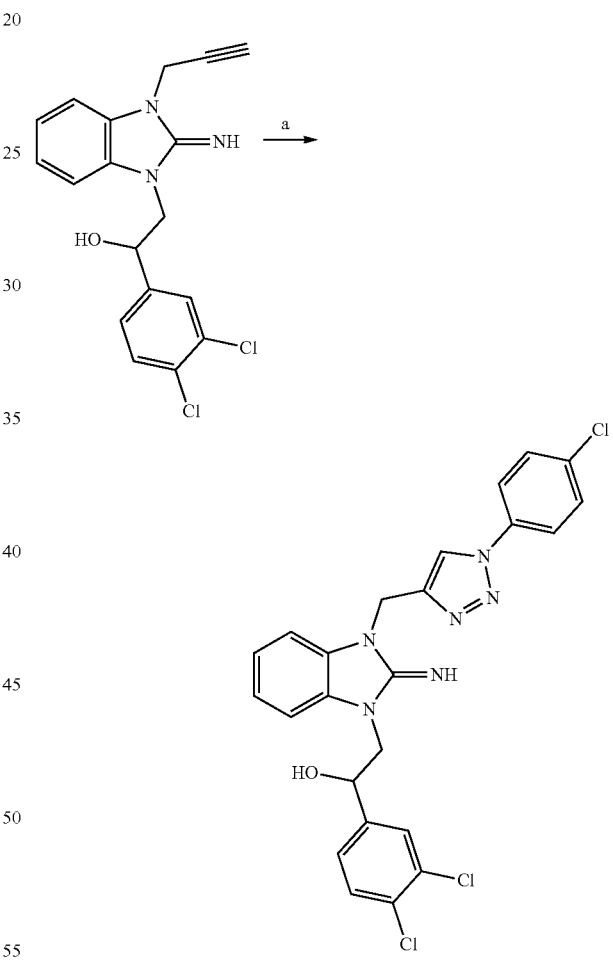

(a) 1-azido-4 chlorobenzene, CuSO$_4$·5H$_2$O, sodium ascorbate, H$_2$O:Acetonitrile (1:3), RT, 11 h, 16%.

2-(3-((1-(4-chlorophenyl)-1H-1,2,3-triazol-4-yl)methyl)-2-imino-2,3-dihydro-1H-benzo[d]imidazol-1-yl)-1-(3,4-dichlorophenyl)ethan-1-ol Using the typical Procedure A 1-(3,4-dichlorophenyl)-2-(2-imino-3-(prop-2-yn-1-yl)-2,3-dihydro-1H-benzo[d]imidazol-1-yl)ethan-1-ol Example 6 (0.120 g, 0.333 mmol), 1-azido-4-chlorobenzene (0.102 g, 0.666 mmol), copper (II)

sulfate pentahydrate (0.002 g, 0.008 mmol), sodium ascorbate (0.020 mL, 0.022 mmol, 1M solution in water) in 2 mL water:acetonitrile (1:3) mixture was stirred at RT for 11 h. Solvent was removed under reduced pressure, mixture was extracted with dichloromethane, and the organic phase was evaporated to obtain crude residue. Added dichloromethane and SiO$_2$ and concentrated to make a silica plug. Purification by flash chromatography (50% ethyl acetate in hexanes, 17:0.5:1 dichloromethane:methanol: 35% ammonium hydroxide) afforded 2-(3-((1-(4-chlorophenyl)-1H-1,2,3-triazol-4-yl)methyl)-2-imino-2,3-dihydro-1H-benzo[d]imidazol-1-yl)-1-(3,4-dichlorophenyl)ethan-1-ol (0.027 g, 16%) as a white solid. $^1$H NMR (600 MHz, MeOD) δ 8.48 (1H, s), 7.84 (1H, d, J=9.0 Hz), 7.60 (1H, d, J=8.4 Hz), 7.42-7.36 (2H, m), 7.18 (1H, d, J=7.2 Hz), 7.04-6.97 (3H, m), 5.29 (2H, s), 5.12-5.10 (1H, m), 4.14-4.06 (2H, m); LCMS m/z 513.0727 ([M+H$^+$], C$_{24}$H$_{20}$C$_{13}$N$_6$O requires 513.0759).

Experimental for Example 21

1-azido-2-methylbenzene (0.089 g, 0.666 mmol), copper (II) sulfate pentahydrate (0.002 g, 0.008 mmol), sodium ascorbate (0.020 mL, 0.022 mmol, 1M solution in water) in 2 mL water:acetonitrile (1:3) mixture was stirred at RT for 11 h. Solvent was removed under reduced pressure, mixture was extracted with dichloromethane, and the organic phase was evaporated to obtain crude residue. Added dichloromethane and SiO$_2$ and concentrated to make a silica plug. Purification by flash chromatography (50% ethyl acetate in hexanes, 17:0.5:1 dichloromethane:methanol: 35% ammonium hydroxide) afforded 1-(3,4-dichlorophenyl)-2-(2-imino-3-((1-(o-tolyl)-1H-1,2,3-triazol-4-yl)methyl)-2,3-dihydro-1H-benzo[d]imidazol-1-yl)ethan-1-ol (0.025 g, 15%) as a white solid. $^1$H NMR (600 MHz, MeOD) δ 8.15 (1H, s), 7.62 (1H, br s), 7.50-7.45 (2H, m), 7.42-7.36 (4H, m), 7.19-7.18 (1H, m), 7.04-6.99 (3H, m), 5.32 (2H, s), 5.12-5.11 (1H, m), 4.15-4.09 (2H, m), 2.16 (3H, s); HRMS m/z 493.1307 ([M+H$^+$], C$_{25}$H$_{23}$Cl$_2$N$_6$O requires 493.1305).

Experimental for Example 22

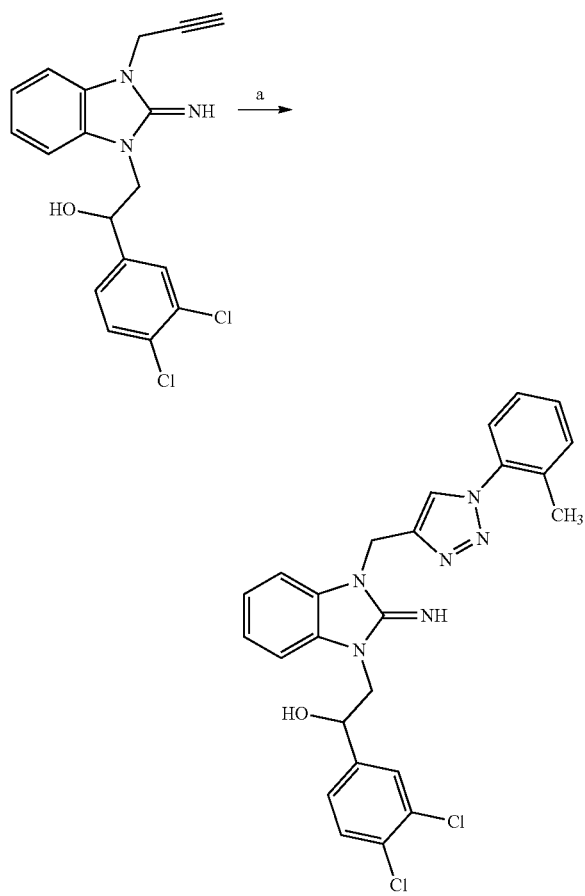

(a) 1-azido-2-methylbenzene, CuSO$_4$·5H$_2$O, sodium ascorbate, H$_2$O:Acetonitrile (1:3), RT, 11 h, 15%.

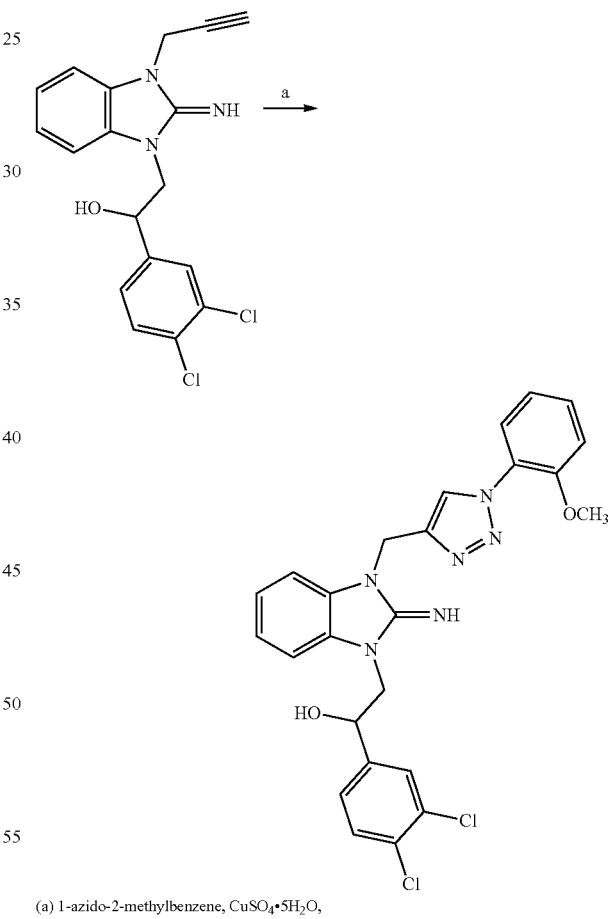

(a) 1-azido-2-methylbenzene, CuSO$_4$·5H$_2$O, sodium ascorbate, H$_2$O:Acetonitrile (1:3), RT, 11 h, 38%.

1-(3,4-dichlorophenyl)-2-(2-imino-3-((1-(o-tolyl)-1H-1,2,3-triazol-4-yl)methyl)-2,3-dihydro-1H-benzo[d]imidazol-1-yl)ethan-1-ol Using the typical Procedure A 1-(3,4-dichlorophenyl)-2-(2-imino-3-(prop-2-yn-1-yl)-2,3-dihydro-1H-benzo[d]imidazol-1-yl)ethan-1-ol Example 6 (0.120 g, 0.333 mmol), 1-(3,4-dichlorophenyl)-2-(2-imino-3-((1-(2-methoxyphenyl)-1H-1,2,3-triazol-4-yl)methyl)-2,3-dihydro-1H-benzo[d]imidazol-1-yl)ethan-1-ol Using the typical Procedure A 1-(3,4-dichlorophenyl)-2-(2-imino-3-(prop-2-yn-1-yl)-2,3-dihydro-1H-benzo[d]imidazol-1-yl)ethan-1-ol Example 6 (0.120 g, 0.333 mmol), 1-azido-2-methoxybenzene (0.099 g, 0.666 mmol), copper (II) sulfate pentahydrate (0.002 g, 0.008 mmol), sodium ascorbate (0.020 mL, 0.022 mmol, 1M solution in water) in 2 mL water:acetonitrile (1:3) mixture was stirred at RT for 11 h. Solvent was removed under reduced pressure, mixture was extracted with dichloromethane, and the organic phase was evaporated to obtain crude residue. Added dichloromethane and SiO$_2$ and concentrated to make a silica plug. Purification by flash chromatography (50% ethyl acetate in hexanes, 17:0.5:1 dichloromethane: methanol: 35% ammonium hydroxide) afforded 1-(3,4-dichlorophenyl)-2-(2-imino-3-((1-(2-methoxyphenyl)-1H-1,2,3-triazol-4-yl)methyl)-2,3-dihydro-1H-benzo[d]imidazol-1-yl)ethan-1-ol (0.065 g, 38%) as a white solid. $^1$H NMR (600 MHz, MeOD) δ 8.31 (1H, s), 7.65 (1H, d, J=7.8 Hz), 7.59 (1H, br s), 7.52 (1H, t, J=8.4 Hz), 7.39-7.33 (2H, m), 7.28 (1H, d, J=8.4 Hz), 7.19 (1H, d, J=7.2 Hz), 7.14 (1H, t, J=7.8 Hz), 7.04-6.94 (3H, m), 5.29 (2H, s), 5.12 (1H, br s), 4.14-4.07 (2H, m), 3.89 (3H, s); LCMS m/z 509.1244 ([M+H$^+$], C$_{25}$H$_{23}$Cl$_2$N$_6$O$_2$ requires 509.1254).

Experimental for Example 23

1-(3,4-dichlorophenyl)-2-(3-((1-(2-fluorophenyl)-1H-1,2,3-triazol-4-yl)methyl)-2-imino-2,3-dihydro-1H-benzo[d]imidazol-1-yl)ethan-1-ol Using the typical Procedure A 1-(3,4-dichlorophenyl)-2-(2-imino-3-(prop-2-yn-1-yl)-2,3-dihydro-1H-benzo[d]imidazol-1-yl)ethan-1-ol Example 6 (0.120 g, 0.333 mmol), 1-azido-2-fluorobenzene (0.091 g, 0.666 mmol), copper (II) sulfate pentahydrate (0.002 g, 0.008 mmol), sodium ascorbate (0.020 mL, 0.022 mmol, 1M solution in water) in 2 mL water: acetonitrile (1:3) mixture was stirred at RT for 11 h. Solvent was removed under reduced pressure, mixture was extracted with dichloromethane, and the organic phase was evaporated to obtain crude residue. Added dichloromethane and SiO$_2$ and concentrated to make a silica plug. Purification by flash chromatography (50% ethyl acetate in hexanes, 17:0.5:1 dichloromethane:methanol: 35% ammonium hydroxide) afforded 1-(3,4-dichlorophenyl)-2-(3-((1-(2-fluorophenyl)-1H-1,2,3-triazol-4-yl)methyl)-2-imino-2,3-dihydro-1H-benzo[d]imidazol-1-yl)ethan-1-ol (0.035 g, 21%) as a white solid. $^1$H NMR (600 MHz, MeOD) δ 8.36 (1H, d, J=1.8 Hz), 7.85 (1H, t, J=6.6 Hz), 7.60-7.56 (2H, m), 7.46-7.39 (3H, m), 7.35-7.34 (1H, m), 7.19 (1H, d, J=7.8 Hz), 7.04-6.96 (3H, m), 5.30 (2H, s), 5.12-5.10

Experimental for Example 24

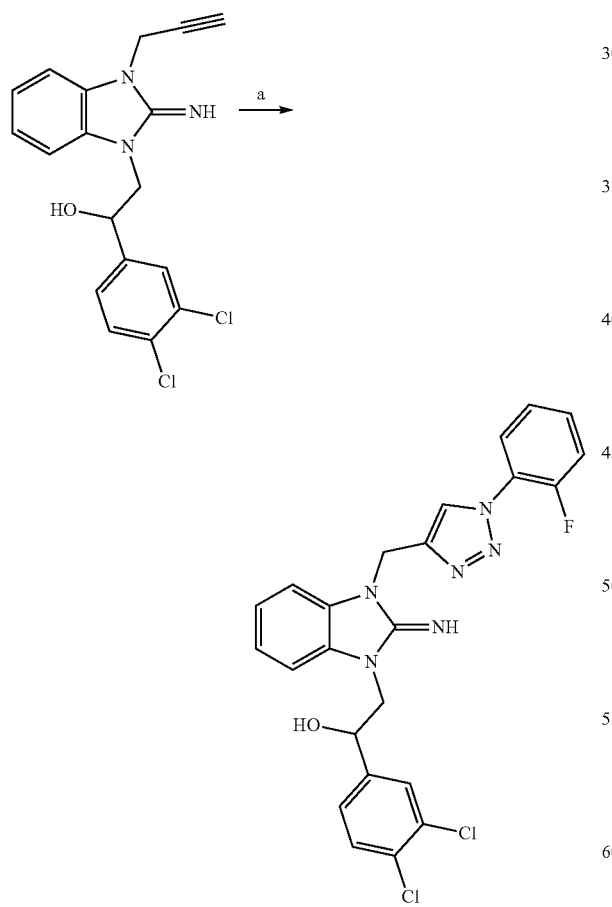

(a) 1-azido-3-fluorobenzene, CuSO$_4$•5H$_2$O, sodium ascorbate, H$_2$O:Acetonitrile (1:3), RT, 11 h, 28%.

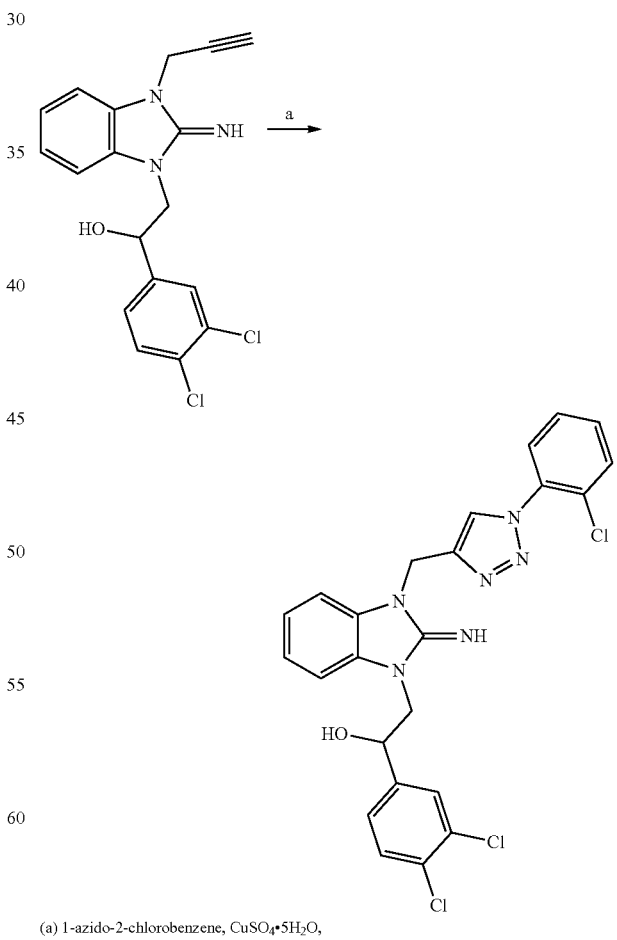

(a) 1-azido-2-chlorobenzene, CuSO$_4$•5H$_2$O, sodium ascorbate, H$_2$O:Acetonitrile (1:3), RT, 11 h, 12%.

2-(3-((1-(2-chlorophenyl)-1H-1,2,3-triazol-4-yl)methyl)-2-imino-2,3-dihydro-1H-benzo[d]imidazol-1-yl)-1-(3,4-dichlorophenyl)ethan-1-ol Using the typical Procedure A 1-(3,4-dichlorophenyl)-2-(2-imino-3-(prop-2-yn-1-yl)-2,3-dihydro-1H-benzo[d]imidazol-1-yl)ethan-1-ol Example 6 (0.120 g, 0.333 mmol), 1-azido-2-chlorobenzene (0.102 g, 0.666 mmol), copper (II) sulfate pentahydrate (0.002 g, 0.008 mmol), sodium ascorbate (0.020 mL, 0.022 mmol, 1M solution in water) in 2 mL water:acetonitrile (1:3) mixture was stirred at RT for 11 h. Solvent was removed under reduced pressure, mixture was extracted with dichloromethane, and the organic phase was evaporated to obtain crude residue. Added dichloromethane and SiO$_2$ and concentrated to make a silica plug. Purification by flash chromatography (50% ethyl acetate in hexanes, 17:0.5:1 dichloromethane:methanol: 35% ammonium hydroxide) afforded 2-(3-((1-(2-chlorophenyl)-1H-1,2,3-triazol-4-yl)methyl)-2-imino-2,3-dihydro-1H-benzo[d]imidazol-1-yl)-1-(3,4-dichlorophenyl)ethan-1-ol (0.021 g, 12%) as an off-white solid. $^1$H NMR (600 MHz, MeOD) δ 8.39 (1H, s), 7.72-7.70 (1H, m), 7.66 (1H, br s), 7.63-7.60 (2H, m), 7.57-7.55 (1H, m), 7.45-7.44 (1H, s), 7.39-7.38 (2H, m), 7.19-7.17 (3H, m), 5.48 (2H, s), 5.14 (1H, m), 4.28-4.22 (2H, m); LCMS m/z 513.0759 ([M+H$^+$], C$_{24}$H$_{20}$C$_{13}$N$_6$O requires 513.0759).

1-(3,4-dichlorophenyl)-2-(2-imino-3-((1-(m-tolyl)-1H-1,2,3-triazol-4-yl)methyl)-2,3-dihydro-1H-benzo[d]imidazol-1-yl)ethan-1-ol Using the typical Procedure A 1-(3,4-dichlorophenyl)-2-(2-imino-3-(prop-2-yn-1-yl)-2,3-dihydro-1H-benzo[d]imidazol-1-yl)ethan-1-ol Example 6 (0.120 g, 0.333 mmol), 1-azido-3-methylbenzene (0.089 g, 0.666 mmol), copper (II) sulfate pentahydrate (0.002 g, 0.008 mmol), sodium ascorbate (0.020 mL, 0.022 mmol, 1M solution in water) in 2 mL water:acetonitrile (1:3) mixture was stirred at RT for 11 h. Solvent was removed under reduced pressure, mixture was extracted with dichloromethane, and the organic phase was evaporated to obtain crude residue. Added dichloromethane and SiO$_2$ and concentrated to make a silica plug. Purification by flash chromatography (50% ethyl acetate in hexanes, 17:0.5:1 dichloromethane:methanol: 35% ammonium hydroxide) afforded 1-(3,4-dichlorophenyl)-2-(2-imino-3-((1-(m-tolyl)-1H-1,2,3-triazol-4-yl)methyl)-2,3-dihydro-1H-benzo[d]imidazol-1-yl)ethan-1-ol (0.105 g, 64%) as a white solid. $^1$H NMR (600 MHz, MeOD) δ 8.44 (1H, s), 7.66 (1H, s), 7.60 (2H, br s), 7.45 (1H, t, J=7.8 Hz), 7.41-7.40 (1H, m), 7.36-7.32 (2H, m), 7.18 (1H, d, J=7.8 Hz), 7.04-6.96 (3H, m), 5.28 (2H, s), 5.13-5.11 (1H, m), 4.21-4.06 (2H, m), 2.46 (3H, s); LCMS m/z 493.1300 ([M+H$^+$], C$_{25}$H$_{23}$Cl$_2$N$_6$O requires 493.1305).

Experimental for Example 25

Experimental for Example 26

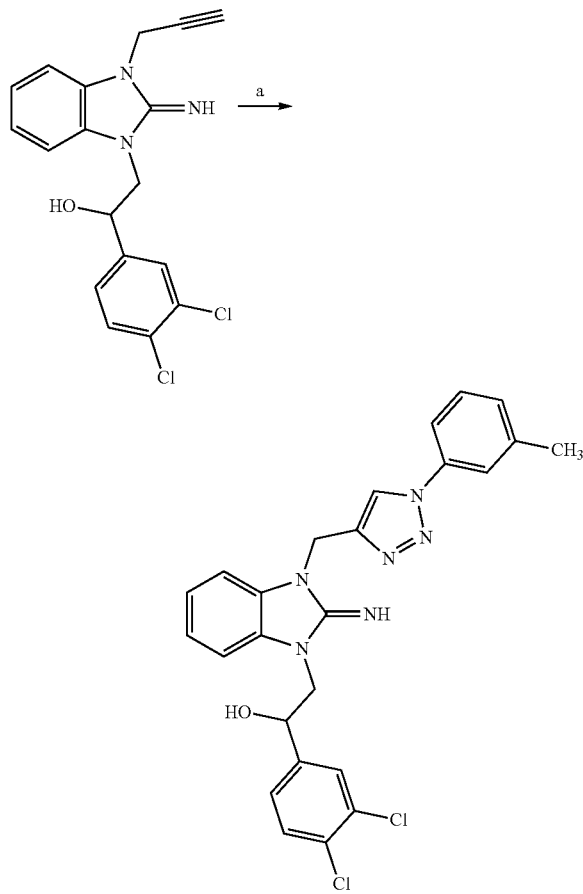

(a) 1-azido-3-methylbenzene, CuSO$_4$•5H$_2$O, sodium ascorbate, H$_2$O:Acetonitrile (1:3), RT, 11 h, 64%.

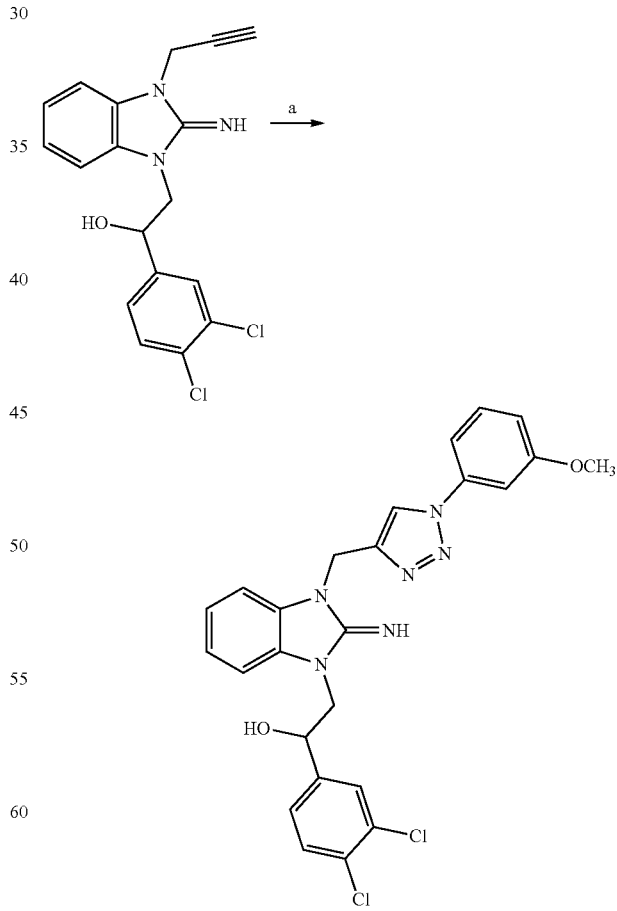

(a) 1-azido-3-methoxybenzene, CuSO$_4$•5H$_2$O, sodium ascorbate, H$_2$O:Acetonitrile (1:3), RT, 11 h, 54%.

1-(3,4-dichlorophenyl)-2-(2-imino-3-((1-(3-methoxyphenyl)-1H-1,2,3-triazol-4-yl)methyl)-2,3-dihydro-1H-benzo[d]imidazol-1-yl)ethan-1-ol (0.120 g, 0.333 mmol), 1-azido-3-methoxybenzene (0.099 g, 0.666 mmol), copper (II) sulfate pentahydrate (0.002 g, 0.008 mmol), sodium ascorbate (0.020 mL, 0.022 mmol, 1M solution in water) in 2 mL water:acetonitrile (1:3) mixture was stirred at RT for 11 h. Solvent was removed under reduced pressure, mixture was extracted with dichloromethane, and the organic phase was evaporated to obtain crude residue. Added dichloromethane and SiO$_2$ and concentrated to make a silica plug. Purification by flash chromatography (50% ethyl acetate in hexanes, 17:0.5:1 dichloromethane:methanol: 35% ammonium hydroxide) afforded 1-(3,4-dichlorophenyl)-2-(2-imino-3-((1-(3-methoxyphenyl)-1H-1,2,3-triazol-4-yl)methyl)-2,3-dihydro-1H-benzo[d]imidazol-1-yl)ethan-1-ol (0.092 g, 54%) as a white solid. $^1$H NMR (600 MHz, MeOD) δ 8.47 (1H, s), 7.60 (1H, d, J=1.8 Hz), 7.49-7.46 (1H, m), 7.41-7.35 (4H, m), 7.18-7.17 (1H, m), 7.06 (1H, dd, J=8.4, 2.4 Hz), 7.03-6.96 (3H, m), 5.28 (2H, s), 5.12-5.10 (1H, m), 4.13-4.06 (2H, m), 3.89 (3H, s); LCMS m/z 509.1238 ([M+H$^+$], C$_{25}$H$_{23}$Cl$_2$N$_6$O$_2$ requires 509.1254).

Experimental for Example 27

1-(3,4-dichlorophenyl)-2-(3-((1-(3-fluorophenyl)-1H-1,2,3-triazol-4-yl)methyl)-2-imino-2,3-dihydro-1H-benzo[d]imidazol-1-yl)ethan-1-ol Using the typical Procedure A 1-(3,4-dichlorophenyl)-2-(2-imino-3-(prop-2-yn-1-yl)-2,3-dihydro-1H-benzo[d]imidazol-1-yl)ethan-1-ol Example 6 (0.120 g, 0.333 mmol), 1-azido-3-fluorobenzene (0.091 g, 0.666 mmol), copper (II) sulfate pentahydrate (0.002 g, 0.008 mmol), sodium ascorbate (0.020 mL, 0.022 mmol, 1M solution in water) in 2 mL water:acetonitrile (1:3) mixture was stirred at RT for 11 h. Solvent was removed under reduced pressure, mixture was extracted with dichloromethane, and the organic phase was evaporated to obtain crude residue. Added dichloromethane and SiO$_2$ and concentrated to make a silica plug. Purification by flash chromatography (50% ethyl acetate in hexanes, 17:0.5:1 dichloromethane:methanol: 35% ammonium hydroxide) afforded 1-(3,4-dichlorophenyl)-2-(3-((1-(3-fluorophenyl)-1H-1,2,3-triazol-4-yl)methyl)-2-imino-2,3-dihydro-1H-benzo[d]imidazol-1-yl)ethan-1-ol (0.094 g, 57%) as an off-white solid. $^1$H NMR (600 MHz, MeOD) δ 8.52 (1H, s), 7.69 (2H, d, J=8.4 Hz), 7.62-7.58 (2H, m), 7.42-7.35 (2H, m), 7.26 (1H, t, J=8.1 Hz), 7.18 (1H, d, J=7.2 Hz), 7.04-6.96 (3H, m), 5.28 (2H, s), 5.11 (1H, t, J=6.0 Hz), 4.14-4.06 (2H, m); LCMS m/z 497.1067 ([M+H$^+$], C$_{24}$H$_{20}$Cl$_2$FN$_6$O requires 497.1054).

Experimental for Example 28

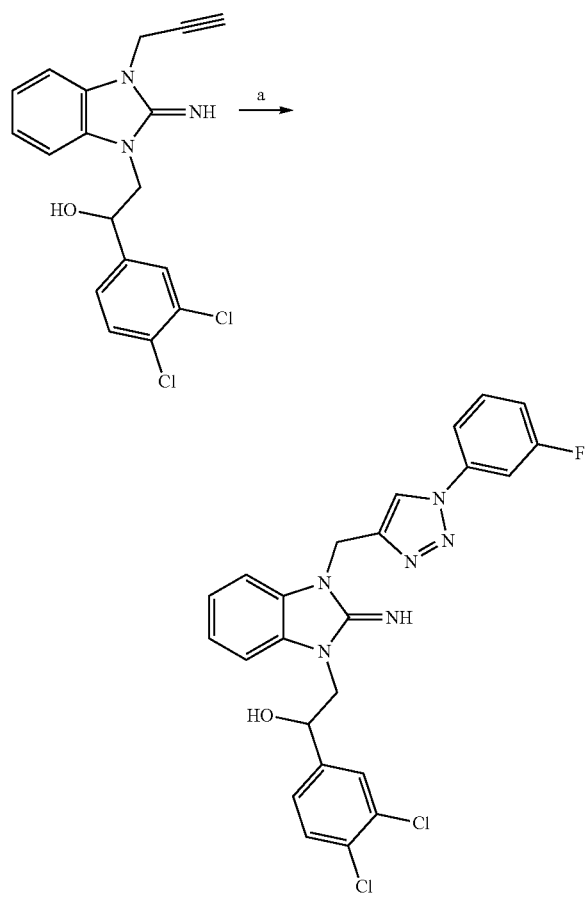

(a) 1-azido-3-fluorolbenzene, CuSO$_4$•5H$_2$O, sodium ascorbate, H$_2$O:Acetonitrile (1:3), RT, 11 h, 57%.

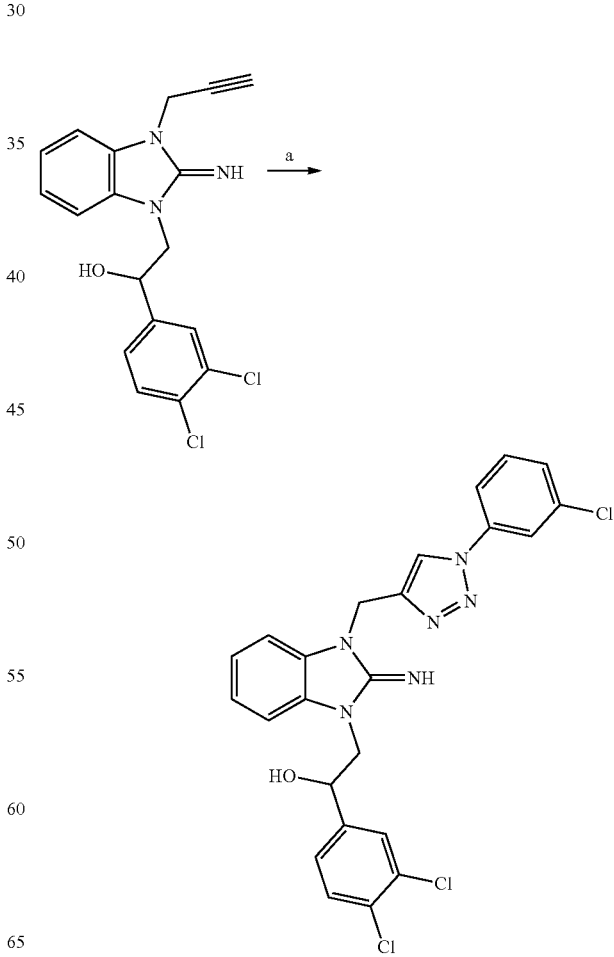

2-(3-((1-(3-chlorophenyl)-1H-1,2,3-triazol-4-yl)methyl)-2-imino-2,3-dihydro-1H-benzo[d]imidazol-1-yl)-1-(3,4-dichlorophenyl)ethan-1-ol Using the typical Procedure A 1-(3,4-dichlorophenyl)-2-(2-imino-3-(prop-2-yn-1-yl)-2,3-dihydro-1H-benzo[d]imidazol-1-yl)ethan-1-ol Example 6 (0.120 g, 0.333 mmol), 1-azido-3-chlorobenzene (0.102 g, 0.666 mmol), copper (II) sulfate pentahydrate (0.002 g, 0.008 mmol), sodium ascorbate (0.020 mL, 0.022 mmol, 1M solution in water) in 2 mL water:acetonitrile (1:3) mixture was stirred at RT for 11 h. Solvent was removed under reduced pressure, mixture was extracted with dichloromethane, and the organic phase was evaporated to obtain crude residue. Added dichloromethane and $SiO_2$ and concentrated to make a silica plug. Purification by flash chromatography (50% ethyl acetate in hexanes, 17:0.5:1 dichloromethane:methanol: 35% ammonium hydroxide) afforded 2-(3-((1-(3-chlorophenyl)-1H-1,2,3-triazol-4-yl)methyl)-2-imino-2,3-dihydro-1H-benzo[d]imidazol-1-yl)-1-(3,4-dichlorophenyl)ethan-1-ol (0.052 g, 30%) as an off-white solid. $^1$H NMR (600 MHz, MeOD) δ 8.52 (1H, s), 7.94 (1H, s), 7.80 (2H, d, J=7.8 Hz), 7.60-7.56 (2H, m), 7.52-7.51 (1H, m), 7.42-7.35 (2H, m), 7.18 (1H, d, J=7.2 Hz), 7.04-6.97 (3H, m), 5.29 (2H, s), 5.12-5.10 (1H, m), 4.14-4.06 (2H, m); HRMS m/z 513.0757 ([M+H$^+$], $C_{24}H_{20}C_{l3}N_6O$ requires 513.0759).

Scheme for Synthesis of Example 29

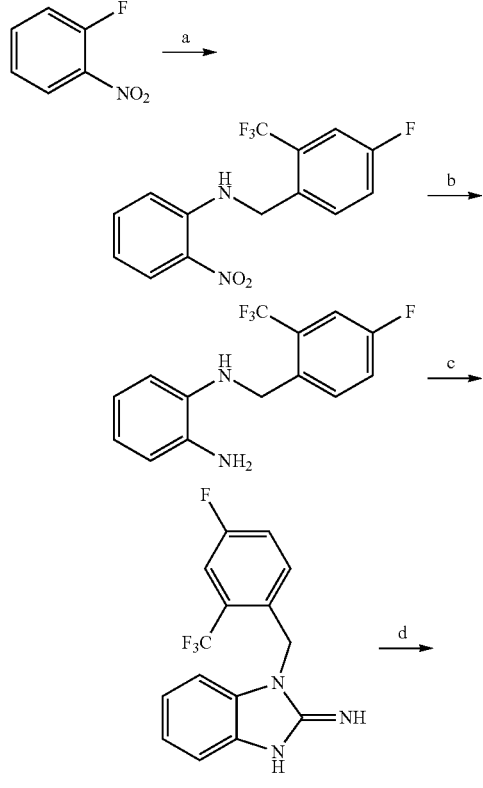

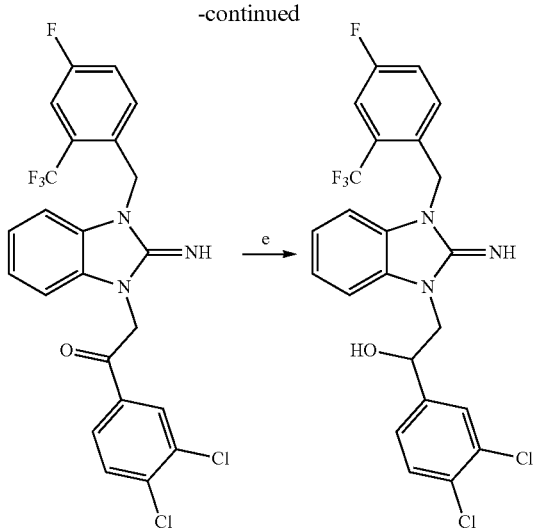

Reagents and conditions: (a) 4-Fluoro-2-(trifluoromethyl)benzylamine, DBU, acetonitrile, 90° C., 21 h, 5%; (b) Fe, acetic acid, water, ethanol, 100° C., 1 h; (c) Cyanogen bromide, methanol, RT, 1 h, 49% (over two steps); (d) 2-bromo-1-(3,4-dichlorophenyl)ethan-1-one, acetone, 50° C., 19 h, 74%; (e) NaBH$_4$, methanol, 50° C., 1 h, 80%.

Experimental for Example 29

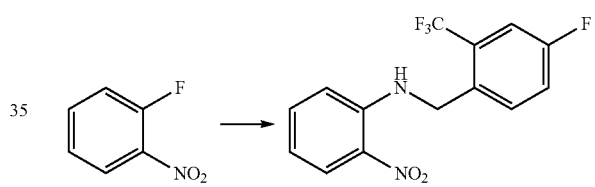

N-(4-fluoro-2-(trifluoromethyl)benzyl)-2-nitroaniline

1-Fluoro-2-nitrobenzene 1 (2.00 g, 14.2 mmol), 4-fluoro-2-trifluoromethyl)benzylamine (2.08 mL, 14.2 mmol), and 1,8-diazabicyclo[5.4.0]undec-7-ene (2.35 mL, 14.2 mmol) in acetonitrile (70.0 mL) were stirred in a sealed vessel at 90° C. for 21 h. The reaction mixture was concentrated under reduced pressure to give a dark-red residue. Silica and DCM was added to the residue to form a slurry, which was concentrated under reduced pressure to make a dry silica plug. Purification was done by flash chromatography (SiO$_2$, 0%-5% ethyl acetate in hexanes) and afforded N-(4-fluoro-2-(trifluoromethyl)benzyl)-2-nitroaniline (0.207 g, 5%) as a yellow solid. $^1$H NMR (600 MHz, DMSO-d$^6$) δ 8.67 (1H, t, J=6.0 Hz), 8.12 (1H, dd, J=8.4, 1.2 Hz), 7.69 (1H, dd, J=9.0, 2.4 Hz), 7.56-7.46 (3H, m), 6.74-6.72 (1H, m), 6.67 (1H, d, J=8.4), 4.76 (2H, d, J=6.0 Hz); HRMS m/z 315.0741 ([M+H$^+$], $C_{14}H_{10}F_4N_2O_2$ requires 315.0757).

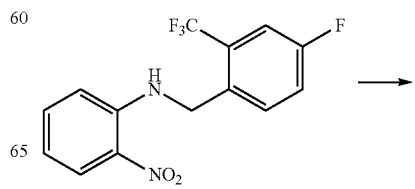

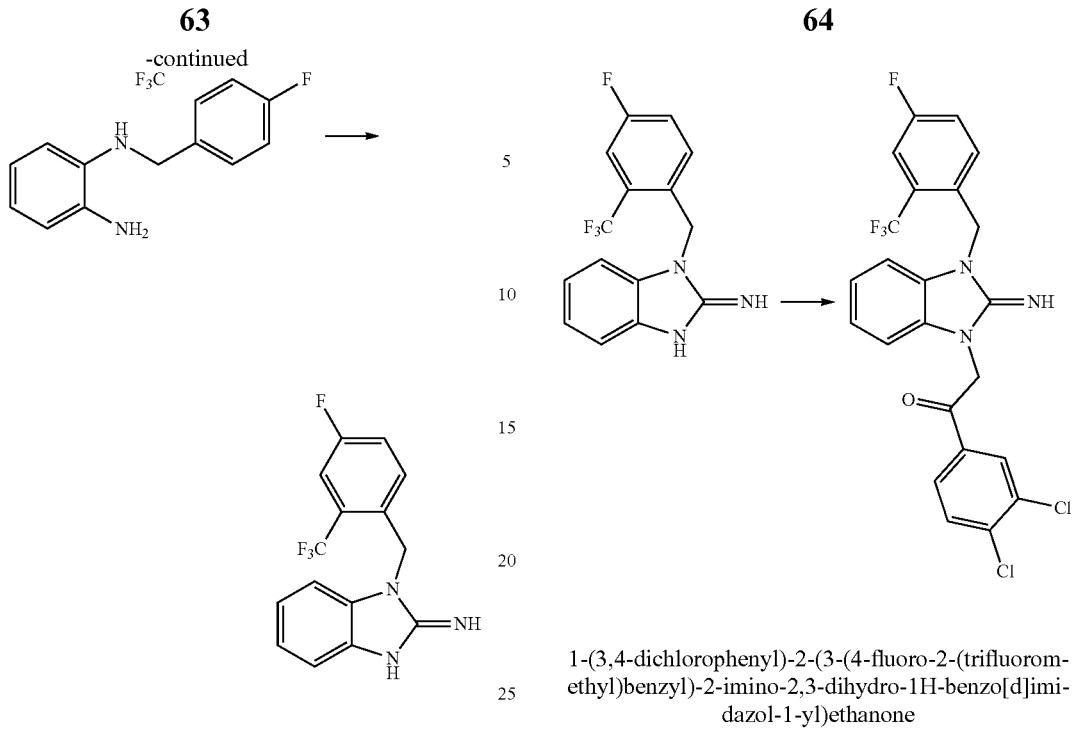

1-(4-Fluoro-2-(trifluoromethyl)benzyl)-1H-benzo[d]imidazol-2(3H)-imine

N-(4-fluoro-2-(trifluoromethyl)benzyl)-2-nitroaniline (0.175 g, 0.557 mmol), iron powder (0.466 g, 8.36 mmol), acetic acid (0.480 mL, 8.36 mmol) in EtOH (5.00 mL) and water (15.0 mL) were refluxed at 100° C. for 1 h. 2.5 N NaOH (15.0 mL) was added to the reaction mixture, the suspension was filtered through a celite pad while washing with boiling EtOAc. The organic layer was washed with brine and concentrated under reduced pressure to afford $N^1$-(4-fluoro-2-(trifluoromethyl)benzyl)benzene-1,2-diamine (crude 0.099 g), which was taken to the next step without further purification.

$N^1$-(4-fluoro-2-(trifluoromethyl)benzyl)benzene-1,2-diamine (0.099 g, 0.348 mmol) in methanol (0.600 mL) at 0° C. was treated with cyanogen bromide (0.073 g, 0.696 mmol). The reaction mixture was maintained at RT for 1 h. The reaction mixture was partitioned between EtOAc, saturated aq. NaHCO$_3$, and water. The organic layer was washed with saturated aq. NaCl solution. The aqueous phase was washed with DCM (×3) and concentrated under reduced pressure to obtain a residue. Purification was done by flash chromatography (SiO$_2$, 25%-100% EtOAc in hexanes, 17:0.5:1 DCM: MeOH: 35% NH$_4$OH) afforded 1-(4-fluoro-2-(trifluoromethyl)benzyl)-1H-benzo[d]imidazol-2(3H)-imine (0.085 g, 49% over two steps). $^1$H NMR (600 MHz, DMSO-d$^6$) δ 7.74-7.73 (1H, dd, J=9.0, 2.4 Hz), 7.44 (1H, td, J=8.4, 2.4 Hz), 7.20 (1H, d, J=7.8), 6.96 (1H, t, J=7.8), 6.81 (1H, t, J=7.2), 6.75 (1H, d, J=7.8), 6.63 (3H, m), 5.41 (2H, s); HRMS m/z 310.0962 ([M+H$^+$], C$_{15}$H$_{11}$F$_4$N$_3$ requires 310.0967).

1-(3,4-dichlorophenyl)-2-(3-(4-fluoro-2-(trifluoromethyl)benzyl)-2-imino-2,3-dihydro-1H-benzo[d]imidazol-1-yl)ethanone 1-(4-fluoro-2-(trifluoromethyl)benzyl)-1H-benzo[d]imidazol-2(3H)-imine (0.065 g, 0.210 mmol) and 2-bromo-1-(3,4-dichlorophenyl)ethanone (0.056 g, 0.210 mmol) were dissolved in acetone (9.0 mL). Sodium iodide (0.033 g, 0.220 mmol) was then added to the mixture and stirred at 50° C. for 19 h. The product was recovered as a solid via filtration while washing with acetone. The solid was then washed with hexanes to afford 1-(3,4-dichlorophenyl)-2-(3-(4-fluoro-2-(trifluoromethyl)benzyl)-2-imino-2,3-dihydro-1H-benzo[d]imidazol-1-yl)ethanone (0.077 g, 74%) as a white solid. $^1$H NMR (600 MHz, DMSO-d$^6$) δ 9.19 (1H, s), 8.39-8.38 (1H, m), 8.08 (1H, dd, J=8.4, 1.8 Hz), 7.99 (1H, d, J=8.4 Hz), 7.86 (1H, dd, J=9.0, 3.0 Hz), 7.74 (1H, d, J=7.8 Hz), 7.58 (1H, m), 7.32 (2H, dt, J=33.6, 7.8 Hz), 7.15 (1H, d, J=8.4 Hz), 7.03 (1H, m), 6.10 (2H, s), 5.68 (2H, s); HRMS m/z 496.0609 ([M+H$^+$], C$_{23}$H$_{15}$Cl$_2$F$_4$N$_3$O requires 496.0607).

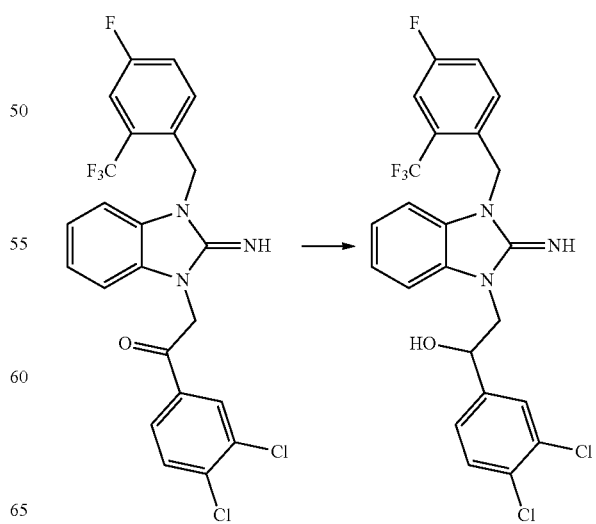

1-(3,4-dichlorophenyl)-2-(3-(4-fluoro-2-(trifluoromethyl)benzyl)-2-imino-2,3-dihydro-1H-benzo[d]imidazol-1-yl)ethanol 1-(3,4-dichlorophenyl)-2-(3-(4-fluoro-2-(trifluoromethyl)benzyl)-2-imino-2,3-dihydro-1H-benzo[d]imidazol-1-yl)ethanone (0.065 g, 0.130 mmol) in MeOH (15.0 mL) was cooled to 0° C. Sodium borohydride (0.009 g, 0.260 mmol) was added in portions. The reaction was then warmed to RT and stirred for 1 h. Water was added and the mixture was checked for a neutral/slightly basic pH. MeOH was first removed under reduced pressure, followed by the addition of water and DCM (3.00 mL of each). The organic phase was evaporated to obtain crude residue. DCM and $SiO_2$ was added to form a slurry and then concentrated under reduced pressure to make a dry silica plug. Purification was done by flash chromatography (25% EtOAc in hexanes, 100% 17:0.5:1 DCM: MeOH: 35% $NH_4OH$) afforded 1-(3,4-dichlorophenyl)-2-(3-(4-fluoro-2-(trifluoromethyl)benzyl)-2-imino-2,3-dihydro-1H-benzo[d]imidazol-1-yl)ethanol (0.052 g, 80%) as a white solid. $^1H$ NMR (600 MHz, DMSO-$d^6$) δ 7.73-7.72 (2H, m), 7.60 (1H, d, J=8.4 Hz), 7.44-7.44 (2H, m), 7.03 (1H, d, J=7.8 Hz), 6.89 (2H, m), 6.81 (1H, t, J=7.2 Hz), 6.58 (1H, d, J=7.2 Hz), 5.84 (1H, br s), 5.17 (2H, s), 5.05 (1H, s); HRMS m/z 498.0779 ([M+H$^+$], $C_{23}H_{17}Cl_2F_4N_3O$ requires 498.0763).

Scheme for Synthesis of Example 30

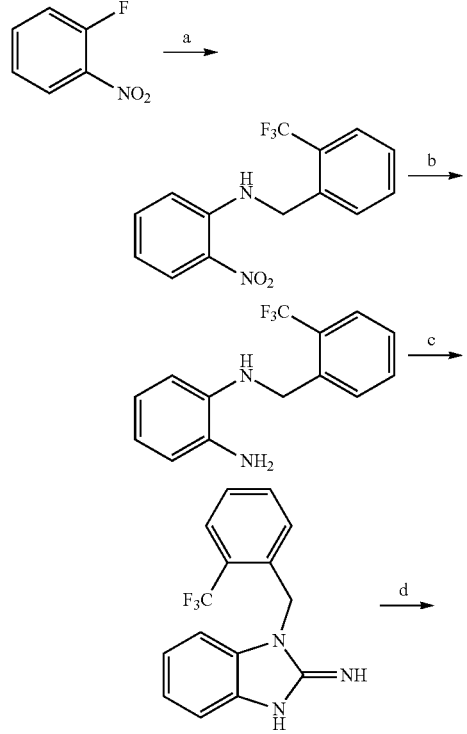

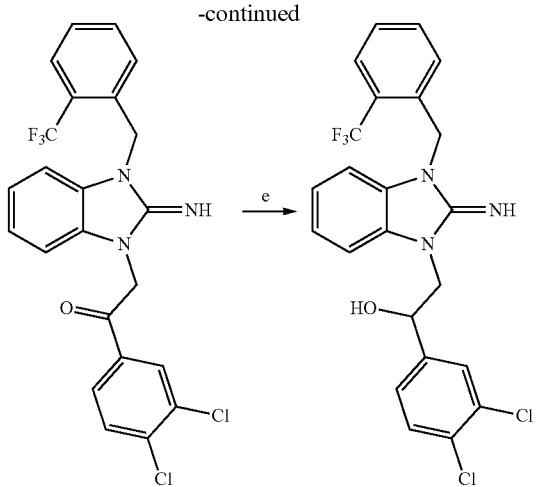

Reagents and conditions: (a) 2-(trifluoromethyl)benzylamine, DBU, acetonitrile, 90° C., 21 h, 6%; (b) Fe, acetic acid, water, ethanol, 100° C., 1 h; (c) Cyanogen bromide, methanol, RT, 1 h, 67% (over two steps); (d) 2-bromo-1-(3,4-dichlorophenyl)ethan-1-one, acetone, 50° C., 19 h, 74%; (e) NaBH$_4$, methanol, 50° C., 1 h, 77%.

Experimental for Example 30

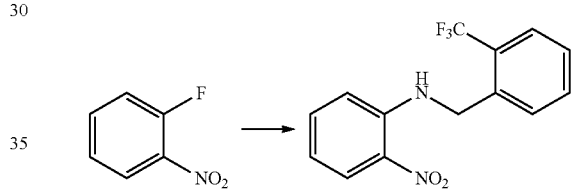

2-nitro-N-(2-(trifluoromethyl)benzyl)aniline

1-Fluoro-2-nitrobenzene (2.00 g, 14.2 mmol), 2-(trifluoromethyl)benzylamine (1.49 mL, 14.2 mmol), and 1,8-diazabicyclo[5.4.0]undec-7-ene (2.52 mL, 14.2 mmol) in acetonitrile (70.0 mL) were stirred in a sealed vessel at 90° C. for 21 h. The reaction mixture was concentrated under reduced pressure to give a dark-red residue. Silica and DCM was added to the residue to form a slurry, which was concentrated under reduced pressure to make a dry silica plug. Purification was done by flash chromatography ($SiO_2$, 0%-5% EtOAc in hexanes) and afforded 2-nitro-N-(2-(trifluoromethyl)benzyl)aniline (0.239 g, 6%) as a yellow solid. $^1H$ NMR (600 MHz, DMSO-$d^6$) δ 8.69 (1H, t, J=6.0 Hz), 8.12 (1H, dd, J=8.4, 1.2 Hz), 7.77 (1H, d, J=7.8 Hz), 7.62 (1H, t, J=7.2 Hz), 7.48 (3H, m), 6.69 (2H, m), 4.80 (2H, m); HRMS m/z 297.0842 ([M+H$^+$], $C_{14}H_{11}F_3N_2O_2$ requires 297.0851).

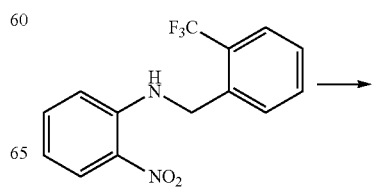

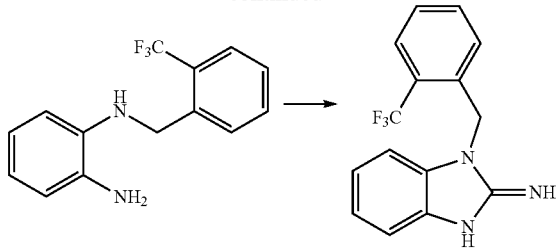

1-(2-(trifluoromethyl)benzyl)-1H-benzo[d]imidazol-2(3H)-imine 2-nitro-N-(2-(trifluoromethyl)benzyl)aniline (0.179 g, 0.604 mmol), iron powder (0.506 g, 9.06 mmol), acetic acid (0.520 mL, 9.06 mmol) in EtOH (2.00 mL) and water (6.00 mL) were refluxed at 100° C. for 1 h. 2.5 N NaOH (15.0 mL) was added to the reaction mixture. The suspension was filtered through a celite pad while washing with boiling EtOAc. The organic layer was washed with brine and concentrated under reduced pressure to afford a $N^1$-(2-(trifluoromethyl)benzyl)benzene-1,2-diamine (crude 0.092 g), which was taken to the next step without further purification.

$N^1$-(2-(trifluoromethyl)benzyl)benzene-1,2-diamine (0.075 g, 0.280 mmol) in methanol (0.500 mL) at 0° C. was treated with cyanogen bromide (0.060 g, 0.570 mmol). The reaction mixture was maintained at RT for 1 h. The reaction mixture was partitioned between ethyl acetate, saturated aq. NaHCO$_3$, and water. Organic layer was washed with saturated aq. NaCl solution. The aqueous phase was washed with DCM (×3) and concentrated under reduced pressure to obtain a residue. Purification was done by flash chromatography (SiO$_2$, 25%400% EtOAc in hexanes, 17:0.5:1 DCM: MeOH: 35% NH$_4$OH) and afforded 1-(2-(trifluoromethyl)benzyl)-1H-benzo[d]imidazol-2(3H)-imine (0.055 g, 67% over two steps). $^1$H NMR (600 MHz, DMSO-d$^6$) δ 7.84 (1H, m), 7.51 (2H, m), 7.15 (1H, m), 6.95 (1H, t, J=7.8 Hz), 6.79 (1H, t, J=7.8 Hz), 6.73 (1H, d, J=7.8 Hz), 6.61 (2H, m), 5.63 (1H, s), 5.44 (2H, s); LCMS m/z 292.4188 ([M+H$^+$], C$_{15}$H$_{12}$F$_3$N$_3$ requires 292.1062).

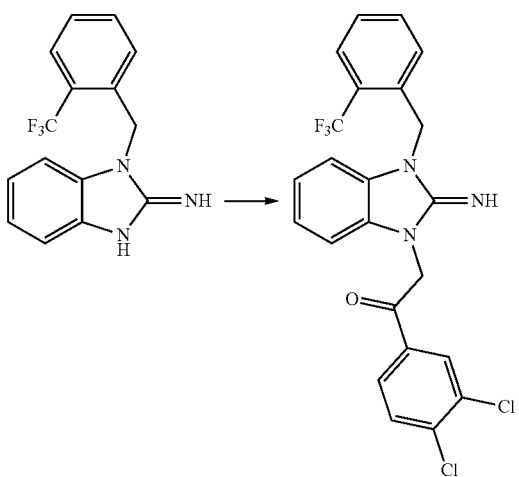

1-(3,4-dichlorophenyl)-2-(2-imino-3-(2-(trifluoromethyl)benzyl)-2,3-dihydro-1H-benzo[d]imidazol-1-yl)ethanone 1-(2-(trifluoromethyl)benzyl)-1H-benzo[d]imidazol-2(3H)-imine (0.098 g, 0.340 mmol) and 2-bromo-1-(3,4-dichlorophenyl)ethanone (0.091 g, 0.340 mmol) were dissolved in acetone (14.0 mL). Sodium iodide (0.052 g, 0.350 mmol) was then added and the mixture was stirred at 50° C. for 19 h. Product was then recovered as a solid via filtration while washing with acetone, followed by a hexane wash to afford 1-(3,4-dichlorophenyl)-2-(2-imino-3-(2-(trifluoromethyl)benzyl)-2,3-dihydro-1H-benzo[d]imidazol-1-yl)ethanone (0.112 g, 74%) as a white solid. $^1$H NMR (600 MHz, DMSO-d$^6$) δ 9.18 (1H, s), 8.39 (1H, m), 8.08 (1H, dd, J=8.4, 1.8 Hz), 7.99 (1H, d, J=8.4 Hz), 7.92 (1H, d, J=7.2 Hz), 7.74 (1H, d, J=7.8 Hz), 7.67 (1H, t, J=7.2 Hz), 7.61 (1H, t, J=7.8 Hz), 7.34 (1H, t, J=7.8 Hz), 7.28 (1H, t, J=7.8 Hz), 7.14 (1H, d, J=7.8 Hz), 6.97 (1H, d, J=7.8 Hz), 6.11 (2H, s), 5.71 (2H, s); HRMS m/z 478.0717 ([M+H$^+$], C$_{23}$H$_{16}$C$_2$F$_3$N$_3$O requires 478.0701).

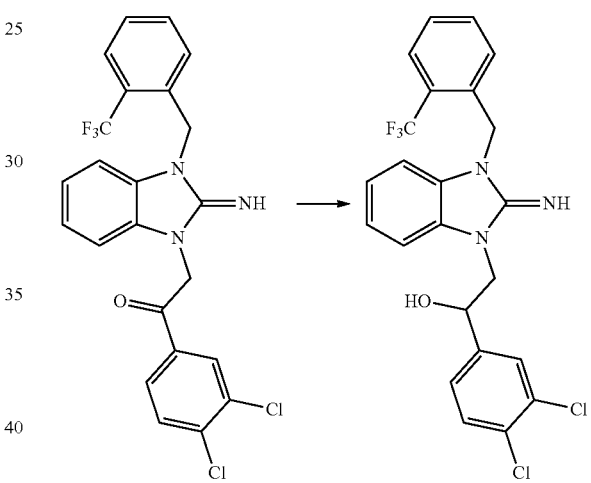

1-(3,4-dichlorophenyl)-2-(3-(4-fluoro-2-(trifluoromethyl)benzyl)-2-imino-2,3-dihydro-1H-benzo[d]imidazol-1-yl)ethanol 1-(3,4-dichlorophenyl)-2-(2-imino-3-(2-(trifluoromethyl)benzyl)-2,3-dihydro-1H-benzo[d]imidazol-1-yl)ethanone (0.112 g, 0.234 mmol) in methanol (30.0 mL) was cooled to 0° C. Sodium borohydride (0.018 g, 0.468) was added in portions. The reaction was then warmed to RT and stirred for 1 h. Water was added and the mixture was checked for a neutral/slightly basic pH. MeOH was removed under reduced pressure and water (3.00 mL) was added with DCM. The organic phase was evaporated to obtain crude residue. DCM and SiO$_2$ were added and concentrated to make a dry silica plug. Purification was done by flash chromatography (25% EtOAc in hexanes, 100% 17:0.5:1 DCM: MeOH: 35% NH$_4$OH) and afforded 1-(3,4-dichlorophenyl)-2-(3-(4-fluoro-2-(trifluoromethyl)benzyl)-2-imino-2,3-dihydro-1H-benzo[d]imidazol-1-yl)ethanol (0.086 g, 77%) as a white solid. $^1$H NMR (600 MHz, DMSO-d$^6$) δ 7.80 (1H, d, J=7.8 Hz), 7.71 (1H, s), 7.59-7.54 (2H, m), 7.50-7.44 (2H, m), 7.02 (1H, d, J=7.8 Hz), 6.90-6.79 (3H, m), 6.55 (1H, d, J=7.2 Hz), 5.20 (3H, m), 5.06 (1H, s), 4.11-4.03 (2H, m); HRMS m/z 480.0843 ([M+H$^+$], C$_{23}$H$_{18}$Cl$_2$F$_3$N$_3$O requires 480.0857).

Scheme for Synthesis of Example 31

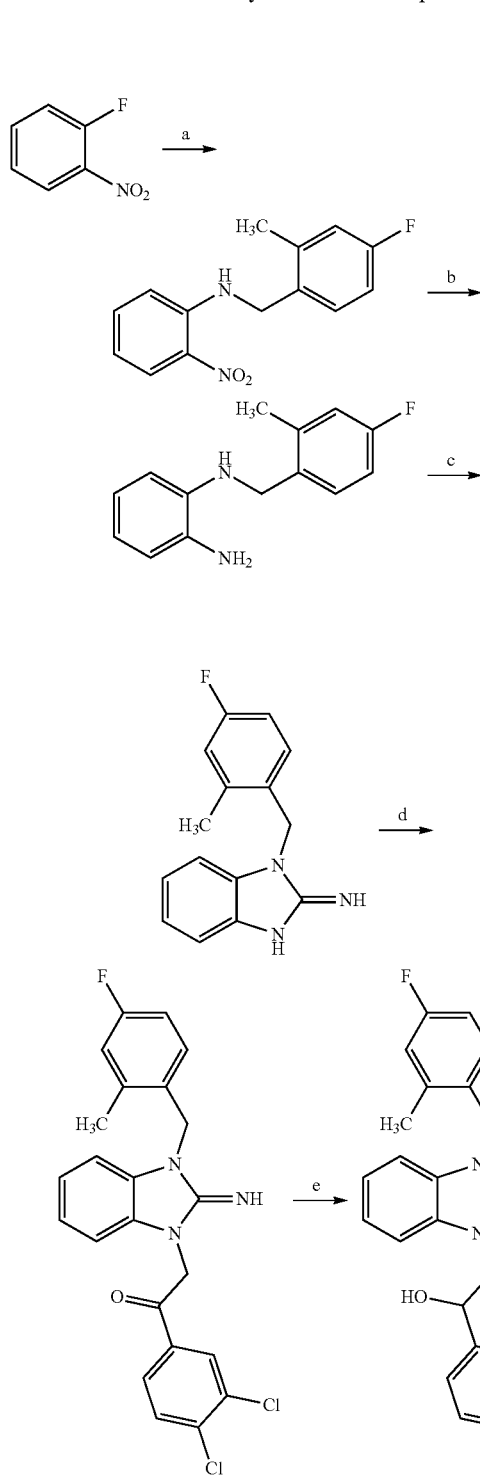

Reagents and conditions: (a) 4-Fluoro-2-methylbenzylamine, DBU, acetonitrile, 90° C., 21 h, 39%; (b) Fe, acetic acid, water, ethanol, 100° C., 1 h; (c) Cyanogen bromide, methanol, RT, 1 h, 22% (over two steps); (d) 2-bromo-1-(3,4-dichlorophenyl)ethan-1-one, acetone, 50° C., 19 h, 79%; (e) NaBH$_4$, methanol, 50° C., 1 h, 65%.

Experimental for Example 31

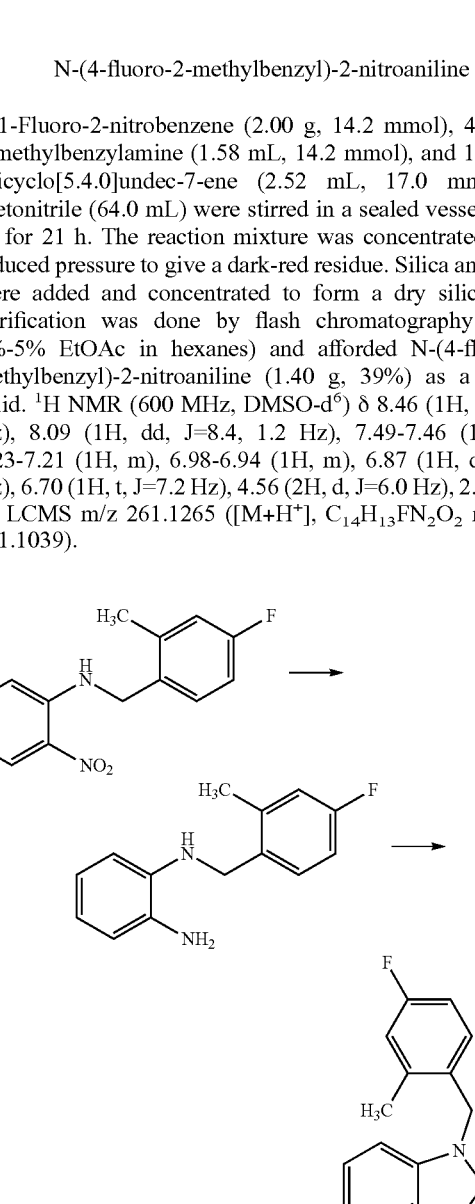

N-(4-fluoro-2-methylbenzyl)-2-nitroaniline

1-Fluoro-2-nitrobenzene (2.00 g, 14.2 mmol), 4-fluoro-2-methylbenzylamine (1.58 mL, 14.2 mmol), and 1,8-diazabicyclo[5.4.0]undec-7-ene (2.52 mL, 17.0 mmol) in acetonitrile (64.0 mL) were stirred in a sealed vessel at 90° C. for 21 h. The reaction mixture was concentrated under reduced pressure to give a dark-red residue. Silica and DCM were added and concentrated to form a dry silica plug. Purification was done by flash chromatography (SiO$_2$, 0%-5% EtOAc in hexanes) and afforded N-(4-fluoro-2-methylbenzyl)-2-nitroaniline (1.40 g, 39%) as a yellow solid. $^1$H NMR (600 MHz, DMSO-d$^6$) δ 8.46 (1H, t, J=5.4 Hz), 8.09 (1H, dd, J=8.4, 1.2 Hz), 7.49-7.46 (1H, m), 7.23-7.21 (1H, m), 6.98-6.94 (1H, m), 6.87 (1H, d, J=8.4 Hz), 6.70 (1H, t, J=7.2 Hz), 4.56 (2H, d, J=6.0 Hz), 2.36 (3H, s); LCMS m/z 261.1265 ([M+H$^+$], C$_{14}$H$_{13}$FN$_2$O$_2$ requires 261.1039).

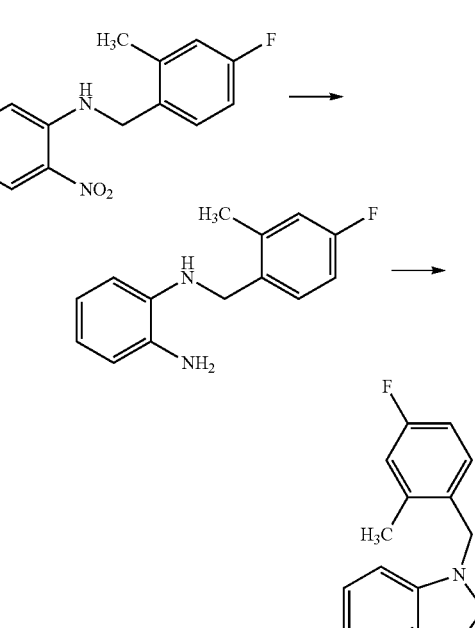

1-(4-Fluoro-2-methylbenzyl)-1H-benzo[d]imidazol-2(3H)-imine

N-(4-fluoro-2-methylbenzyl)-2-nitroaniline (1.32 g, 5.07 mmol), iron powder (4.24 g, 76.1 mmol), acetic acid (4.38 mL, 76.1 mmol) in EtOH (11.0 mL) and water (33.0 mL) were refluxed at 100° C. for 1 h. 2.5 N NaOH (75.0 mL) was added to the reaction mixture and the suspension was filtered through a celite pad while washing with boiling EtOAc. The organic layer was washed with brine and concentrated to afford $N^1$-(4-fluoro-2-(trifluoromethyl)benzyl)benzene-1,2-diamine (crude 1.02 g) which was taken forward without further purification.

$N^1$-(4-fluoro-2-(trifluoromethyl)benzyl)benzene-1,2-diamine (1.02 g, 5.03 mmol) in MeOH (9.00 mL) at 0° C. was treated with cyanogen bromide (1.06 g, 10.1 mmol). The reaction mixture was maintained at RT for 1 h. The reaction mixture was partitioned between EtOAc, saturated aq. $NaHCO_3$, and water. Organic layer was washed with saturated aq. NaCl solution. The aqueous phase was washed with DCM (×3) and concentrated to obtain a residue. Purification was done by flash chromatography ($SiO_2$, 25%-100% EtOAc in hexanes, 17:0.5:1 DCM:MeOH: 35% $NH_4OH$) and afforded 1-(4-fluoro-2-methylbenzyl)-1H-benzo[d]imidazol-2(3H)-imine (0.272 g, 22% over two steps). $^1$H NMR (600 MHz, DMSO-$d^6$) δ 7.18 (1H, d, J=7.8 Hz), 7.11 (1H, d, J=2.4 Hz), 7.09-6.86 (3H, m), 6.81-6.79 (1H, m), 6.48 (2H, s), 6.36-6.33 (1H, m), 5.19 (2H, s), 2.38 (3H, s); LCMS m/z 256.1762 ([M+H$^+$], $C_{15}H_{14}FN_3$ requires 256.1250).

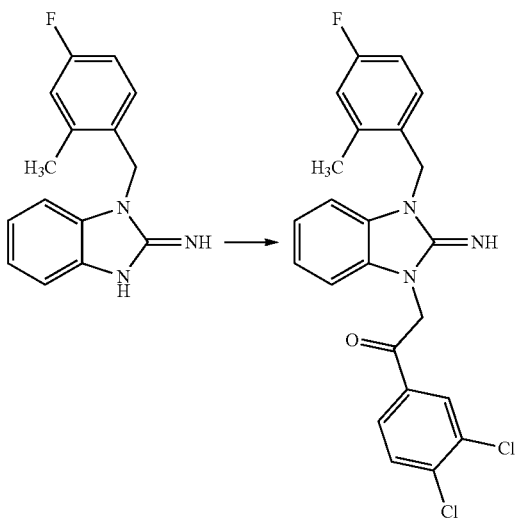 [SMILES: N=c1[nH]c2ccccc2n1Cc1ccc(F)cc1C(F)(F)F ; N=c1n(CC(=O)c2ccc(Cl)c(Cl)c2)c2ccccc2n1Cc1ccc(F)cc1C(F)(F)F]

1-(3,4-dichlorophenyl)-2-(3-(4-fluoro-2-methylbenzyl)-2-imino-2,3-dihydro-1H-benzo [d]imidazol-1-yl)ethanone 1-(4-fluoro-2-methylbenzyl)-1H-benzo[d]imidazol-2(3H)-imine (0.272 g, 1.06 mmol) and 2-bromo-1-(3,4-dichlorophenyl)ethanone (0.284 g, 1.06 mmol) were dissolved in acetone (30.0 mL). Sodium iodide (0.166 g, 1.11 mmol) was added and the mixture was stirred at 50° C. for 19 h. Product was then recovered as a solid via filtration while washing with acetone, followed by a hexane wash to afford 1-(3,4-dichlorophenyl)-2-(3-(4-fluoro-2-methylbenzyl)-2-imino-2,3-dihydro-1H-benzo[d]imidazol-1-yl)ethanone (0.369 g, 79%) as a white solid. $^1$H NMR (600 MHz, DMSO-$d^6$) δ 9.09 (1H, s), 8.38-8.37 (1H, m), 8.07 (1H, dd, J=8.4, 6.0 Hz), 7.97 (1H, d, J=8.4 Hz), 7.73 (1H, d, J=8.4 Hz), 7.42 (1H, d, J=7.8 Hz), 7.34-7.28 (2H, m), 7.22-7.21 (1H, m), 7.01-6.98 (1H, m), 6.65 (1H, t, J=6.0 Hz), 6.13 (2H, s), 5.52 (2H, s), 2.44 (3H, s); HRMS m/z 442.0894 ([M+H$^+$], $C_{23}H_{18}Cl_2FN_3O$ requires 442.0889).

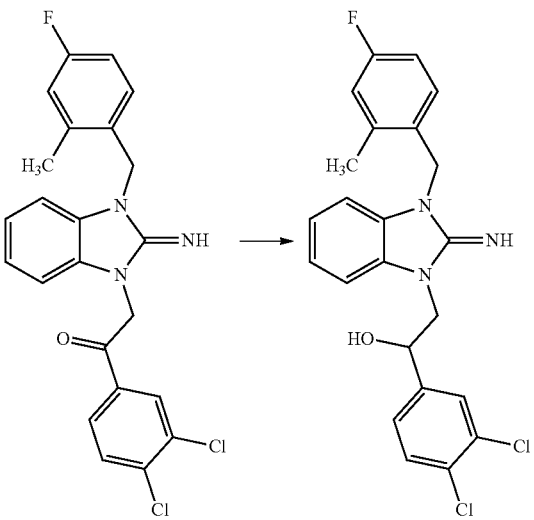 [SMILES: N=c1n(CC(=O)c2ccc(Cl)c(Cl)c2)c2ccccc2n1Cc1ccc(F)cc1C(F)(F)F ; N=c1n(Cc2ccc(F)cc2C(F)(F)F)c2ccccc2n1CC(O)c1ccc(Cl)c(Cl)c1]

1-(3,4-dichlorophenyl)-2-(3-(4-fluoro-2-methylbenzyl)-2-imino-2,3-dihydro-1H-benzo[d]imidazol-1-yl)ethanol 1-(3,4-dichlorophenyl)-2-(3-(4-fluoro-2-methylbenzyl)-2-imino-2,3-dihydro-1H-benzo[d]imidazol-1-yl)ethanone (0.347 g, 0.784 mmol) in MeOH (15.0 mL) was cooled to 0° C. Sodium borohydride (0.059 g, 1.57) was added in portions. The reaction was then warmed to RT and stirred for 1 h. Water was added, mixture checked for a neutral/slightly basic pH. MeOH was removed under reduced pressure, water (3.00 mL) was added to the mixture with DCM. The organic phase was evaporated to obtain a crude residue. DCM and $SiO_2$ were added and concentrated to make a dry silica plug. Purification was done by flash chromatography (25% EtOAc in hexanes, 100% 17:0.5:1 DCM:MeOH: 35% $NH_4OH$) and afforded 1-(3,4-dichlorophenyl)-2-(3-(4-fluoro-2-methylbenzyl)-2-imino-2,3-dihyS @ ~dro-1H-benzo[d]imidazol-1-yl)ethanol (0.230 g, 65%) as a white solid. $^1$H NMR (600 MHz, DMSO-$d^6$) δ 7.61 (1H, s), 7.55 (1H, d, J=8.4 Hz), 7.42 (1H, d, J=8.4 Hz), 7.08 (1H, d, J=10.2 Hz), 6.99 (1H, d, J=7.8 Hz), 6.89-6.85 (2H, m), 6.79 (1H, t, J=7.8 Hz), 6.68 (1H, d, J=7.8 Hz), 6.60 (1H, br s), 5.06 (1H, m), 5.02-4.95 (3H, m), 4.13 (1H, m), 4.06-4.03 (1H, m), 2.36 (3H, s); HRMS m/z 444.1058 ([M+H$^+$], $C_{23}H_{20}Cl_2FN_3O$ requires 444.1046).

Scheme for Synthesis of Example 32

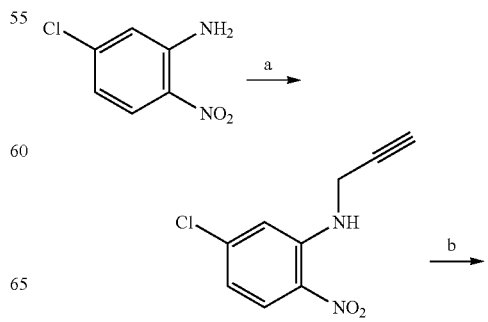

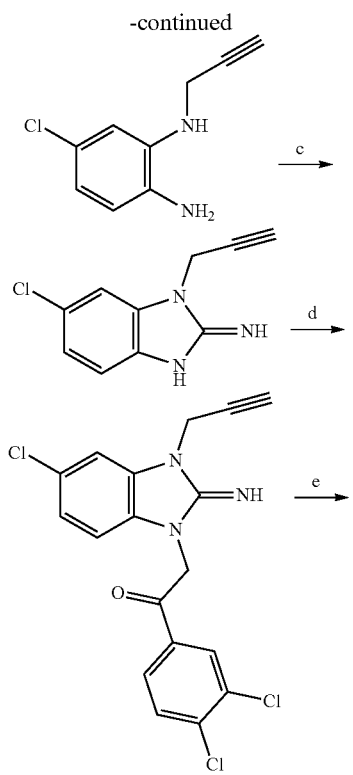

Reagents and conditions: (a) 3-bromoprop-1-yne, potassium carbonate, acetonitrile, 85° C., 16 h, 31%; (b) Fe, NH₄Cl, water, ethanol, 60° C., 1~2 h, 95%; (c) Cyanogen bromide, methanol, RT, 1 h; (d) 2-bromo-1-(3,4-dichlorophenyl)ethan-1-one, acetone, 50° C., 24 h, 45% (over two steps); (e) NaBH₄, methanol, RT, 1 h, 69%.

Experimental for Example 32

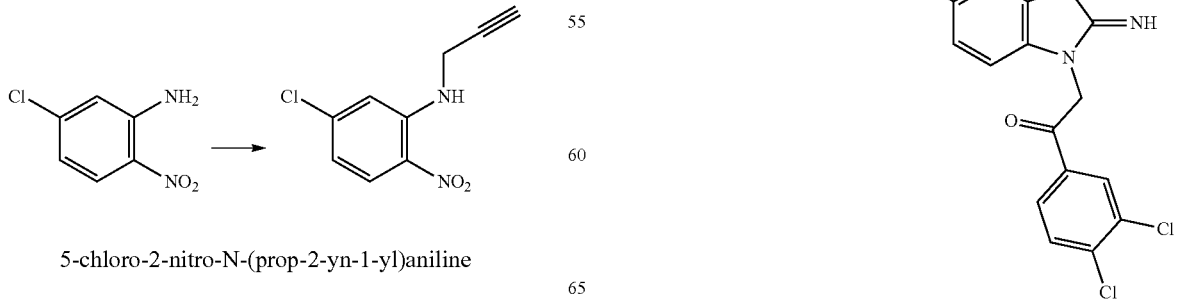

5-chloro-2-nitro-N-(prop-2-yn-1-yl)aniline 5-chloro-2-nitroaniline (50 g, 0.29 mol, 1.0 equiv), potassium carbonate (80.1 g, 0.58 mol, 2.0 equiv) and 3-bromoprop-1-yne (41.5 g, 0.35 mol, 1.2 equiv) were mixed in 500 mL CH₃CN, stirred at 85° C. for 16 h. The solvent was evaporated under reduced pressure and resulting mixture was diluted with water and extracted with ethyl acetate. The combined organic layers were washed with brine, the solvent was evaporated in vacuum and the remaining residue was purified by flash chromatography (300-400, 1-10% EA in hexane) to afford slightly crude title compound (13.5 g, 31%) as a yellow solid.

5-chloro-N¹-(prop-2-yn-1-yl)benzene-1,2-diamine 5-chloro-2-nitro-N-(prop-2-yn-1-yl)aniline (13.5 g, 64 mmol, 1.0 equiv), iron powder (15 g, 267 mmol, 4.2 equiv), NH₄C₁ (26.8 g, 501 mmol, 7.8 equiv) were mixed in water (100 mL) and EtOH (200 mL), stirring at 60° C. for 1-2 h. After completion of the reaction 100 mL H₂O was added, cooling to rt and solid was filtered. Saturated sodium bicarbonate was added to adjust pH 7, Organic layer was washed with brine and concentrated to give a residue, purified by flash chromatography (300-400, 10-20% EA in hexane) to obtain 5-chloro-N¹-(prop-2-yn-1-yl)benzene-1,2-diamine (11.0 g, 95%) as a brown oil.

2-(5-chloro-2-imino-3-(prop-2-yn-1-yl)-2,3-dihydro-1H-benzo[d]imidazol-1-yl)-1-(3,4-dichlorophenyl)ethan-1-one 5-chloro-N¹-(prop-2-yn-1-yl)benzene-1,2-diamine (11.0 g, 61 mmol, 1.0 equiv) was dissolved in 100 mL CH₃OH, cooling to 0° C., and treated with BrCN (13.2 g, 125 mmol, 2.1 equiv). The mixture was maintained at room temperature for 1 h. Then partitioned between EA, NaHCO₃ and water. Organic layer was washed with brine and concentrated to obtain 6-chloro-1-(prop-2-yn-1-yl)-1,3-dihydro-2H-benzo[d]imidazol-2-imine as a residue that was taken to the next step without further purification.

The residue compound 6-chloro-1-(prop-2-yn-1-yl)-1,3-dihydro-2H-benzo[d]imidazol-2-imine (10.5 g, 51.0 mmol, 1.0 equiv) and 2-bromo-1-(3,4-dichlorophenyl)ethan-1-one (15.0 g, 56 mmol, 1.1 equiv) was dissolved in acetone (500 mL), NaI (8.4 g, 56 mmol, 1.1 equiv) was added, and the mixture was stirring at 50° C. for 24 h. Then Product was recovered via filtration and washing with acetone to afford 2-(5-chloro-2-imino-3-(prop-2-yn-1-yl)-2,3-dihydro-1H-benzo[d]imidazol-1-yl)-1-(3,4-dichlorophenyl)ethan-1-one (8.9 g, 45%) as a white solid.

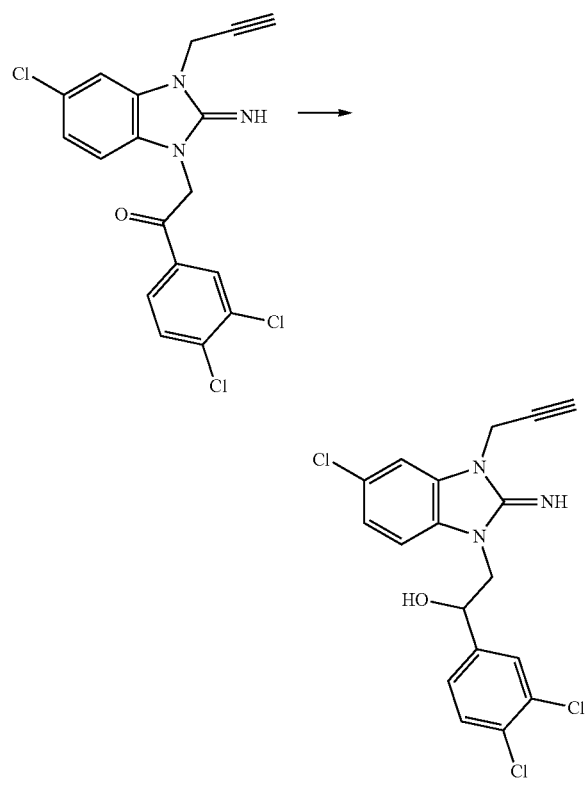

2-(5-chloro-2-imino-3-(prop-2-yn-1-yl)-2,3-dihydro-1H-benzo[d]imidazol-1-yl)-1-(3,4-dichlorophenyl)ethan-1-ol b 2-(5-chloro-2-imino-3-(prop-2-yn-1-yl)-2,3-dihydro-1H-benzo[d]imidazol-1-yl)-1-(3,4-dichlorophenyl)ethan-1-one (8.9 g, 22.7 mmol, 1.0 equiv) in 600 mL methanol was cooled to 0° C., sodium borohydride (1.9 g, 50 mmol, 2.2 equiv) was added in portions. The reaction was then warmed to RT and stirred for 1 h. 50 mL of water was added, mixture checked for neutral/slightly basic pH. Methanol was removed under reduced pressure to give 2-(5-chloro-2-imino-3-(prop-2-yn-1-yl)-2,3-dihydro-1H-benzo[d]imidazol-1-yl)-1-(3,4-dichlorophenyl)ethan-1-ol (6.1 g, 69%) as a light yellow solid. ¹H NMR (400 MHz, CD₃OD): δ 3.92-3.94 (m, 2H), 4.62 (s, 2H), 4.96 (t, J=6.0 Hz, 1H), 6.80-6.88 (m, 2H), 7.02 (d, J=1.6 Hz, 1H), 7.23 (dd, J=1.6 Hz, 8.0 Hz, 1H), 7.33 (d, J=8.4 Hz, 1H), 7.52 (d, J=1.6 Hz, 1H).

General Synthetic Scheme for Examples 33-35

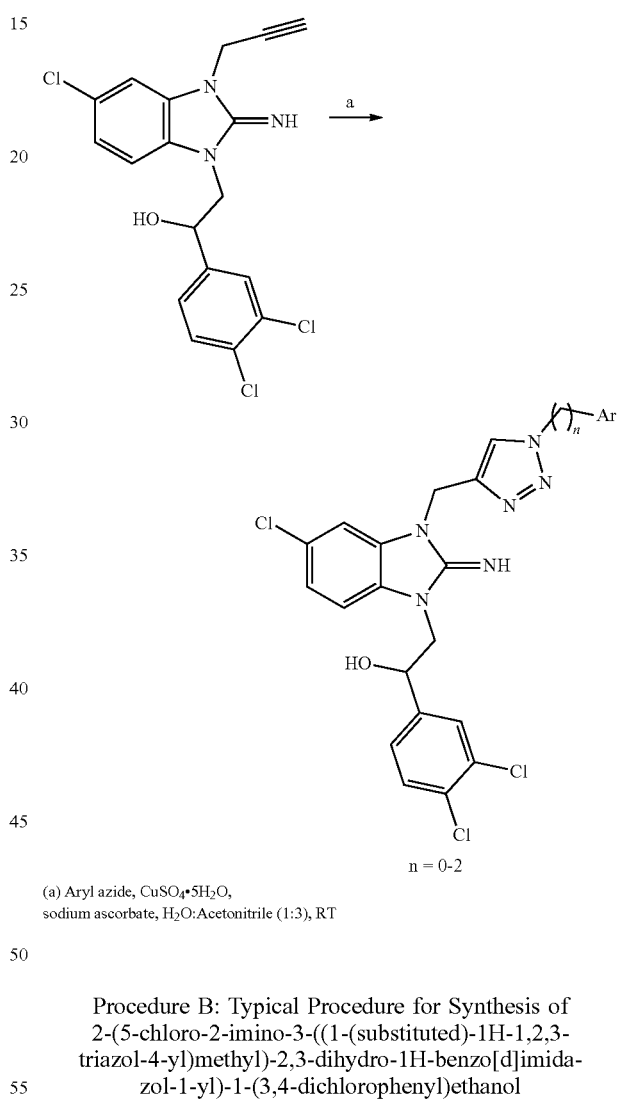

(a) Aryl azide, CuSO₄•5H₂O, sodium ascorbate, H₂O:Acetonitrile (1:3), RT

Procedure B: Typical Procedure for Synthesis of 2-(5-chloro-2-imino-3-((1-(substituted)-1H-1,2,3-triazol-4-yl)methyl)-2,3-dihydro-1H-benzo[d]imidazol-1-yl)-1-(3,4-dichlorophenyl)ethanol 2-(5-chloro-2-imino-3-(prop-2-yn-1-yl)-2,3-dihydro-1H-benzo[d]imidazol-1-yl)-1-(3,4-dichlorophenyl)ethan-1-ol Example 32, aryl azide, copper (II) sulfate pentahydrate, sodium ascorbate in water:dichloromethane/acetonitrile/t-butanol (1:3) mixture was stirred at RT. Solvent was removed under reduced pressure, mixture was extracted with dichloromethane, and the organic phase was evaporated to obtain crude residue. Added dichloromethane and SiO₂ and concentrated to make a silica plug. Purification by flash chromatography (50% ethyl acetate in hexanes, 17:0.5:1 dichloromethane:methanol: 35% ammonium hydroxide) afforded 2-(5-chloro-2-imino-3-(prop-2-yn-1-yl)-2,3-dihydro-1H-benzo[d]imidazol-1-yl)-1-(3,4-dichlorophenyl)ethan-1-ol Experimental for Example 33

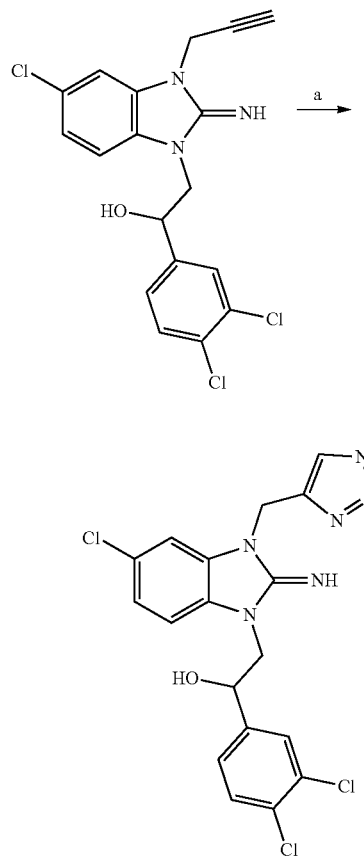

(a) 1-azido-4-methylbenzene, CuSO$_4$•5H$_2$O, sodium ascorbate, H$_2$O:acetonitrile (1:3), RT, 11 h, 18%

2-(5-chloro-2-imino-3-((1-(4-methylbenzyl)-1H-1,2,3-triazol-4-yl)methyl)-2,3-dihydro-1H-benzo[d]imidazol-1-yl)-1-(3,4-dichlorophenyl)ethanol Using the typical Procedure B 1-(3,4-dichlorophenyl)-2-(2-imino-3-(prop-2-yn-1-yl)-2,3-dihydro-1H-benzo[d]imidazol-1-yl)ethan-1-ol Example 32 (0.120 g, 0.304 mmol), 1-azido-4-methylbenzene (0.089 g, 0.608 mmol), copper (II) sulfate pentahydrate (0.002 g, 0.008 mmol), sodium ascorbate (0.020 mL, 0.022 mmol, 1M solution in water) in 1:3 water:acetonitrile (2.00 mL) mixture was stirred at RT for 11 h. Solvent was removed under reduced pressure, mixture was extracted with DCM, and the organic phase was evaporated to obtain crude residue. DCM and SiO$_2$ was added and concentrated to make a dry silica plug. Purification by flash chromatography (50% EtOAc in hexanes, 17:0.5:1 DCM:MeOH: 35% NH$_4$OH) afforded 2-(5-chloro-2-imino-3-((1-(4-methylbenzyl)-1H-1,2,3-triazol-4-yl)methyl)-2,3-dihydro-1H-benzo[d]imidazol-1-yl)-1-(3,4-dichlorophenyl)ethanol (0.028 g, 18%) as a yellow/orange solid. $^1$H NMR (600 MHz, DMSO-d$^6$) δ 8.05 (1H, s), 7.68 (1H, s), 7.50 (1H, d, J=8.40), 7.37 (1H, d, J=7.2), 7.20-7.11 (4H, m), 6.93-6.86 (2H, m), 6.19 (1H, br s), 5.51 (2H, s), 5.09 (2H, s), 4.95 (1H, s), 3.98-3.90 (2H, m), 2.26 (3H, s); LCMS m/z 541.2416 ([M+H$^+$], C$_{26}$H$_{23}$Cl$_3$N$_6$O requires 541.1077).

Experimental for Example 34

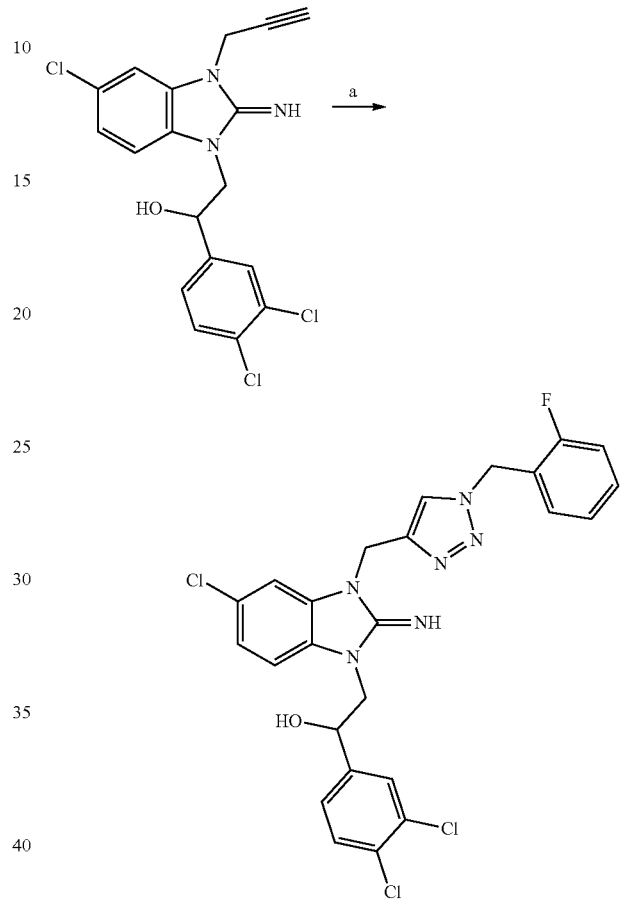

(a) 1-(azidomethyl)-2-fluorobenze, CuSO$_4$•5H$_2$O, sodium ascorbate, H$_2$O:acetonitrile (1:3), RT, 11 h, 19%

2-(5-chloro-3-((1-(2-fluorobenzyl)-1H-1,2,3-triazol-4-yl)methyl)-2-imino-2,3-dihydro-1H-benzo[d]imidazol-1-yl)-1-(3,4-dichlorophenyl)ethanol Using the typical Procedure B 1-(3,4-dichlorophenyl)-2-(2-imino-3-(prop-2-yn-1-yl)-2,3-dihydro-1H-benzo[d]imidazol-1-yl)ethan-1-ol Example 32 (0.150 g, 0.380 mmol), 1-(azidomethyl)-2-fluorobenzene (0.086 g, 0.570 mmol), copper (II) sulfate pentahydrate (0.002 g, 0.008 mmol), sodium ascorbate (0.020 mL, 0.022 mmol, 1M solution in water) in 1:3 water:acetonitrile (2.00 mL) mixture was stirred at RT for 11 h. Solvent was removed under reduced pressure, mixture was extracted with DCM, and the organic phase was evaporated to obtain crude residue. DCM and SiO$_2$ was added and concentrated to make a dry silica plug. Purification by flash chromatography (50% EtOAc in hexanes, 17:0.5:1 dichloromethane:methanol: 35% ammonium hydroxide) afforded 2-(5-chloro-3-((1-(2-fluorobenzyl)-1H-1,2,3-triazol-4-yl)methyl)-2-imino-2,3-dihydro-1H-benzo[d]imidazol-1-yl)-1-(3,4-dichlorophenyl)ethanol (0.041 g, 19%) as a yellow/orange solid. $^1$H NMR (600

MHz, DMSO-d⁶) δ 8.20 (1H, s), 7.79 (1H, s), 7.58 (1H, d, J=8.40), 7.52-7.32 (5H, m), 7.27-7.20 (2H, m), 7.15 (1H, br s), 5.67 (2H, s), 5.34 (2H, s), 4.97 (1H, s), 4.13 (2H, s); LCMS m/z 545.1919 ([M+H⁺], $C_{25}H_{20}C_{13}FN_6O$ requires 545.0826).

Experimental for Example 35

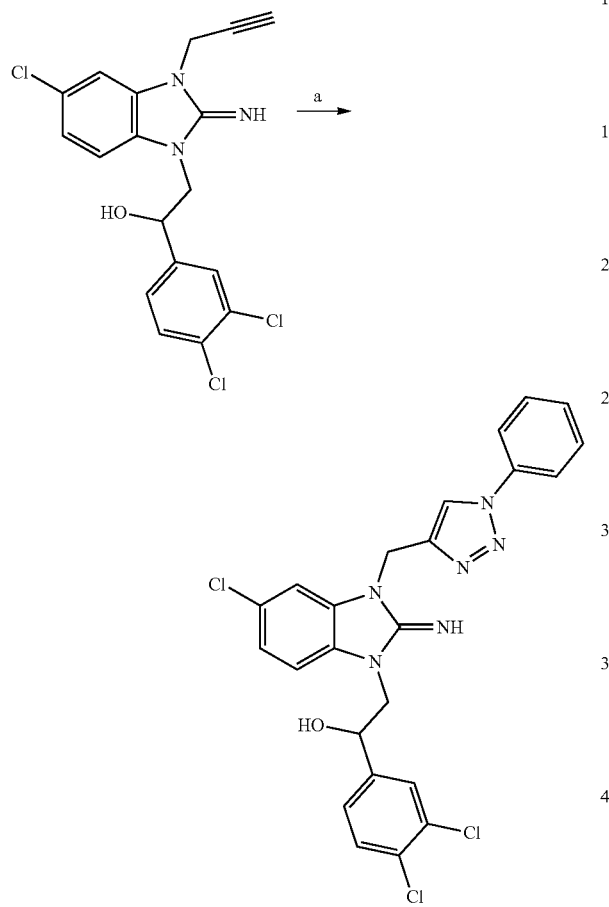

(a) azidobenzene, CuSO₄·5H₂O, sodium ascorbate, H₂O:acetonitrile (1:3), RT, 11 h, 32%

2-(5-chloro-2-imino-3-((1-phenyl-1H-1,2,3-triazol-4-yl)methyl)-2,3-dihydro-1H-benzo[d]imidazol-1-yl)-1-(3,4-dichlorophenyl)ethanol Using the typical Procedure B 1-(3,4-dichlorophenyl)-2-(2-imino-3-(prop-2-yn-1-yl)-2,3-dihydro-1H-benzo[d]imidazol-1-yl)ethan-1-ol Example 32 (0.150 g, 0.380 mmol), azidobenzene (0.067 g, 0.570 mmol), copper (II) sulfate pentahydrate (0.002 g, 0.008 mmol), sodium ascorbate (0.020 mL, 0.022 mmol, 1M solution in water) in 1:3 water:acetonitrile (2.00 mL) mixture was stirred at RT for 11 h. Solvent was removed under reduced pressure, mixture was extracted with DCM, and the organic phase was evaporated to obtain crude residue. DCM and SiO₂ was added and concentrated to make a dry silica plug. Purification by flash chromatography (50% EtOAc in hexanes, 17:0.5:1 DCM:MeOH: 35% NH₄OH) afforded 2-(5-chloro-2-imino-3-((1-phenyl-1H-1,2,3-triazol-4-yl)methyl)-2,3-dihydro-1H-benzo[d]imidazol-1-yl)-1-(3,4-dichlorophenyl)ethanol (0.063 g, 32%) as a yellow/orange solid. ¹H NMR (600 MHz, DMSO-d⁶) δ 8.73 (1H, s), 7.87 (2H, d, J=7.8 Hz), 7.64-7.58 (3H, m), 7.53-7.50 (2H, m), 6.96-6.88 (4H, m), 5.97 (1H, br s), 5.21 (1H, s), 4.97 (1H, br s), 3.95 (2H, m); (LCMS m/z 513.1875 ([M+H⁺], $C_{24}H_{19}C_{13}N_6O$ requires 513.0764).

Experimental for Example 36

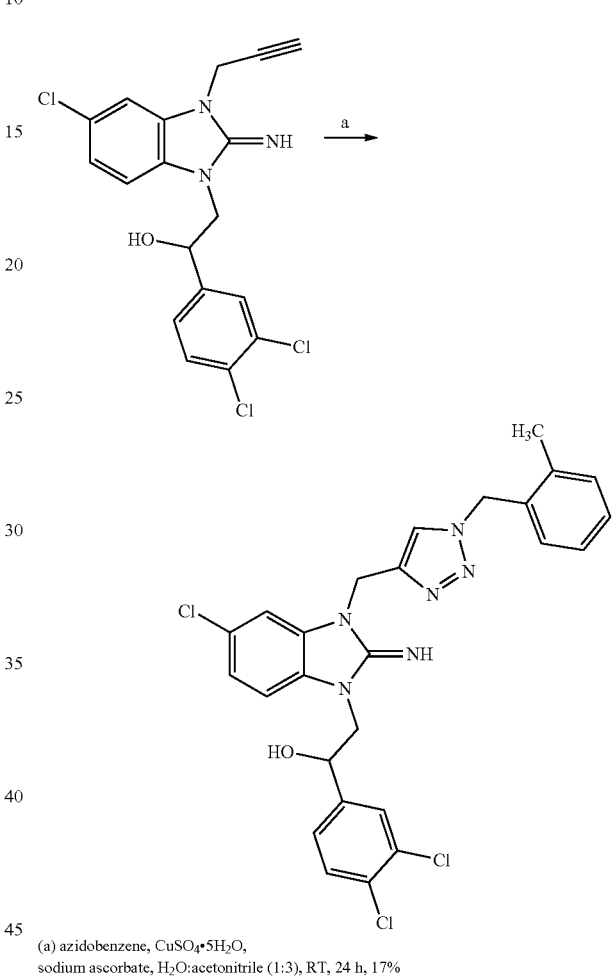

(a) azidobenzene, CuSO₄·5H₂O, sodium ascorbate, H₂O:acetonitrile (1:3), RT, 24 h, 17%

2-(5-chloro-2-imino-3-((1-(2-methylbenzyl)-1H-1,2,3-triazol-4-yl)methyl)-2,3-dihydro-1H-benzo[d]imidazol-1-yl)-1-(3,4-dichlorophenyl)ethan-1-ol A mixture of 2-(5-chloro-2-imino-3-(prop-2-yn-1-yl)-2,3-dihydro-1H-benzo[d]imidazol-1-yl)-1-(3,4-dichlorophenyl)ethan-1-ol (0.200 g, 0.507 mmol), aryl azide (1.01 mmol), copper (II) sulfate pentahydrate (0.008 mmol), and sodium ascorbate (0.022 mmol, 1M solution in H₂O) in 2 mL H₂O:ACN (1:3) mixture was stirred at 50° C. in an oil bath for 24 h. Solvent was removed under reduced pressure, mixture was extracted with DCM, and the organic phase was evaporated to obtain crude residue. DCM and SiO₂ were added to form a dry silica plug. Purification was done via flash chromatography (SiO₂, 50% EtOAc in hexanes, 17:0.5:1 DCM:MeOH: 35% NH₄OH). ¹H NMR (800 MHz, DMSO-d⁶) δ 8.09 (1H, s), 7.69 (1H, s), 7.51 (1H, d, J=8.00 Hz), 7.38 (1H, d, J=8.00 Hz), 7.24 (1H, t, J=8.00 Hz), 7.14-7.12 (1H, m), 7.09-7.08 (2H, m), 6.88 (2H, dd, J=1.60 Hz, 8.00 Hz), 6.34 (1H, br s), 5.53 (2H, s), 5.12 (2H, s), 4.97-4.95 (1H, m), 4.01-3.93 (2H, m), 2.26 (3H, s); LCMS m/z 541.0981 ([M+H$^+$], C$_{26}$H$_{23}$C$_{13}$N$_6$O requires 541.1077).

Experimental for Example 37

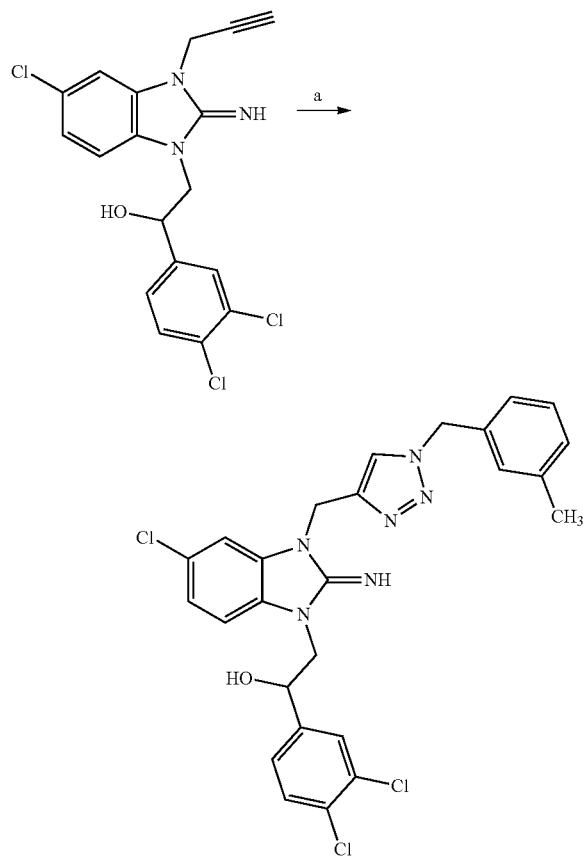

(a) azidobenzene, CuSO$_4$·5H$_2$O,
sodium ascorbate, H$_2$O:acetonitrile (1:3), RT, 24 h, 30%

2-(5-chloro-2-imino-3-((1-(3-methylbenzyl)-1H-1,2,3-triazol-4-yl)methyl)-2,3-dihydro-1H-benzo[d]imidazol-1-yl)-1-(3,4-dichlorophenyl)ethan-1-ol A mixture of 2-(5-chloro-2-imino-3-(prop-2-yn-1-yl)-2,3-dihydro-1H-benzo[d]imidazol-1-yl)-1-(3,4-dichlorophenyl)ethan-1-ol (0.200 g, 0.507 mmol), aryl azide (1.01 mmol), copper (II) sulfate pentahydrate (0.008 mmol), and sodium ascorbate (0.022 mmol, 1M solution in H$_2$O) in 2 mL H$_2$O:ACN (1:3) mixture was stirred at 50° C. in an oil bath for 24 h. Solvent was removed under reduced pressure, mixture was extracted with DCM, and the organic phase was evaporated to obtain crude residue. DCM and SiO$_2$ were added to form a dry silica plug. Purification was done via flash chromatography (SiO$_2$, 50% EtOAc in hexanes, 17:0.5:1 DCM:MeOH: 35% NH$_4$OH). $^1$H NMR (800 MHz, DMSO-d$^6$) δ 8.09 (1H, s), 7.69 (1H, s), 7.51 (1H, d, J=8.00 Hz), 7.38 (1H, d, J=8.00 Hz), 7.24 (1H, t, J=8.00 Hz), 7.14-7.12 (1H, m), 7.09-7.08 (2H, m), 6.88 (2H, dd, J=1.60 Hz, 8.00 Hz), 6.34 (1H, br s), 5.53 (2H, s), 5.12 (2H, s), 4.97-4.95 (1H, m), 4.01-3.93 (2H, m), 2.26 (3H, s); LCMS m/z 541.0981 ([M+H$^+$], C$_{26}$H$_{23}$C$_{13}$N$_6$O requires 541.1077).

Experimental for Example 38

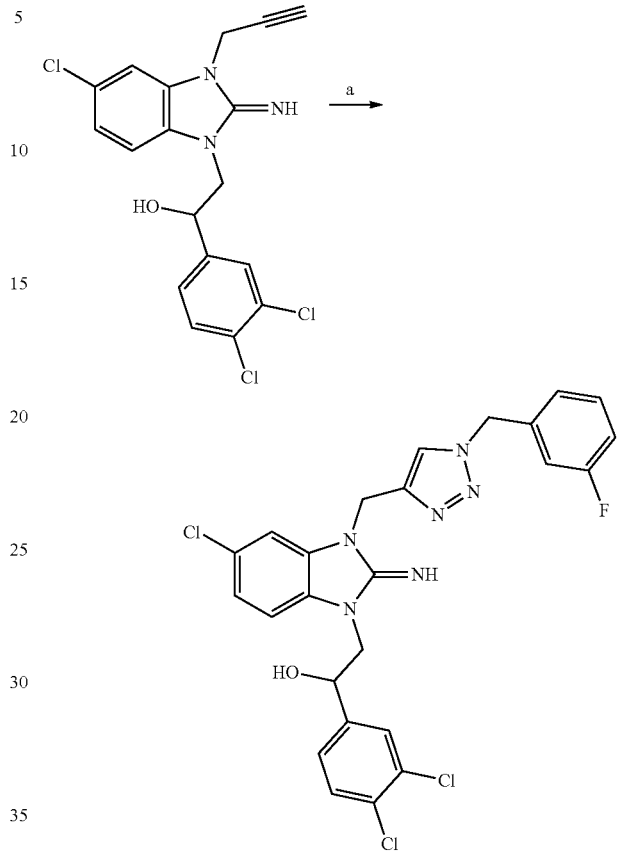

(a) azidobenzene, CuSO$_4$·5H$_2$O,
sodium ascorbate, H$_2$O:acetonitrile (1:3), RT, 24 h, 29%

2-(5-chloro-3-((1-(3-fluorobenzyl)-1H-1,2,3-triazol-4-yl)methyl)-2-imino-2,3-dihydro-1H-benzo[d]imidazol-1-yl)-1-(3,4-dichlorophenyl)ethan-1-ol A mixture of 2-(5-chloro-2-imino-3-(prop-2-yn-1-yl)-2,3-dihydro-1H-benzo[d]imidazol-1-yl)-1-(3,4-dichlorophenyl)ethan-1-ol (0.200 g, 0.507 mmol), aryl azide (1.01 mmol), copper (II) sulfate pentahydrate (0.008 mmol), and sodium ascorbate (0.022 mmol, 1M solution in H$_2$O) in 2 mL H$_2$O:ACN (1:3) mixture was stirred at 50° C. in an oil bath for 24 h. Solvent was removed under reduced pressure, mixture was extracted with DCM, and the organic phase was evaporated to obtain crude residue. DCM and SiO$_2$ were added to form a dry silica plug. Purification was done via flash chromatography (SiO$_2$, 50% EtOAc in hexanes, 17:0.5:1 DCM:MeOH: 35% NH$_4$OH). $^1$H NMR (800 MHz, DMSO-d$^6$) δ 8.17 (1H, s), 7.71 (1H, s), 7.52 (1H, d, J=8.00 Hz), 7.42-7.40 (2H, m), 7.19-7.11 (4H, m), 7.01 (1H, d, J=8.80 Hz), 6.93-6.91 (1H, m), 6.53 (1H, br s), 5.62 (1H, s), 5.54 (1H, s), 5.17-5.16 (1H, m), 4.98-4.96 (2H, m), 4.03-3.96 (2H, m); HRMS m/z 545.0814 ([M+H$^+$], C$_{26}$H$_{23}$C$_{13}$N$_6$O requires 545.0826).

Experimental for Example 39

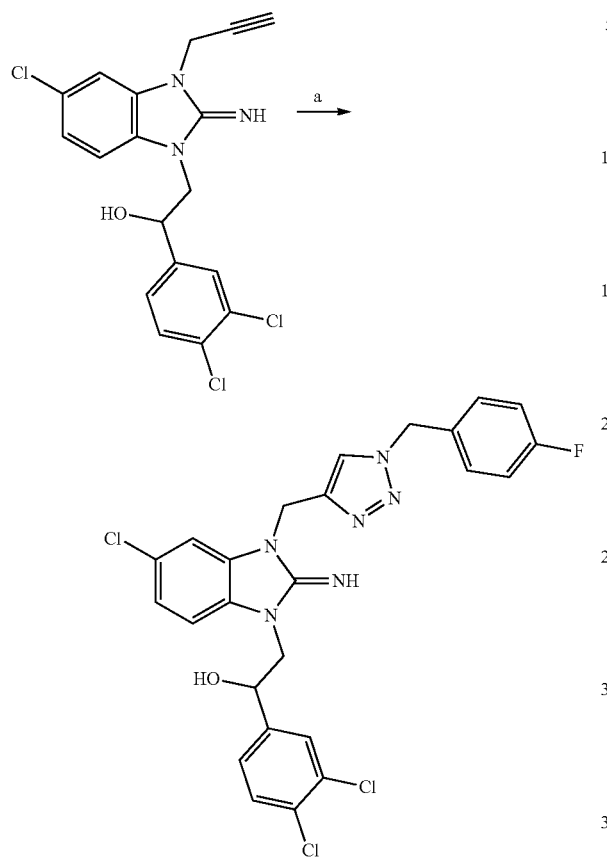

(a) azidobenzene, CuSO$_4$·5H$_2$O, sodium ascorbate, H$_2$O:acetonitrile (1:3), RT, 24 h, 29%

2-(5-chloro-3-((1-(4-fluorobenzyl)-1H-1,2,3-triazol-4-yl)methyl)-2-imino-2,3-dihydro-1H-benzo [d] imidazol-1-yl)-1-(3,4-dichlorophenyl)ethan-1-ol A mixture of 2-(5-chloro-2-imino-3-(prop-2-yn-1-yl)-2,3-dihydro-1H-benzo[d]imidazol-1-yl)-1-(3,4-dichlorophenyl)ethan-1-ol (0.200 g, 0.507 mmol), aryl azide (1.01 mmol), copper (II) sulfate pentahydrate (0.008 mmol), and sodium ascorbate (0.022 mmol, 1M solution in H$_2$O) in 2 mL H$_2$O:ACN (1:3) mixture was stirred at 50° C. in an oil bath for 24 h. Solvent was removed under reduced pressure, mixture was extracted with DCM, and the organic phase was evaporated to obtain crude residue. DCM and SiO$_2$ were added to form a dry silica plug. Purification was done via flash chromatography (SiO$_2$, 50% EtOAc in hexanes, 17:0.5:1 DCM:MeOH: 35% NH$_4$OH). $^1$H NMR (600 MHz, DMSO-d$^6$) δ 8.11 (1H, s), 7.69 (1H, s), 7.51 (1H, d, J=8.40 Hz), 7.39-7.36 (2H, m), 7.19 (1H, t, J=9.00 Hz), 7.13 (1H, s), 6.94 (1H, d, J=7.80 Hz), 6.89-6.87 (1H, m), 6.28 (1H, br s), 5.57 (2H, s), 5.13-5.11 (2H, m), 4.98-4.96 (1H, m), 4.00-3.91 (2H, m); LCMS m/z 545.1058 ([M+H$^+$], C$_{26}$H$_{23}$Cl$_3$N$_6$O requires 545.0826).

Experimental for Example 40

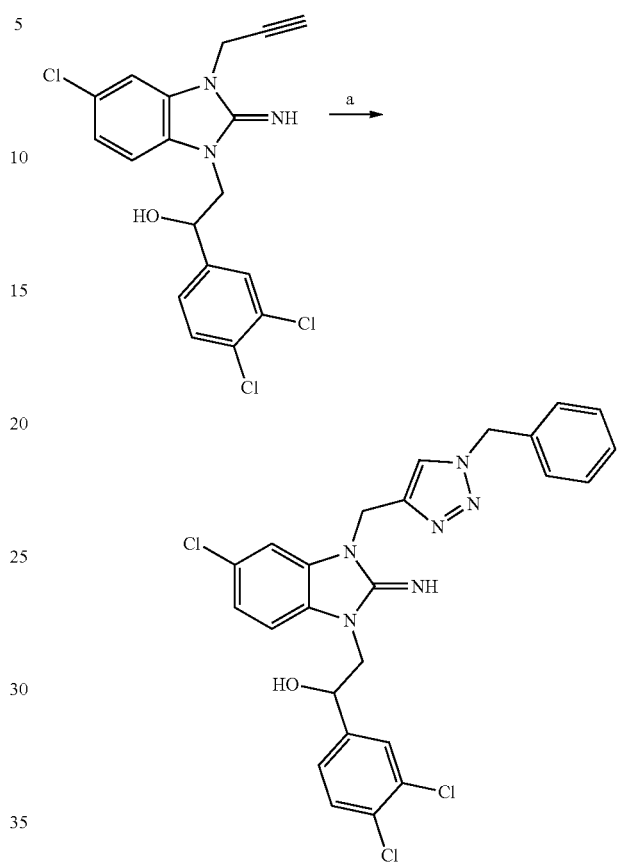

(a) azidobenzene, CuSO$_4$·5H$_2$O, sodium ascorbate, H$_2$O:acetonitrile (1:3), RT, 24 h, 32%

2-(3-((1-benzyl-1H-1,2,3-triazol-4-yl)methyl)-5-chloro-2-imino-2,3-dihydro-1H-benzo[d]imidazol-1-yl)-1-(3,4-dichlorophenyl)ethan-1-ol A mixture of 2-(5-chloro-2-imino-3-(prop-2-yn-1-yl)-2,3-dihydro-1H-benzo[d]imidazol-1-yl)-1-(3,4-dichlorophenyl)ethan-1-ol (0.200 g, 0.507 mmol), aryl azide (1.01 mmol), copper (II) sulfate pentahydrate (0.008 mmol), and sodium ascorbate (0.022 mmol, 1M solution in H$_2$O) in 2 mL H$_2$O:ACN (1:3) mixture was stirred at 50° C. in an oil bath for 24 h. Solvent was removed under reduced pressure, mixture was extracted with DCM, and the organic phase was evaporated to obtain crude residue. DCM and SiO$_2$ were added to form a dry silica plug. Purification was done via flash chromatography (SiO$_2$, 50% EtOAc in hexanes, 17:0.5:1 DCM:MeOH: 35% NH$_4$OH). $^1$H NMR (800 MHz, DMSO-d$^6$) δ 8.13 (1H, s), 7.71 (1H, s), 7.52 (1H, d, J=8.00 Hz), 7.40 (1H, d, J=8.00 Hz), 7.36 (1H, t, J=7.20 Hz), 7.33-7.29 (2H, m), 7.20 (1H, s), 7.01 (1H, d, J=8.00 Hz), 6.93-6.92 (1H, m), 6.53 (1H, br s), 5.59 (2H, s), 5.16 (2H, s), 4.98-4.97 (1H, m), 4.02-3.96 (2H, m); LCMS m/z 527.1563 ([M+H$^+$], C$_{26}$H$_{23}$Cl$_3$N$_6$O requires 527.0921).

Experimental for Example 41

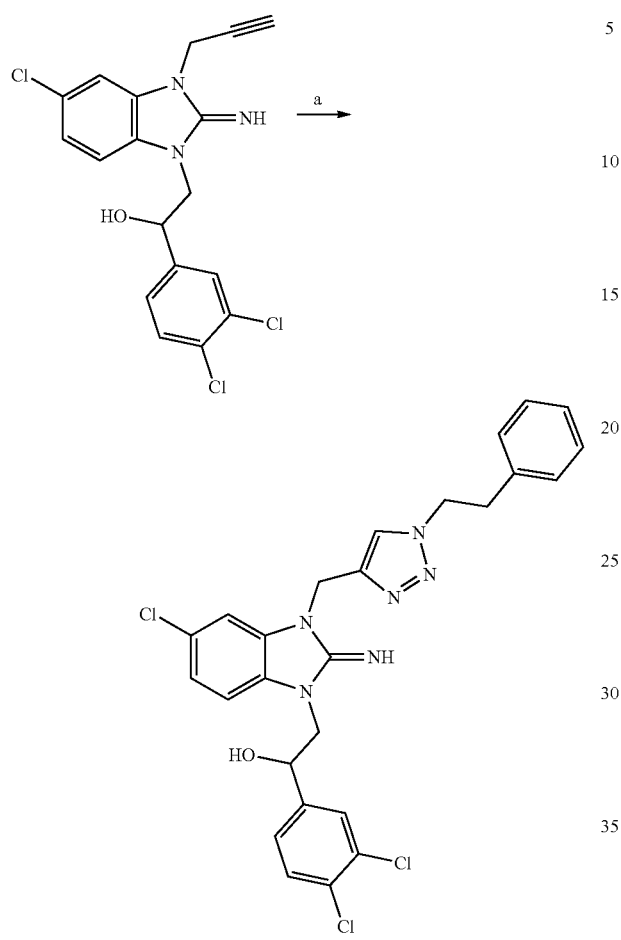

(a) azidobenzene, CuSO₄·5H₂O, sodium ascorbate, H₂O:acetonitrile (1:3), RT, 24 h, 27%

2-(5-chloro-2-imino-3-((1-phenethyl-1H-1,2,3-triazol-4-yl)methyl)-2,3-dihydro-1H-benzo[d]imidazol-1-yl)-1-(3,4-dichlorophenyl)ethan-1-ol A mixture of 2-(5-chloro-2-imino-3-(prop-2-yn-1-yl)-2,3-dihydro-1H-benzo[d]imidazol-1-yl)-1-(3,4-dichlorophenyl)ethan-1-ol (0.200 g, 0.507 mmol), aryl azide (1.01 mmol), copper (II) sulfate pentahydrate (0.008 mmol), and sodium ascorbate (0.022 mmol, 1M solution in H₂O) in 2 mL H₂O:ACN (1:3) mixture was stirred at 50° C. in an oil bath for 24 h. Solvent was removed under reduced pressure, mixture was extracted with DCM, and the organic phase was evaporated to obtain crude residue. DCM and SiO₂ were added to form a dry silica plug. Purification was done via flash chromatography (SiO₂, 50% EtOAc in hexanes, 17:0.5:1 DCM:MeOH: 35% NH₄OH). ¹H NMR (800 MHz, DMSO-d⁶) δ 7.93 (1H, s), 7.71 (1H, s), 7.53 (1H, d, J=8.0 Hz), 7.42-7.41 (1H, m), 7.23-7.18 (3H, m), 7.13 (1H, d, J=8.0 Hz), 7.09 (1H, s), 6.94 (1H, d, J=8.0 Hz), 6.89 (1H, d, J=8.0 Hz), 6.15 (1H, br s), 5.10 (2H, s), 4.99 (1H, s), 4.58 (3H, s), 4.01-3.94 (2H, m), 3.12 (2H, t, J=8.0 Hz); LCMS m/z 541.1113 ([M+H⁺], C₂₆H₂₃Cl₃N₆O requires 541.1072).

Representative compounds of the present invention, as enabled above, are shown in Table 1.

TABLE 1

Representative Compounds of the Invention.

| Example # | Structure |
|---|---|
| 1 | |
| 2 | |
| 3 | |

TABLE 1-continued

Representative Compounds of the Invention.

| Example # | Structure |
|---|---|
| 4 | |
| 5 | |
| 6 | |
| 7 | |
| 8 | |
| 9 | |

TABLE 1-continued

Representative Compounds of the Invention.

| Example # | Structure |
|---|---|
| 10 | 2-fluorobenzyl triazole benzimidazol-2-imine with 1-(3,4-dichlorophenyl)-2-hydroxyethyl |
| 11 | 3-fluorobenzyl triazole benzimidazol-2-imine with 1-(3,4-dichlorophenyl)-2-hydroxyethyl |
| 12 | 4-fluorobenzyl triazole benzimidazol-2-imine with 1-(3,4-dichlorophenyl)-2-hydroxyethyl |
| 13 | 1-phenyl triazole benzimidazol-2-imine with 1-(3,4-dichlorophenyl)-2-hydroxyethyl |
| 14 | 1-benzyl triazole benzimidazol-2-imine with 1-(3,4-dichlorophenyl)-2-hydroxyethyl |
| 15 | 1-phenethyl triazole benzimidazol-2-imine with 1-(3,4-dichlorophenyl)-2-hydroxyethyl |

TABLE 1-continued

Representative Compounds of the Invention.

| Example # | Structure |
|---|---|
| 17 | 2-imino-1-{[1-(4-methylphenyl)-1H-1,2,3-triazol-4-yl]methyl}-3-[2-hydroxy-2-(3,4-dichlorophenyl)ethyl]-2,3-dihydro-1H-benzimidazole |
| 18 | 2-imino-1-{[1-(4-methoxyphenyl)-1H-1,2,3-triazol-4-yl]methyl}-3-[2-hydroxy-2-(3,4-dichlorophenyl)ethyl]-2,3-dihydro-1H-benzimidazole |
| 19 | 2-imino-1-{[1-(4-fluorophenyl)-1H-1,2,3-triazol-4-yl]methyl}-3-[2-hydroxy-2-(3,4-dichlorophenyl)ethyl]-2,3-dihydro-1H-benzimidazole |
| 20 | 2-imino-1-{[1-(4-chlorophenyl)-1H-1,2,3-triazol-4-yl]methyl}-3-[2-hydroxy-2-(3,4-dichlorophenyl)ethyl]-2,3-dihydro-1H-benzimidazole |

TABLE 1-continued

Representative Compounds of the Invention.

| Example # | Structure |
|---|---|
| 21 | (2-methylphenyl-triazole-CH2-benzimidazol-2-imine-N-CH2-CH(OH)-3,4-dichlorophenyl) |
| 22 | (2-methoxyphenyl-triazole-CH2-benzimidazol-2-imine-N-CH2-CH(OH)-3,4-dichlorophenyl) |
| 23 | (2-fluorophenyl-triazole-CH2-benzimidazol-2-imine-N-CH2-CH(OH)-3,4-dichlorophenyl) |
| 24 | (2-chlorophenyl-triazole-CH2-benzimidazol-2-imine-N-CH2-CH(OH)-3,4-dichlorophenyl) |
| 25 | (3-methylphenyl-triazole-CH2-benzimidazol-2-imine-N-CH2-CH(OH)-3,4-dichlorophenyl) |
| 26 | (3-methoxyphenyl-triazole-CH2-benzimidazol-2-imine-N-CH2-CH(OH)-3,4-dichlorophenyl) |

TABLE 1-continued
Representative Compounds of the Invention.
| Example # | Structure |
|---|---|
| 27 | 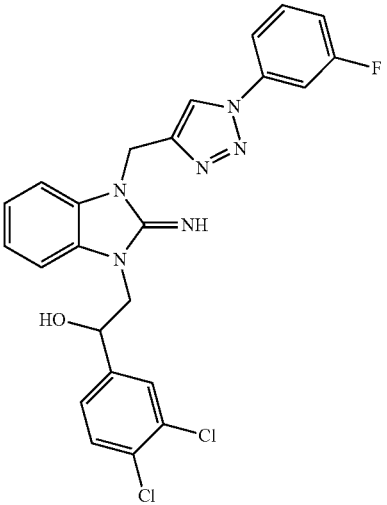 [SMILES: N=c1n(Cc2cn(-c3cccc(F)c3)nn2)c2ccccc2n1CC(O)c1ccc(Cl)c(Cl)c1] |
| 28 | 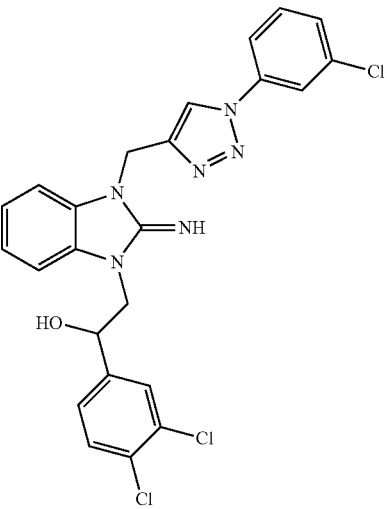 [SMILES: N=c1n(Cc2cn(-c3cccc(Cl)c3)nn2)c2ccccc2n1CC(O)c1ccc(Cl)c(Cl)c1] |
| 29 | 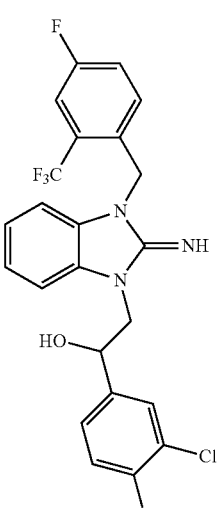 |
| 30 | 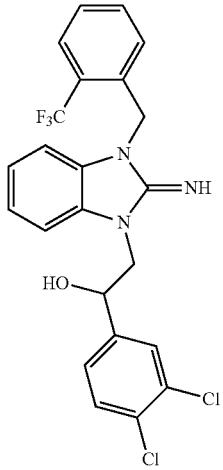 [SMILES: N=c1n(Cc2ccccc2C(F)(F)F)c2ccccc2n1CC(O)c1ccc(Cl)c(Cl)c1] |
| 31 | 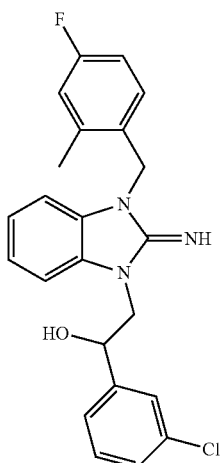 |
| 32 | 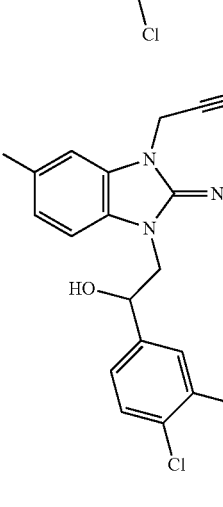 |

TABLE 1-continued

Representative Compounds of the Invention.

| Example # | Structure |
|---|---|
| 33 | (structure) |
| 34 | (structure) |
| 35 | (structure) |
| 36 | (structure) |
| 37 | (structure) |
| 38 | (structure) |

TABLE 1-continued

Representative Compounds of the Invention.

| Example # | Structure |
|---|---|
| 39 | 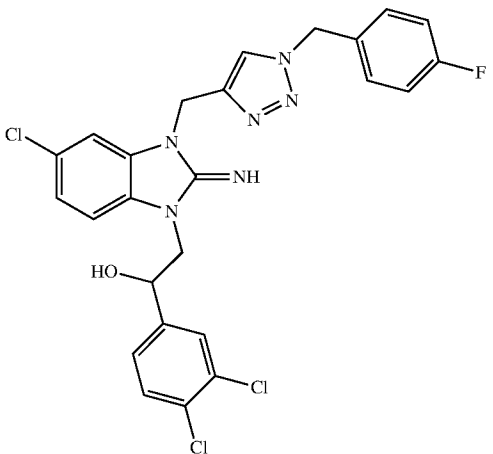 [SMILES: N=c1n(Cc2cn(Cc3ccc(F)cc3)nn2)c2cc(Cl)ccc2n1CC(O)c1ccc(Cl)c(Cl)c1] |
| 40 | 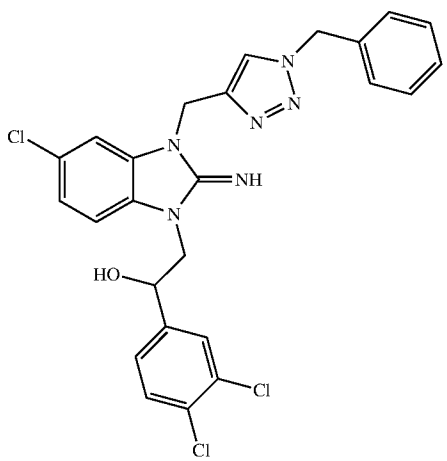 [SMILES: N=c1n(Cc2cn(Cc3ccccc3)nn2)c2cc(Cl)ccc2n1CC(O)c1ccc(Cl)c(Cl)c1] |
| 41 | 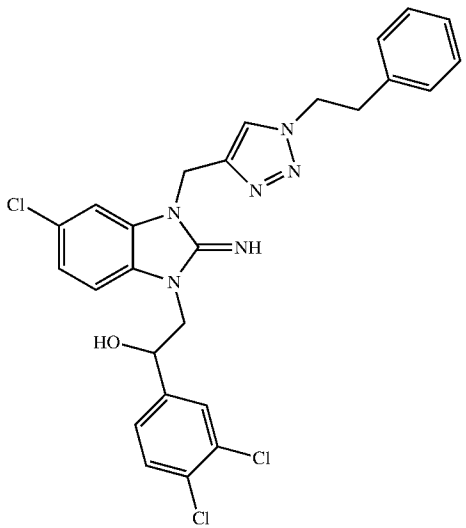 [SMILES: N=c1n(Cc2cn(CCc3ccccc3)nn2)c2cc(Cl)ccc2n1CC(O)c1ccc(Cl)c(Cl)c1] |

BIOLOGICAL ASSAYS

Fluorescence Anisotropy Binding Assay

Expression and purification of the first bromodomain (BrD1) of human BRD4 in poly-His tag form was performed using a procedure described in the literature [See Zeng et al. Structure 16, 643-652 (2008) and Zhang et al., J Biol Chem 287, 28840-28851 (2012).] The protein was purified by using affinity chromatography on a nickel-IDA column (Invitrogen), followed by the removal of poly-His tag by thrombin cleavage.

Binding affinity of the newly synthesized compounds to the BRD4 BrD1 was assessed in a fluorescence anisotropy assay using a fluorescein isothiocyanate (FITC)-labeled MS417 as an assay probe (Zhang et al. 2008 op.cit.). Competition binding was performed with a BrD protein (0.25 to 1 µM) and the fluorescent probe (80 nM), and increasing concentration of unlabeled competing ligand in a PBS buffer (pH 7.4) in total volume of 80 µL. Measurements were obtained after 1 hour incubation of the fluorescent ligand and the protein at 25° C. with Safire 2 microplate reader (Tecan). In the assay, fluorescent ligand concentration was $\leq 2K_d$, and protein concentration was set at which 50-80% of fluorescent ligand is bound. Dissociation constant of a competing ligand was calculated with the correction to Cheng-Prussoff equation introduced by Nicolovska-Coleska and colleagues [Nikolovska-Coleska, Z. et al., Anal Biochem 332, 261-273 (2004). Assuming one-site competitive binding model, the equation used to calculate $K_i$'s from $IC_{50}$ values recovered from fitting data using Prism:

$$K_i = \frac{[I_{50}]}{\frac{[L_{50}]}{K_d} + \frac{[P_0]}{K_d} + 1},$$

where $[I_{50}]$ is the concentration of free inhibitor at 50% inhibition, $[L_{50}]$, the concentration of free labeled ligand at 50% inhibition, and $[P_0]$, concentration of free protein at 0% inhibition. Note that $K_d$ for each protein-probe pair is the limit of resolvable $K_i$ in a competition assay. The binding results for examples above are shown in Table 2.

TABLE 2

| Example # | Kd, µM (FP competition assay with 10 nM FAM-ANRIL as probe) |
|---|---|
| 1 | 0.694 |
| 2 | 0.269 |
| 3 | 0.503 |
| 4 | 0.64 |
| 5 | 1.178 |
| 6 | 1.527 |
| 7 | 0.551 |
| 8 | 0.556 |
| 9 | 0.108 |
| 10 | 0.371 |
| 11 | 0.548 |
| 12 | 3.858 |
| 13 | 0.065 |
| 14 | 0.207 |
| 15 | 0.354 |

MTT Assay

The MTT assay is used to measure cellular metabolic activity as an indicator of cell viability, proliferation and cytotoxicity. This colorimetric assay is based on the reduction of a yellow tetrazolium salt (3-(4,5-dimethylthiazol-2- yl)-2,5-diphenyltetrazolium bromide or MTT) to purple formazan crystals by metabolically active cells. The viable cells contain NAD(P)H-dependent oxidoreductase enzymes which reduce the MTT to formazan. The insoluble formazan crystals are dissolved using 1-Propanol as a solubilization solution and the resulting purple colored solution is quantified by measuring absorbance at 570 nanometers (nm) using a multi-well spectrophotometer.

Protocol for MTT Assay: 100,000 $PC_3$ cells were seeded per-well (CRL-1435, ATCC) for each dose of treatment 24 hours before treatment. Cells were quantitated with Countess II Cell Counter (AMQAX1000, Thermofisher Scientific). Cells were maintained at 37° C. with 5% $CO_2$. SMAPs (dissolved in DMSO) were diluted to a stock concentration of 10 mM. Dilutions to the needed concentrations were made in DMEM (SH30022FS, Hyclone, GE Healthcare Life Sciences). Cells were treated with appropriate concentrations of compound. After 24 hours, MTT solution (M5655-1G, Sigma-Aldrich) was added to cells. Formazan crystals of metabolically active cells were dissolved with 1-Propanol (A414-500, ThermoFisher Scientific) and the solution was measured by absorbance at 570 nm (SpectraMax M5e, Molecular Devices). The $IC_{50}$s for representative examples of the present invention are shown in Table 3.

TABLE 3

| MTT assay data on treatment at doses of 0, 1, 2.5, 3.75, 5.0, 8.0 micromolar. | |
|---|---|
| Example # | $IC_{50}$ (μM) |
| 2 | 0.884 |
| 3 | 0.776 |
| 9 | 0.900 |
| 10 | 1.84 |
| 35 | 1.12 |

Examples 1-3, 7-31, and 33-41 have also been studied in the above-described MTT assay for cell viability at four dose treatments (0, 2.5, 5.0, 10.0 micromolar). All compounds decreased cell viability by 50% or more at a dose of 5 micromolar, while 26 compounds decreased cell viability by 80% at a dose of 2.5 micromolar.

While typical embodiments have been set forth for the purpose of illustration, the foregoing descriptions and examples should not be deemed to be a limitation on the scope of the invention. Accordingly, various modifications, adaptations, and alternatives may occur to one skilled in the art without departing from the spirit and scope of the present invention.

What is claimed is:

1. A compound of formula (I):

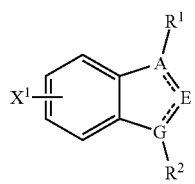

wherein:
------ represents a single bond;
A is N;
E is C=$NR^3$;

wherein:

$R^3$ is H

G is N;

$X^1$ is selected from H, halogen, $(C_1\text{-}C_4)$alkoxy, $(C_1\text{-}C_4)$alkyl, $(C_1\text{-}C_4)$perfluoroalkyl, hydroxy, $(C_1\text{-}C_4)$perfluoroalkoxy, and amino;

$R^1$ is —$CR^5R^6$—$R^9$;

wherein:

$R^5$ and $R^6$ are H;

$R^9$ is a substituted nitrogen-containing 5-membered ring heteroaryl;

wherein:

said substituted nitrogen-containing 5-membered ring heteroaryl includes a substituent —$(CR^{10}R^{11})_{n2}$—$R^{14}$;

wherein:

$R^{10}$ and $R^{11}$ are independently selected from H and $(C_1\text{-}C_3)$alkyl;

n2 is 0 or 1; and $R^{14}$ is optionally substituted phenyl, wherein said optionally substituted phenyl optionally includes one, two, or three substituents selected from $(C_1\text{-}C_3)$alkyl, halogen, $(C_1\text{-}C_3)$alkoxy, $(C_1\text{-}C_3)$haloalkoxy, and $(C_1\text{-}C_3)$haloalkyl; and $R^2$ is —$(CR^{15}R^{16})$—CH(OH)—$R^{19}$;

wherein:

$R^{15}$ and $R^{16}$ are H; and $R^{19}$ is optionally substituted phenyl, wherein one to three optional substituents of the phenyl ring are selected from halogen, $(C_1\text{-}C_4)$alkyl, and $(C_1\text{-}C_4)$haloalkyl.

2. A compound according to claim 1 of formula (II):

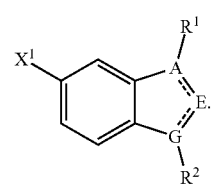

3. A compound according to claim 1, wherein $X^1$ is selected from H, halogen, and $(C_1\text{-}C_4)$alkoxy.

4. A compound according to claim 1, wherein $R^{15}$ and $R^{16}$ are H.

5. A compound according to claim 1, wherein said optionally substituted phenyl is substituted with halogen.

6. A compound according to claim 1, wherein:

$X^1$ is H, halogen, or methoxy;

$R^1$ is —$CH_2$-$R^9$, wherein $R^9$ is

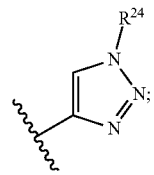

wherein:
R²⁴ is selected from:
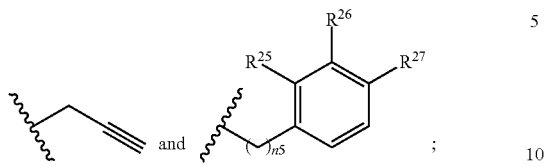
wherein:
R²⁵ is selected from H, methyl, halogen, and methoxy;
R²⁶ is selected from H, methyl, halogen, and methoxy;
R²⁷ is selected from H, methyl, halogen, and methoxy; and
n5 is 0 or 1 and
R² is —CH2-CH(OH)—R¹⁹;
wherein:
R¹⁹ is
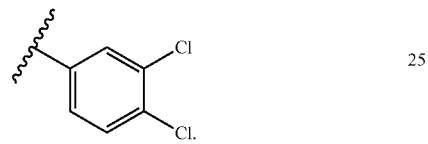
7. A pharmaceutical composition comprising a pharmaceutically acceptable carrier and a compound according to claim 1.
* * * * *